United States Patent

Koyama

[11] Patent Number: 5,978,551
[45] Date of Patent: Nov. 2, 1999

[54] PICTURE DATA PRINTING APPARATUS AND PRINT PICTURE DATA GENERATING APPARATUS

[75] Inventor: Noboru Koyama, Kanagawa, Japan

[73] Assignee: Sony Corporation, Tokyo, Japan

[21] Appl. No.: 08/727,621

[22] PCT Filed: Feb. 28, 1996

[86] PCT No.: PCT/JP96/00471

§ 371 Date: Feb. 24, 1997

§ 102(e) Date: Feb. 24, 1997

[87] PCT Pub. No.: WO96/27258

PCT Pub. Date: Sep. 6, 1996

[30] Foreign Application Priority Data

Feb. 28, 1995 [JP] Japan .................................. 7-040251

[51] Int. Cl.⁶ ................................................. B41B 15/00
[52] U.S. Cl. ........................ 395/102; 395/109; 395/117; 358/403; 382/305
[58] Field of Search .................................. 395/101, 102, 395/109, 111, 117; 358/403, 450, 451; 382/305

[56] References Cited

U.S. PATENT DOCUMENTS

| | | | |
|---|---|---|---|
| 4,805,039 | 2/1989 | Otake et al. ............................. | 386/52 |
| 5,128,748 | 7/1992 | Murakami et al. ...................... | 358/75 |
| 5,184,227 | 2/1993 | Foley ...................................... | 358/302 |
| 5,218,455 | 6/1993 | Kristy ...................................... | 358/403 |
| 5,270,831 | 12/1993 | Parulski et al. ......................... | 358/403 |
| 5,315,400 | 5/1994 | Kurata et al. ........................... | 358/335 |
| 5,321,520 | 6/1994 | Inga et al. ............................... | 358/403 |
| 5,381,526 | 1/1995 | Ellson .................................... | 395/164 |
| 5,383,029 | 1/1995 | Kojima .................................. | 358/403 |
| 5,402,881 | 4/1995 | Manico .................................. | 206/225 |
| 5,543,925 | 8/1996 | Timmermans ......................... | 358/310 |
| 5,764,870 | 6/1998 | Manico et al. ........................ | 395/117 |

FOREIGN PATENT DOCUMENTS

| | | | |
|---|---|---|---|
| 0435174 A2 | 7/1991 | European Pat. Off. ........ | G06F 15/64 |
| 0449529 A2 | 10/1991 | European Pat. Off. ......... | H04N 1/32 |
| 3940051 A1 | 6/1990 | Germany ....................... | H04N 1/387 |
| 62-248376 | 10/1987 | Japan ............................ | H04N 1/387 |
| 62-293882 | 12/1987 | Japan ............................ | H04N 1/21 |
| 63-73474 | 4/1988 | Japan ............................ | G06F 15/40 |
| 2-202766 | 8/1990 | Japan ............................ | H04N 1/21 |
| 4-2264 | 1/1992 | Japan ............................ | H04N 1/21 |
| 5-108732 | 4/1993 | Japan ............................ | G11B 27/00 |
| 6-314325 | 11/1994 | Japan ............................ | G06F 15/62 |
| 92/05504 | 4/1992 | WIPO ............................. | G06F 15/40 |

Primary Examiner—Edward L. Coles
Assistant Examiner—Sterling W. Chandler
Attorney, Agent, or Firm—Limbach & Limbach L.L.P.

[57] ABSTRACT

This still picture filing system comprises a printer unit 2, a picture processing block 3, a thinning and compression/expansion processing block 4, a storage unit 5 and a system controller 6 which are connected through a bus line 7. Print picture data is formed by the picture processing block 3 on the basis of plural picture data which have been read out from a recording medium by the storage unit 5 to print the print picture data onto an index card at the printer unit 2. To realize this, the system controller 6 controls the printer unit 2, the picture processing block 3, the thinning and compression/expansion processing block 4 and the storage unit 5.

36 Claims, 43 Drawing Sheets

SECTOR STRUCTURE OF VOLUME DESCRIPTOR VD

| | 16BIT | | 16BIT | |
|---|---|---|---|---|
| | MSB     LSB | MSB     LSB | MSB     LSB | MSB     LSB |
| 0 | sync | sync | sync | sync |
| 1 | sync | sync | sync | sync |
| 2 | sync | sync | sync | sync |
| 3 | clusterH | clusterL | sector | mode |
| 4 | 00000000 | 00000000 | 00000000 | 00000000 |
| 5 | 00000000 | 00000000 | 00000000 | 00000000 |
| 6 | 00000000 | " M " | " O " | " O " |
| 7 | " 0 " | " 1 " | VERSION | 00000000 |
| 8 | 00000000 | 00000000 | 00000000 | 00000000 |
| 9 | 00000000 | 00000000 | 00000000 | 00000000 |
| 10 | LOGICAL BLOCK SIZE | | LOGICAL CLUSTER SIZE | |
| 11 | ALLOCATION BLOCK SIZE | | 00000000 | 00000000 |
| 12 | TOTAL NO.OF ALLOCATION BLOCKS | | | |
| 13 | TOTAL NO.OF RECORDABLE ALLOCATION BLOCKS | | | |
| 14 | NO.OF UNRECORDED ALLOCATION BLOCKS | | | |
| 15 | NO.OF RECORDED ALLOCATION BLOCKS | | | |
| 16 | NO.OF DEFECT ALLOCATION BLOCKS | | | |
| 17 | 00000000 | 00000000 | 00000000 | 00000000 |
| 18 | NO.OF DIRECTORIES | | NO.OF FILES | |
| 19 | ID MAX. VALUE | | | |
| 20 | VOLUME ATTRIBUTE | | 00000000 | 00000000 |
| 21 | VOLUME MANAGEMENT AREA LENGTH | | | |
| 22 | VOLUME MANAGEMENT AREA POSITION | | | |
| 23 | VOLUME SPACE BITMAP POSITION | | NO.OF VOLUME SPACE BITMAPS | |
| 24 | 1-ST MANAGEMENT TABLE POSITION | | NO.OF MANAGEMENT TABLES | |
| 25 | 1-ST EXTENT RECORD BLOCK POSITION | | NO.OF EXTENT RECORD BLOCKS | |
| 26 | 1-ST DIRECTORY RECORD BLOCK POSITION | | NO.OF DIRECTORY RECORD BLOCKS | |
| 27 | ROOT DIRECTORY LENGTH | | | |
| 28 | DIRECTORY LENGTH WITHIN ROOT DIRECTORY | | 00000000 | 00000000 |
| 29 | 00000000 | 00000000 | 00000000 | 00000000 |
| 30 | VARIOUS ID, etc. | | | |
| 517 | | | | |
| 518 | EDC0 | EDC1 | EDC2 | EDC3 |
| 519 | P-parity0 | P-parity1 | P-parity2 | P-parity3 |
| 520 | P-parity4 | P-parity5 | P-parity6 | P-parity7 |
| 521 | P-parity8 | P-parity9 | P-parity10 | P-parity11 |
| 563 | P-parity168 | P-parity169 | P-parity170 | P-parity171 |
| 564 | Q-parity0 | Q-parity1 | Q-parity2 | Q-parity3 |
| 565 | Q-parity4 | Q-parity5 | Q-parity6 | Q-parity7 |
| 587 | Q-parity100 | Q-parity101 | Q-parity102 | Q-parity103 |

Rows 0–3: HEADER
Rows 4–517: DATA AREA (2048 BYTES)
Row 518: EDC AREA (4 BYTES)
Rows 519–563: P PARITY (172 BYTES)
Rows 564–587: Q PARITY (104 BYTES)
ECC AREA (276 BYTES)

FIG.10

FORMAT TABLE

| FIELD NAME | NO. OF BYTES | DATA FORM |
|---|---|---|
| TABLE ID | 1 | B |
| NEXT TABLE POINTER | 1 | B |
| FORMAT VERSION | 2 | B |
| FILE FORM | 1 | B |
| FILE FORM VERSION | 1 | B |
| NO. OF ALL TABLES | 1 | B |
| RESERVE (SPACE) | 1 | B |
| DATA START ADDRESS | 4 | B |
| DATA SIZE | 4 | B |
| RESERVE (SPACE) | 4 | |

FIG.22

PICTURE PARAMETER TABLE

| FIELD NAME | NO. OF BYTES | DATA FORM |
|---|---|---|
| TABLE ID | 1 | B |
| NEXT TABLE POINTER | 1 | B |
| PICTURE SIZE BREADTH | 2 | B |
| PICTURE SIZE LENGTH | 1 | B |
| PICTURE COMPONENT | 1 | B |
| DISCRIMINATION BETWEEN LENGTH AND BREADTH | 1 | B |
| WIDE ID | 1 | B |
| COMPRESSION RATE | 1 | B |
| COPY RIGHT, EDITORIAL RIGHT | 1 | B |
| INPUT EQUIPMENT KIND | 1 | B |
| RESERVE (SPACE) | 3 | B |
| EXISTENCE OF DUMMY DATA | 1 | B |
| X-BIGIN OF VALID DATA | 2 | B |
| Y-BIGIN OF VALID DATA | 2 | B |
| X-SIZE OF VALID DATA | 2 | B |
| Y-SIZE OF VALID DATA | 2 | B |
| RESERVE (SPACE) | 4 | B |

FIG.23

OV_INF. PMF FILE (OVERALL INFORMATION MANAGEMENT FILE)

HEADER:

| | |
|---|---|
| FORMAT TABLE | {ESSENTIAL} |
| NAME TABLE | {OPTION} |
| COMMENT TABLE | {OPTION} |
| DISC ID TABLE | {OPTION} |
| OPTION TABLE | {OPTION} |

DATA:

| FIELD NAME | NO. OF BYTES | DATA FORM |
|---|---|---|
| TOTAL NO. OF PICTURES | 2 | B |
| NEXT PICTURE DIRECTORY NO. | 2 | B |
| TOTAL NO. OF PICTURE DIRECTORIES | 2 | B |
| NO. OF REPRODUCTION CONTROL FILES | 1 | B |
| PRESENCE OR ABSENCE OF PMSE Q DIRECTORY | | |
| NO. OF RGB MUSICS | 1 | B |
| NO. OF PRINT DATA FILES | 1 | B |
| PRESENCE OR ABSENCE OF TELOP DATA FILE | 1 | B |
| PRESENCE OR ABSENCE OF RETRIEVAL INFORMATION FILE | 1 | B |
| AUTOMATIC STARTING FILE NO. | 1 | B |
| LAST ACCESS PICTURE DIRECTORY NO. | 2 | B |
| LAST ACCESS PICTURE NO. | 2 | B |
| PASS WORD | 8 | B |
| NARRATION LANGUAGE INFORMATION | 6 | B |
| RESERVE | 2 | |
| PICTURE DIRECTORY INFORMATION UNIT | 48 × N | |

FIG.24(a)

| PICTURE DIRECTORY INFORMATION UNIT | NO. OF BYTES | DATA FORM |
|---|---|---|
| DIRECTORY NO. | 2 | B |
| INDEX PICTURE NO. | 2 | B |
| NO. OF PICTURES WITHIN DIRECTORY | 2 | B |
| INDEX PICTURE INDIVIDUAL INFORMATION | 1 | B |
| CHARACTER ID CODE | 1 | B |
| DIRECTORY NAME | 36 | A OR C |
| RESERVE | 4 | B |

FIG.24(b)

PIC_INF. PMF FILE (PICTURE DATA MANAGEMENT FILE)

| HEADER | | |
|---|---|---|
| | FORMAT TABLE | {ESSENTIAL} |
| | NAME TABLE | {OPTION} |
| | COMMENT TABLE | {OPTION} |
| | OPTION TABLE | {OPTION} |

| DATA | FIELD NAME | NO. OF BYTES | DATA FORM |
|---|---|---|---|
| | LINK ID | 1 | B |
| | RESERVE | 3 | B |
| | NEXT PICTURE NO. | 2 | B |
| | NO. OF PICTURES | 2 | B |
| | RESERVE | 2 | |
| | NO. OF PICTURE INDEX FILES | 1 | B |
| | NEXT PICTURE INDEX FILE NO. | 1 | B |
| | INDEX FILE INFORMATION | 4 × 256 | |
| | PICTURE INFORMATION UNIT | 16 × N | |

FIG.25(a)

| PICTURE INFORMATION UNIT | NO. OF BYTES | DATA FORM |
|---|---|---|
| DIRECTORY NO. | 2 | B |
| PICTURE NO. | 2 | |
| PICTURE KIND INFORMATION | 1 | |
| PICTURE INDIVIDUAL INFORMATION | 1 | |
| NO. OF LINKS | 1 | |
| NARRATION INFORMATION | 1 | |
| KEY WORD RETRIEVAL DATA NO. | 2 | |
| TIME STAMP RETRIEVAL DATA NO. | 2 | |
| TELOP NO. | 2 | |
| RESERVE | 2 | |

FIG.25(b)

OV_IDX. PMX FILE (OVERALL INDEX FILE)
| | NO. OF BYTES |
|---|---|
| HEADER — INDEX PICTURE DATA 0 | 4096 |
| INDEX PICTURE DATA 1 | 4096 |
| INDEX PICTURE DATA 2 | 4096 |
| ⋮ | ⋮ |
| INDEX PICTURE DATA N-1 | 4096 |
| INDEX PICTURE DATA N | 4096 |
FIG.28(a)
INDEX PICTURE DATA
| HEADER | FORMAT TABLE | {ESSENTIAL} |
|---|---|---|
| | SPACE | {ESSENTIAL} |
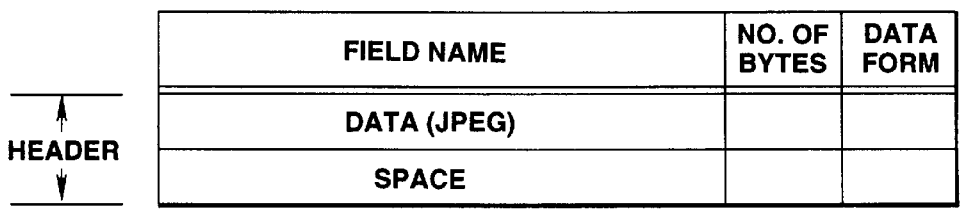
| | FIELD NAME | NO. OF BYTES | DATA FORM |
|---|---|---|---|
| HEADER | DATA (JPEG) | | |
| | SPACE | | |
FIG.28(b)

PIDXnnn. PMX FILE (PICTURE INDEX FILE)

| | NO. OF BYTES |
|---|---|
| INDEX PICTURE DATA 0 | 4096 |
| INDEX PICTURE DATA 1 | 4096 |
| INDEX PICTURE DATA 2 | 4096 |
| ⋮ | ⋮ |
| INDEX PICTURE DATA N-1 | 4096 |
| INDEX PICTURE DATA N | 4096 |

HEADER (rows 0 and 1 marked)

FIG.29(a)

INDEX PICTURE DATA

| HEADER | | |
|---|---|---|
| FORMAT TABLE | | {ESSENTIAL} |
| SPACE | | {ESSENTIAL} |

| FIELD NAME | NO. OF BYTES | DATA FORM |
|---|---|---|
| DATA (JPEG) | | |
| SPACE | | |

DATA

FIG.29(b)

| PRINT INFORMATION UNIT | NO. OF BYTES | DATA FORM |
|---|---|---|
| PICTURE DIRECTORY NO. | 2 | B |
| PICTURE NO. | 2 | B |
| PICTURE KIND | 1 | B |
| NO. OF PRINTS | 1 | B |
| RESERVE | 1 | |
| EXTRACTION ID | 1 | B |
| EXTRACTION START POSITION X | 2 | B |
| EXTRACTION START POSITION Y | 2 | B |
| EXTRACTION SIZE X | 2 | B |
| EXTRACTION SIZE Y | 2 | B |
| ROTATION ID | 1 | B |
| MIRROR ID | 1 | B |
| PRINT SIZE ID | 1 | B |
| REGULAR SHAPE DESIGNATION | 1 | B |
| NON-REGULAR SIZE DESIGNATION X | 2 | B |
| NON-REGULAR SIZE DESIGNATION Y | 2 | B |
| MULTI ID | 1 | B |
| MULTI MODE | 1 | B |
| CAPTION ID | 1 | B |
| CAPTION KIND | 1 | B |
| COLOR PROCESSING ID | 1 | B |
| R GAIN | 1 | B |
| G GAIN | 1 | B |
| B GAIN | 1 | B |
| CONTRAST | 1 | B |
| BRIGHTNESS | 1 | B |
| SHARPNESS | 1 | B |
| SATURATION | 1 | B |
| HUE | 1 | B |
| RESERVE | 3 | |

FIG.31

PICTURE DATA PRINTING APPARATUS AND PRINT PICTURE DATA GENERATING APPARATUS

TECHNICAL FIELD

This invention relates to a picture data printing apparatus and a print picture data generating apparatus which are adapted for printing, onto an index card, plural picture data recorded on a recording medium by the picture filing system so that their contents can be indicated or recognized as a list.

BACKGROUND ART

Hitherto, there have been known picture filing systems adapted for taking thereinto picture data from scanner, etc. to record the picture data thus taken in onto a recording medium such as an optical disc, etc. to carry out filing of the picture data. This picture filing system comprises a memory for temporarily storing picture taken in from the scanner, a picture processing unit for implementing picture processing such as enlargement, contraction and rotation, etc. to the picture data which have been read out from the memory, and a recording unit for recording, onto the optical disc, the picture data which has been caused to undergo picture processing.

Meanwhile, since recent optical discs have very large memory capacity, it is possible to store picture data of several hundred frames onto a single optical disc. In addition, such picture filing system is caused to store picture data of several hundred frames not only on a single disc but also on plural respective discs so that of picture data of several thousand frames are permitted to undergo filing.

However, when the number of discs on which picture data are recorded is increased, user could not recognize the relationship between discs and kind (attribute) of picture data recorded thereon. When operator attempts to search the picture data that he desires from a large quantity of picture data recorded on plural discs, a procedure must be taken to once the disc, into the recording/reproduction unit to read out picture data recorded on the disc to confirm it on the monitor. Accordingly, when such a processing is carried out with respect to the plural discs, not only time but also extremely much labor are required.

This invention has been made in view of such problems as described above, and its object is to provide a picture data printing apparatus and a print picture data generating apparatus which can easily judge respective picture data stored on discs by the picture filing system.

DISCLOSURE OF THE INVENTION

A picture data printing apparatus according to this invention comprises: read-out means for reading out plural picture data from a recording medium; picture formation means for forming print picture data on the basis of the plural picture data which have been read out by the read-out means; printing means for printing the printing picture data formed by the picture formation means onto an index card; and control means for controlling the read-out means, the picture formation means and the printing means so that the plural picture data can be indicated as a list by the index card on which the print picture data has been printed.

The control means controls the read-out means so as to read out, from a recording medium including, e.g., high resolution picture file including high resolution picture data having first resolution, intermediate resolution picture file including intermediate resolution picture data having second resolution, and index picture file including plural index picture data having third resolution, the intermediate resolution picture data included within the intermediate resolution picture file, and to control the picture formation means so as to form print picture data from the intermediate resolution picture data which has been read out by the read-out means.

Moreover, the control means controls the read-out means so as to read out, from a recording medium including, e.g., high resolution picture file including high resolution picture data having first resolution, intermediate resolution picture file including intermediate resolution picture data having second resolution, index picture file including plural index picture data having third resolution, and management file including information indicating relevancy of the high resolution picture data the intermediate resolution picture data and the index picture data, the intermediate resolution picture data included within the intermediate resolution picture file, and to control the picture formation means so as to form print picture data from the intermediate resolution picture data which has been read out by the read-out means.

Further, the control means includes memory means for temporarily storing, e.g., information included within the management file recorded on the recording medium.

Further, the control means controls the read-out means so as to read out, from a recording medium having hierarchical directory structure consisting of, e.g., main directory and plural picture directories formed as subdirectory within the main directory, and including the management file consisting of first management file formed within the main directory and second management file formed within the plural picture directories, the intermediate resolution picture data included within the intermediate resolution picture file on the basis of information included within the management file.

Further, the control means controls the read-out means so as to makes reference to, from a recording medium in which, e.g., overall information management file is formed as the first management file and picture data management file is formed as the second management file, picture directory number and picture number included within the picture data management file stored in the memory means as information included within the management file to thereby designate the intermediate resolution picture file which is to be read out by the read-out means to read out the intermediate resolution picture data from the designated intermediate resolution picture file.

Further, the control means controls the read-out means so as to make reference to, from a recording medium in which, e.g., overall information management file is formed as the first management file and picture data management file is formed as the second management file, information of plural picture information units included within the picture data management file stored in the memory means as information included within the management file to thereby designate the intermediate resolution picture file in order of picture directory number and picture number to read out the intermediate resolution picture data in accordance with the designated order from all intermediate resolution picture files recorded on the recording medium.

Further, the control means controls the picture formation means so as to form, e.g., intermediate/low resolution picture data having resolution which is lower than the second resolution and is higher than the third resolution by decreasing data quantity from the intermediate resolution data which has been read out by the read-out means.

Further, the control means selects resolution of the intermediate/low resolution picture data, e.g., on the basis of printable resolution of the printing means.

Further, the control means controls the picture formation means on the basis of information included within the management file stored in the memory means so that related information data corresponding to the high resolution picture data caused to be related to the intermediate resolution data which has been read out by the read-out means is synthesized with the intermediate/low resolution picture data.

Further, the related information data synthesized with the intermediate/low resolution picture data includes, e.g., picture directory number indicating picture directory in which high resolution picture file including high resolution picture data related to the intermediate resolution data is recorded, and picture number indicating order of the high resolution picture data within corresponding picture directory.

Further, the control means makes reference to, e.g., picture information unit corresponding to the related high resolution picture data within the management file stored in the memory means to thereby obtain the directory number and the picture number.

Further, the related information data synthesized with the intermediate/low resolution picture data includes, e.g., data indicating recording mode of high resolution picture data related to the intermediate resolution data. The data indicating the recording mode is, e.g., data indicating any one of high resolution recording mode and ultra (super) high resolution recording mode in which the high resolution picture data included within the high resolution picture file is recorded.

Further, the control means makes reference to, e.g., picture kind information of picture information unit corresponding to the related high resolution picture data within the management file stored in the memory means to thereby obtain the data indicating the recording mode.

Further, the control means controls the read-out means so as to designate the intermediate resolution picture file, e.g., in order of picture directory number and picture number to read out, from the recording medium, the intermediate resolution picture data in the designated order, and controls the picture formation means so as to decrease data quantity from the intermediate resolution data which has been read out by the read-out means to form in order intermediate/low resolution picture data having resolution which is lower than the second resolution and is higher than the third resolution to form the print picture data from all the formed intermediate/low resolution picture data.

Further, the control means controls the picture formation means so that processing information used in implementing processing for accommodating the index card into a storage (keeping) case for the recording medium is synthesized with the intermediate/low resolution picture data. The processing information is, e.g., cutting line for cutting the index card from print media.

Further, the control means controls the read-out means so as to read out, from a recording medium including, e.g., high resolution picture file including high resolution picture data having first resolution, intermediate resolution picture file including intermediate picture data having second resolution, index picture file including plural index picture data having third resolution, and management file including information relevancy of the high resolution picture data, the intermediate resolution picture data and the index picture data, plural index picture data included within the index picture file on the basis of information included within the management file, and controls the picture formation means so as to form print picture data from the plural index picture data which have been read out by the read-out means.

Further, the control means controls the read-out means so as to read out, from a recording medium having hierarchical directory structure consisting of, e.g., main directory and plural picture directories formed as subdirectory within the main directory, and including the management file consisting of first management file formed within the main directory and second management file formed within the plural picture directories, plural index picture data included within the index picture file on the basis of information included within the management file.

Further, the control means controls the read-out means so as to make reference to, from a recording medium in which, e.g., overall information management file is formed as the first management file and picture data management file is formed as the second management file, picture directory number included within the picture data management file stored in the memory means as information included within the management file to thereby designate index picture file which is to be read out by the read-out means to read out plural index picture data from the designated index picture file.

Further, the control means controls the read-out means so as to designate, from a recording medium in which overall information management file is formed as the first management file and picture data management file is formed as the second management file, the index picture file in order from picture directories of smaller picture directory number on the basis of information included within the overall information management file stored in the memory means as information included within the management file to read out plural index picture data from all the index picture files recorded on the recording medium.

Further, the control means controls the picture formation means so that every time one index picture file is read out by the read-out means, e.g., on the basis of information included within management file stored in the memory means, related information data corresponding to plural high resolution picture data related to plural index picture data included within the index picture file thus read out are respectively synthesized with the plural index picture data. The related information data synthesized with the index picture data includes, e.g., picture directory number indicating picture directory within which high resolution picture file including high resolution picture data related to the index picture data is recorded, and picture number indicating order of the high resolution picture data within corresponding picture directory.

Further, the control means makes reference to, e.g., picture information unit corresponding to the related high resolution picture data within the management file stored in the memory means to thereby obtain the directory number and the picture number.

Further, the related information data synthesized with the index picture data includes, e.g., data indicating recording mode of the high resolution picture data related to the index picture data. The data indicating the recording mode is, e.g., data indicating any one of high resolution recording mode and ultra high resolution recording mode in which high resolution picture data included within the high resolution picture file is recorded.

Further, the control means makes reference to, e.g., picture kind information of picture information unit corresponding to the related high resolution picture data within the management file stored in the memory means to thereby obtain the data indicating the recording mode.

Further, the control means controls the read-out means so as to designate the index picture files in order, e.g., from picture directories of smaller picture directory number to read out, in the designated order, all the index picture data recorded on the recording medium, and controls the picture formation means so as to form the print picture data from all the index picture data which have been read out by the read-out means.

Further, the control means comprises selector means for selecting any one of first print picture data formation mode in which an operation is made to read out, by the read-out means, from a recording medium including, e.g., high resolution picture file including high resolution picture data having first resolution, intermediate resolution picture file including intermediate resolution picture data having second resolution, index picture file including plural index picture data having third resolution and management file including information indicating relevancy of the high resolution picture data, the intermediate resolution picture data and index picture data, the intermediate resolution picture data included within the intermediate resolution picture file to form first print picture data by the picture formation means from the intermediate resolution picture data thus read out, and second print picture data formation mode in which an operation is made to read out plural index picture data included within the index picture file by the read-out means to form second print picture data by the picture formation means from the index picture data thus read out. The first print picture data consists of picture data having resolution higher than that of the second print picture data.

Further, this invention is directed to a picture data printing apparatus adapted for printing picture data reproduced from a recording medium including high resolution picture file including high resolution picture data having first resolution, intermediate resolution picture file including intermediate resolution picture data having second resolution, index picture file including plural index picture data having third resolution, and management file including information indicating relevancy of the high resolution picture data, the intermediate resolution picture data and the index picture data, the apparatus comprising: read-out means for reading out, every index picture file, all the index picture data included within all the index picture files recorded on the recording medium; picture formation means for synthesizing, in order, all the index picture data which have been read out by the read-out means to form print picture data; printing means for printing the print picture data formed by the picture formation means onto an index card; and control means for controlling the read-out means, the picture formation means and the printing means so that all the index picture data recorded on the recording medium can be indicated as a list by the index card on which the print picture data has been printed.

The control means in the picture data printing apparatus controls the picture formation means so that every time, e.g., one index picture file is read out by the read-out means, related information data corresponding to plural high resolution picture data related to plural index picture data included within the index picture file thus read out are respectively synthesized with all the index picture data.

In addition, this invention is directed to a print picture data generating unit (apparatus) in a picture data printing apparatus adapted for printing picture data reproduced from a recording medium including high resolution picture file including high resolution picture data having first resolution, intermediate resolution picture file including intermediate resolution picture data having second resolution, index picture file including plural index picture data having third resolution, and management file including information indicating relevancy of the high resolution picture data, the intermediate resolution picture data and the index picture data, the print picture data generating unit comprising: read-out means for reading out, every index picture file, all index picture data included within all index picture files recorded on the recording means; picture formation means for forming print picture data from all the index picture data which have been read out by the read-out means; and control means for controlling the read-out means and the picture formation means so that all the index picture data recorded on the recording medium can be indicated as a list by print media on which the print picture data has been printed.

The control means in this print picture data generating unit controls the picture formation means so that every time, e.g., one index picture file is read out by the read-out means, related information data corresponding to plural high resolution picture data related to plural index picture data included within the index picture file thus read out are respectively synthesized with all the index picture data.

BRIEF DESCRIPTION OF THE DRAWINGS

FIG. 10 is a view for explaining sector structure of volume descriptor.

FIG. 22 is a view for explaining format table in the hierarchical directory structure.

FIG. 23 is a view for explaining picture parameter table in the hierarchical directory structure.

FIGS. 24(a)–24(b) are a view for explaining overall information management file in the hierarchical directory structure.

FIGS. 25(a–25(b) are a view for explaining picture data management table in the hierarchical directory structure.

FIGS. 28(a)–28(b) are a view for explaining overall index file in the hierarchical directory structure.

FIGS. 29(a–29(b) are a view for explaining picture index file in the hierarchical directory structure.

FIG. 31 is a view for explaining print control data which is data content of print information unit included in the print data file.

BEST MODE FOR CARRYING OUT THE INVENTION

Best mode (form) for carrying out this invention will now be described in detail with reference to the attached drawings.

Figure 1:
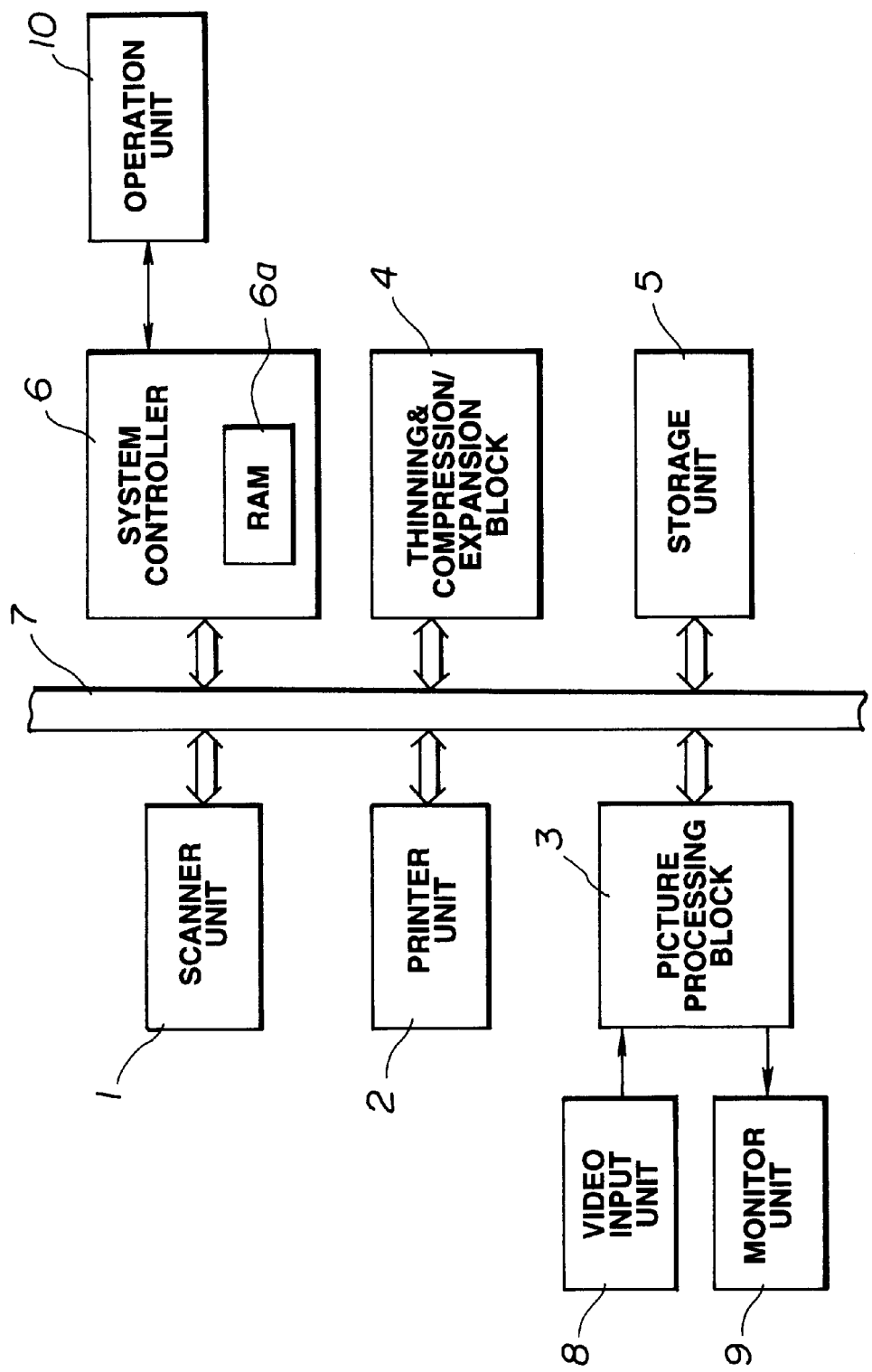
FIG. 1 is a block diagram of a still picture filing system to which this invention is applied.

Initially, a picture data printing apparatus and a print picture data generating apparatus according to this invention is applied to a still picture filing system as shown in FIG. 1, for example.

1 [Configuration of the still picture filing system]

This still picture filing system comprises a scanner unit 1 for carrying out taking-in operation of picture (pictorial image) from film or photograph, etc., a printer unit 2 for carrying out print operation of still picture corresponding to picture data taken in or recorded at the still picture filing system, and a picture processing-block 3 for forming, from the picture data which has been taken in by the still picture filing system, high resolution picture data for print, intermediate resolution picture data for monitor display, and low resolution picture data for index display. A video input unit 8 for taking thereinto picture data from other image equipments such as video tape recorder equipment or camera device, etc., and a monitor unit 9 on which still picture image corresponding to picture data caused to be through the picture processing block 3 is displayed are connected to the picture processing block 3.

Moreover, the still picture filing system comprises a thinning and contraction/expansion block 4 for implementing thinning and contraction/expansion processing to picture data which have been taken into the still picture filing system, a storage unit 5 for recording and reproducing the picture data of respective resolutions with respect to optical disc provided as a recording medium in the still picture filing system, and a system controller 6 for carrying out control of the entirety of the still picture filing system. At the system controller 6, as described later, there is provided a random access memory (RAM) 6a for temporarily storing picture data which has been read out from the optical disc when recording the picture data after undergone sequencing in order of reproduction (playback). In addition, an operation unit 10 for designating taking-in, recording, reproduction (playback) and print, etc. of the picture data is connected to the system controller 6.

The still picture filing system is of a structure in which the scanner unit 1, the printer unit 2, the picture processing block 3, the thinning and contraction/expansion processing block 4, the storage unit 5, and the system controller 6 are connected (interconnected) through a bus line 7.

1-1 [Configuration of the scanner unit]

Figure 2:
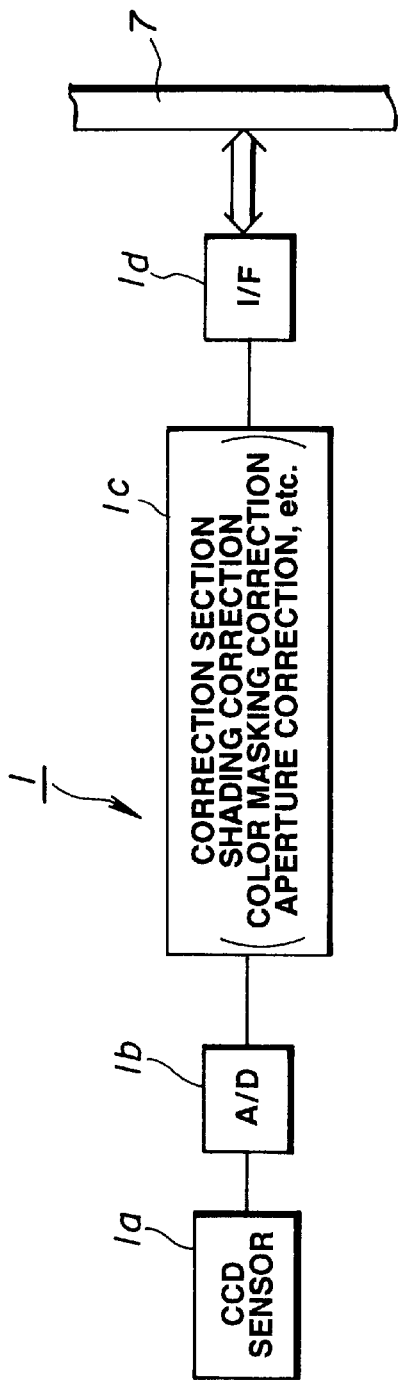
FIG. 2 is a block diagram of scanner unit provided in the still picture filing system.

The scanner unit 1 is composed, as shown in FIG. 2, of a CCD image sensor 1a for reading still picture recorded on negative film, positive film or photograph, etc., an A/D converter 1b for allowing a picture signal delivered as an analog signal from the CCD image sensor 1a to undergo digital conversion to form picture data, a correction section 1c for implementing correction processing such as shading correction or color masking correction, etc. to the picture data from the A/D converter 1b, and an interface 1d connected to the bus line 7.

1-2 [Configuration of the printer unit]

Figure 3:
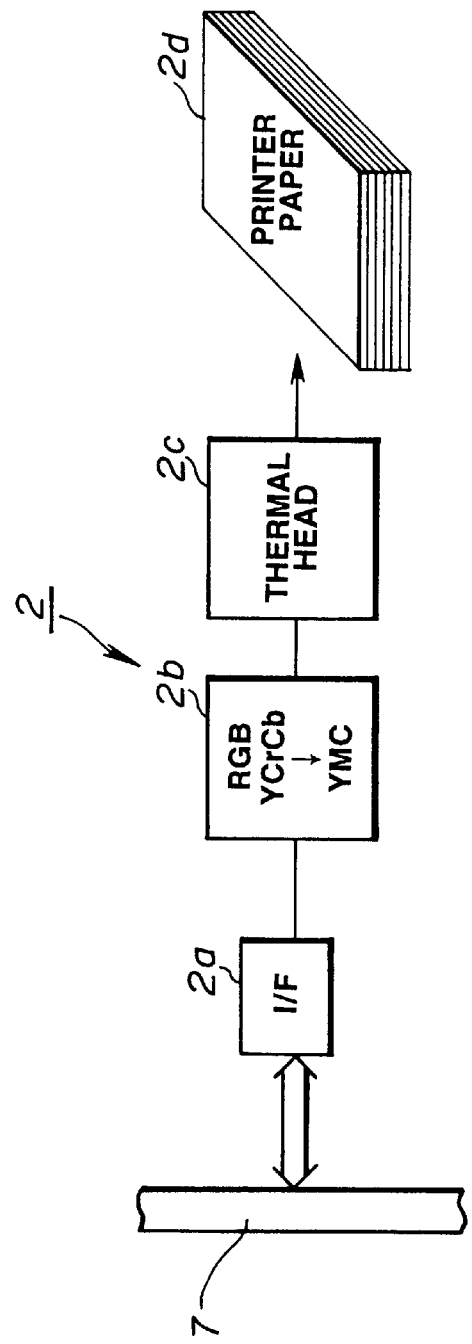
FIG. 3 is a block diagram of printer unit provided in the still picture filing system.

The printer unit 2 is composed, as shown in FIG. 3, of an interface 2a connected to the bus line 7, a data conversion circuit 2b for implementing data conversion processing suitable for print to the picture data delivered thereto, and a thermal head 2c for carrying out print operation of still picture corresponding to the picture data from the data conversion circuit 2 onto a printer paper 2d. The print operation at this printer unit is controlled in accordance with print control data, which will be described later, for controlling the number of prints, and hue (tint), etc.

1-3 [Configuration of the picture processing block]

Figure 4:
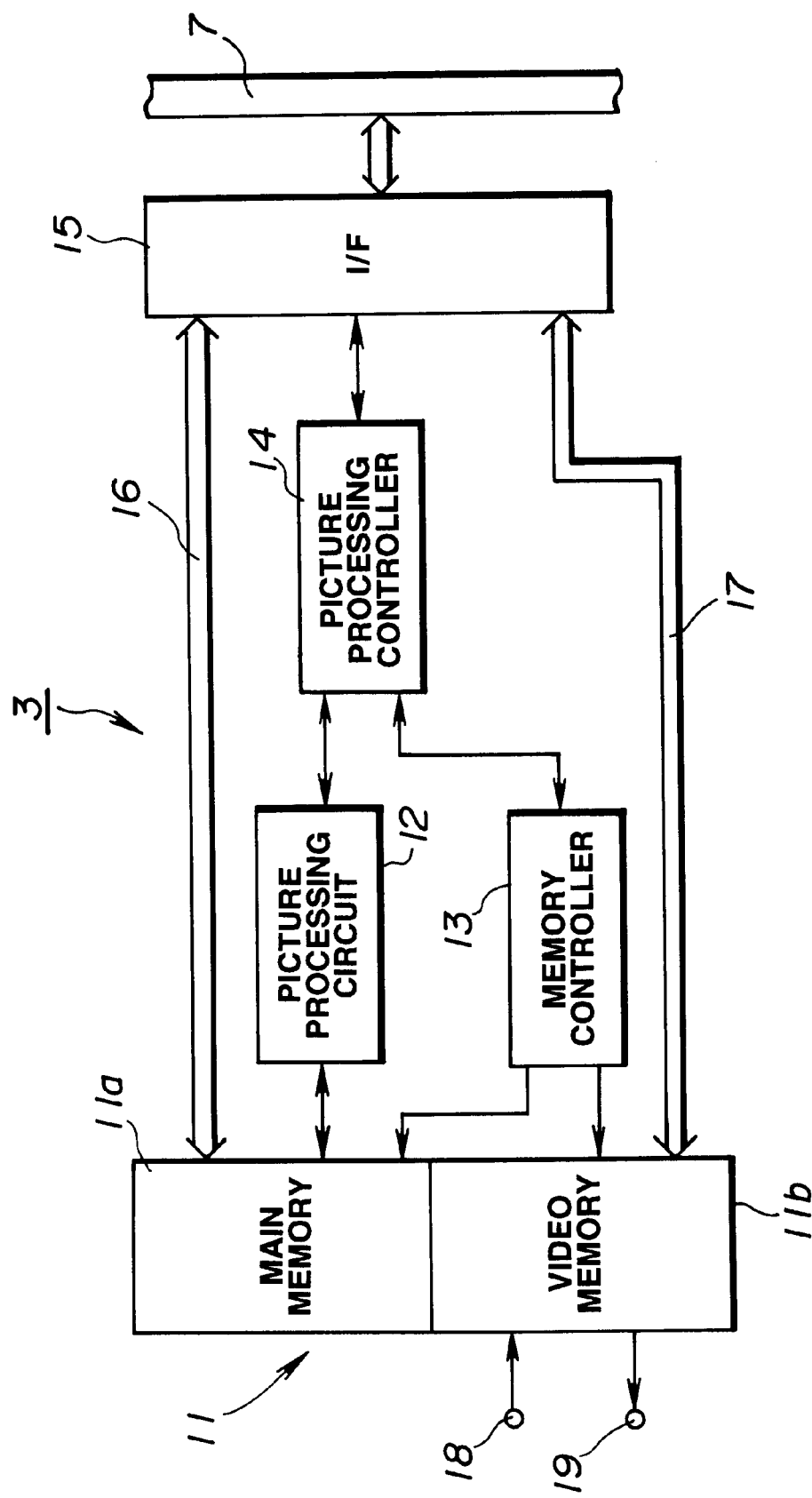
FIG. 4 is a block diagram of picture processing block provided in the still picture filing system.

The picture processing block 3 comprises, as shown in FIG. 4, a frame memory 11 composed of a main memory 11a for temporarily storing picture data taken into the still picture filing system and a video memory 11b for temporarily storing picture data taken thereinto through the scanner unit 1 or the video input unit 8, etc., and a picture processing circuit 12 for implementing picture processing such as expansion processing or contraction processing, etc. to the picture data which has been read out from the main memory 11a. The picture processing block 3 further includes a memory controller 13 for controlling the frame memory 11, a picture processing controller 14 for controlling picture processing operation in the picture processing circuit 12, and an interface 15 connected to the bus line 7.

More particularly, the frame memory 11 is composed of frame memory for R in which picture data of Red (R) is subjected to read/write operation, frame memory for G in which picture data of Green (G) is subjected to read/write operation, and frame memory for B in which picture data of Blue (B) is subjected to read/write operation.

The frame memories for respective colors are of a structure, from a theoretical point of view, such that eight DRAMs (Dynamic RAMs) in total obtained by stacking four DRAMs in a depth direction in a double line form, each having memory area of 4M bits in which, e.g., the three-dimensional relationship of length, breadth and depth is expressed as 1024 pixels × 1024 pixels × 4 bits, have memory area of 2048×2048×8 bits. Further, the frame memory 11 is of a structure, from a theoretical point of view, such that the frame memories for respective colors having the memory area of 2048×2048×8 bits are respectively stacked in order of R, G and B in the depth direction. For this reason, the frame memory 11 has a memory area of 2048×2048×24 bits.

1-4 [Configuration of thinning and contraction/expansion processing block]

Figure 5:
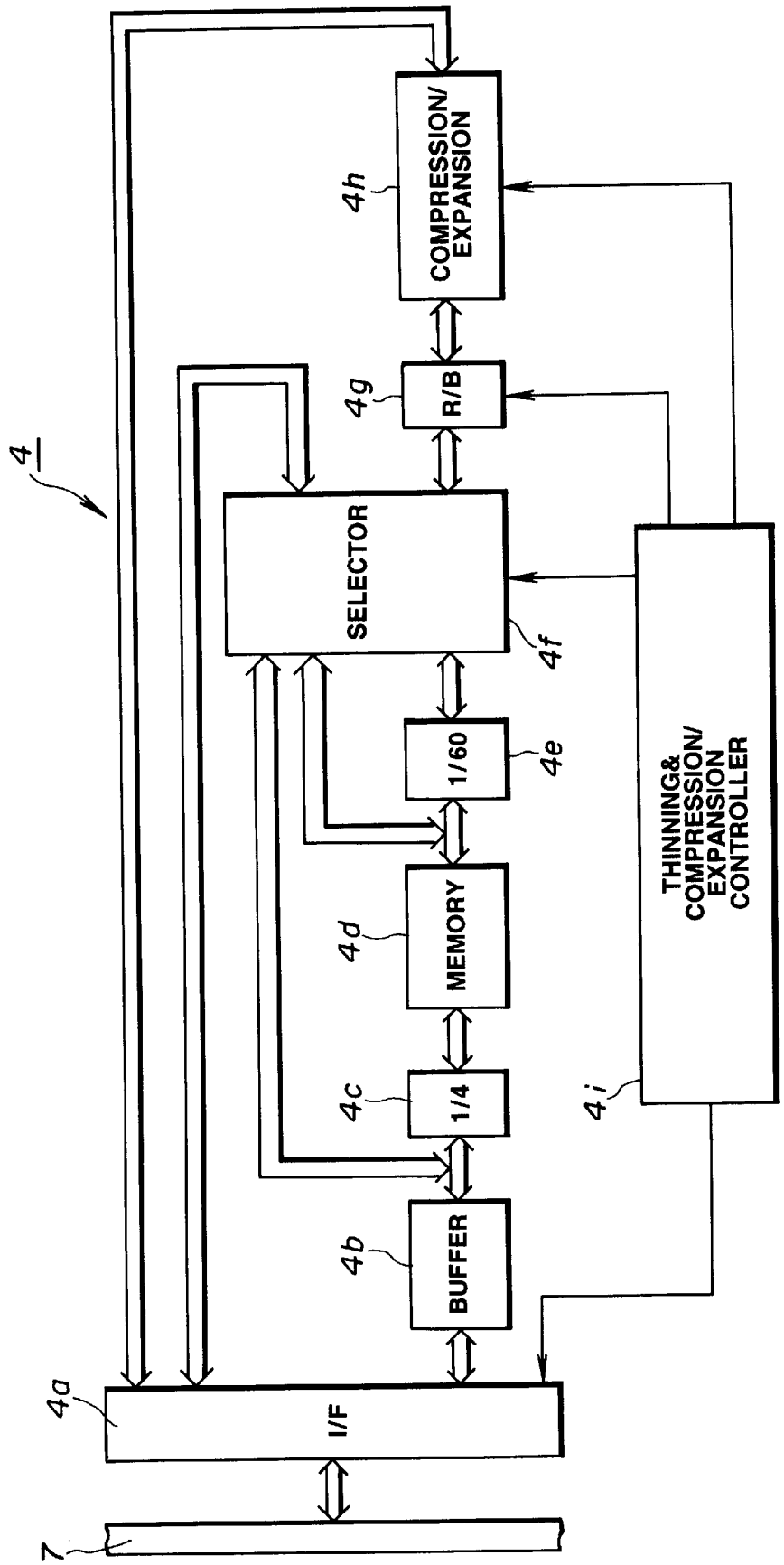
FIG. 5 is a block diagram of thinning and contraction/expansion block provided in the still picture filing system.

The thinning and contraction/expansion processing block 4 is composed, as shown in FIG. 5, of an interface 4a connected to the bus line 7, a buffer 4b for temporarily storing high resolution picture data delivered through the interface 4a, an ¼ thinning circuit 4c for allowing the high resolution picture data from the buffer 4a to undergo thinning processing into ¼ to thereby form intermediate resolution picture data, and a buffer memory (buffer) 4d for temporarily storing the intermediate resolution picture data from the ¼ thinning circuit 4c. Moreover, the thinning and contraction/expansion block 4 includes a ⅟60 thinning circuit 4e for allowing the intermediate resolution picture data which has been read out from the memory 4d to undergo thinning processing into ⅟60 to thereby form low resolution picture data, and a selector 4f for selecting any one of the high resolution picture data from the buffer 4b, the intermediate resolution picture data from the ¼ thinning circuit 4c, and the low resolution picture data from the ⅟60 thinning circuit 4e to output selected one. Further, the thinning and contraction/expansion block 4 includes a raster/block converting circuit 4g for dividing each picture data selected by the selector 4f into blocks of predetermined pixel unit suitable for compression processing, a compression/expansion circuit 4h for implementing fixed length encoding processing to the picture data blocked (divided into blocks) by the raster/block converting circuit 4g, and a thinning and contraction/expansion controller 4i for controlling the thinning and contraction/expansion processing operation at the thinning and contraction/expansion processing block 4.

1-5 [Configuration of the storage unit]

Figure 6:
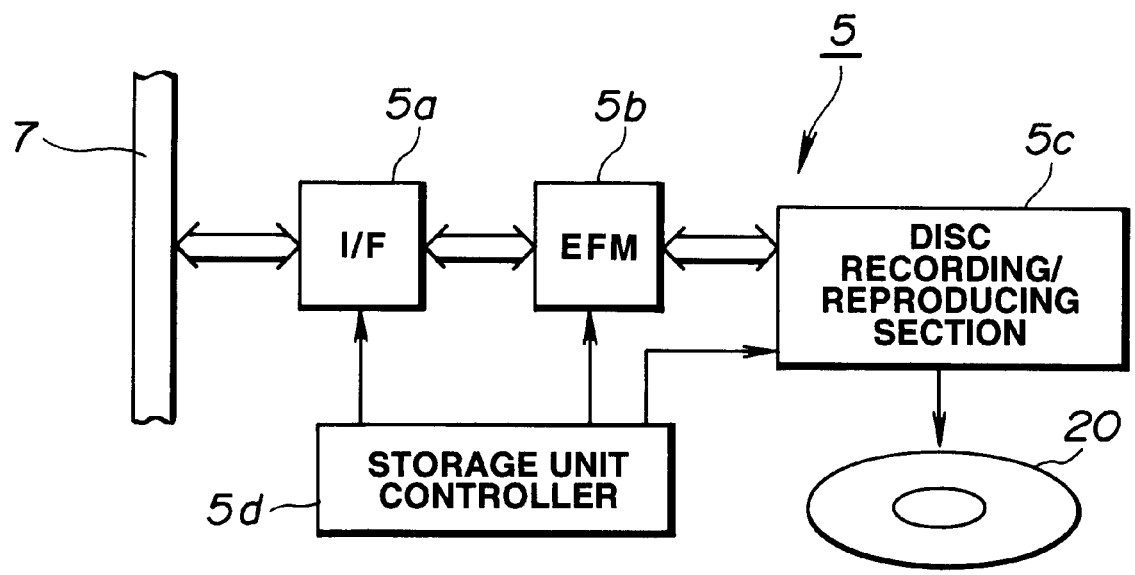
FIG. 6 is a block diagram of storage unit provided in the still picture filing system.

The storage unit 5 is composed, as shown in FIG. 6, of an interface 5a connected to the bus line 7, an EFM circuit 5b for implementing 8–14 modulation processing to picture data of respective resolutions from the thinning and compression/expansion processing block 4, a disc recording/reproduction section 5c for recording and reproducing picture data from the EFM circuit 5b with respect to the optical disc 20, and a storage unit controller 5d for controlling the operation of the entirety of the storage unit 5.

1-6 [Configuration of the video input unit]

Figure 7:
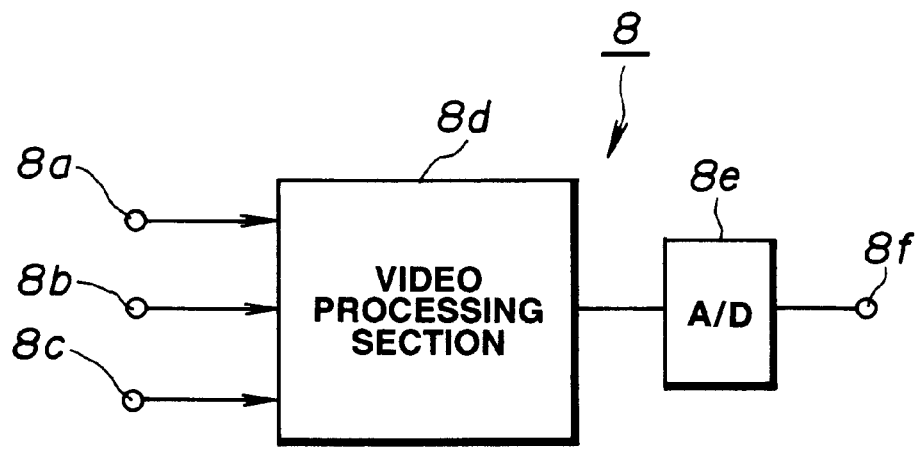
FIG. 7 is a block diagram of video input unit provided in the still picture filing system.

The video input unit 8 is composed, as shown in FIG. 7, of an input terminal 8a for composite video signal, an input terminal 8b for video signal delivered in the Y (luminance)/C (chroma) separate format (form), an input terminal 8c for video signal delivered in the RGB format, a video processing section 8d for implementing a processing to carry out conversion into picture size suitable for the still picture filing system to the video signals of respective formats delivered through the respective input terminals 8a to 8c, and an A/D converter 8e for converting the respective video signals delivered as an analog signal from the video processing section 8d into digital data to form respective picture data.

2 [Outline of the recording operation]

The first recording operation of the still picture filing system as constructed above will now be described.

Initially, in the case where desired picture data is recorded onto optical disc 20 of the storage unit 5, user operates the operation unit 10 to designate destination of taking-in of picture data (scanner unit 1 or video input unit 8), and to set destination of output of the picture data which has been taken in to the storage unit 5. Thus, the system controller 6 controls the scanner unit 1 or the video input unit 8 so that it is in operative state.

2-1 [Description of the operation of the scanner unit]

The scanner unit 1 is adapted so that it can read both pictures of reflection type manuscript and transmission type manuscript. In more practical sense, the scanner unit 1 can read, e.g., photograph of E size, photograph of L size, and photograph of A6 size as the reflection type manuscript, and can read negative film of 35 mm, or Brownie size as the transmission type manuscript. It is to be noted that the scanner unit 1 can read manuscript obtained by allowing negative film of the 35 mm, or Brownie size to undergo print at the original size.

When the film or photograph, etc. is mounted on the manuscript reading table, the scanner unit 1 reads this manuscript by scanning CCD line sensor 1a shown in FIG. 2. The CCD line sensor 1a forms a picture signal corresponding to the picture which has been read to deliver it to A/D converter 1b. The A/D converter 1b digitizes the picture signal delivered from the CCD line sensor 1a to thereby form picture data to deliver it to correction system 1c. For example, in the case where picture has been read from the 35 mm film, the correction system 1c corrects this picture data so that there is provided picture data of size (dimensions) of 1200 pixels × 1700 pixels as the size (dimensions) of length × breadth to output the corrected picture data.

Moreover, in the case where manuscripts to be read are film of Brownie size, photograph of E size, photograph of L size, and photograph of A6 size, the scanner unit 1 respectively makes corrections into picture data of sizes of 1298 pixels × 975–1875 pixels, 1050 pixels × 1450 pixels, 1120 pixels × 1575 pixels, and 1325 pixels × 1825 pixels to output corrected picture data.

2-2 [Description of the operation of the video input unit]

The video input unit 8 is adapted as shown in FIG. 7 so that, e.g., video signals of three formats of composite video signals, video signals delivered in the Y (luminance)/C (chroma) separate format, and video signals delivered in the format of RGB from video tape recorder equipment, etc. can be inputted thereto. These video signals are delivered to video processing system 8*d* through input terminals 8*a* to 8*c*, respectively.

The video processing system 8*d* changes pixels of the video signals of the respective formats into pixels of cubic lattice, and makes a change such that their pixel sizes have 480 pixels × 640 pixels to deliver them to A/D converter 8*e*. The A/D converter 8*e* digitizes the video signals to thereby form picture data corresponding to the video signals of the respective formats to output them through output terminal 8*f*.

2-3 [Description of the operation of the picture processing block]

Picture data formed by the scanner unit 1 or the video input unit 2 are high resolution picture data such that, e.g., the dimensional relationship between length and breadth is expressed as 1024 pixels × 1536 pixels, and are delivered to video memory 11*b* within frame memory 11 through input terminal 18 of the picture processing block 3 shown in FIG. 4.

The memory controller 13 is operative so that when high resolution picture data is delivered to the video memory 11*b*, it carries out write-in control and read-out control of the video memory 11*b* so as to temporarily store such picture data and to read out the stored high resolution picture data. This high resolution picture data is transferred to thinning and compression/expansion processing block 4 through data line 17, interface 15, bus line 7 and data line 16 in order, and is transferred to main memory 11*a*. The memory controller 13 carries out write-in control of the main memory 11*a* so as to temporarily store the high resolution picture data which has been transferred to the main memory 11*a*.

When the high resolution picture data is stored into the main memory 11*a*, the picture processing controller 14 controls the picture processing circuit 12 and the memory controller 13 so as to convert the high resolution picture data into, e.g., intermediate resolution picture data for monitor display of 480 pixels × 640 pixels. Thus, the high resolution picture data is read out from the main memory 11*a* by read-out control of the memory controller 13, and is delivered to the picture processing circuit 12. Then, the high resolution picture data is converted into intermediate resolution picture data by the picture processing circuit 12, and is delivered to the video memory 11*b* through the data line 16, the interface 15, the bus line 7 and the data line 17 in order. The memory controller 13 is operative so that when the intermediate resolution picture data is delivered to the video memory 11*b*, it allows the video memory 11*b* to undergo write-in control so as to temporarily store such picture data and allows the video memory 11*b* to undergo read-out control so as to read out it. Thus, the intermediate resolution picture data stored in the video memory 11*b* is read out, and is then delivered to monitor unit 9 shown in FIG. 1 through output terminal 19.

The intermediate resolution picture data delivered to the monitor unit 9 is converted into picture data in analog form by D/A converter so that a picture signal for monitor display of intermediate resolution is provided. Thus, the picture image which has been taken in by the scanner unit 1 or the video input unit 8 is displayed on the monitor unit 9.

In this example, the picture processing controller 14 shown in FIG. 4 is operative so that in the case where picture processing such as expansion processing or contraction processing, etc. of picture which has been taken in by the scanner unit 1 or the video input unit 8 as the result of the fact that the operation unit 10 is operated, it controls the picture processing circuit 12 so that the designated picture processing is implemented to the picture data which has been read out from the main memory 11*a*. The picture data to which the designated picture processing has been implemented by the picture processing circuit 12 is delivered to the monitor unit 9. Thus, picture image to which the designated picture processing has been implemented is displayed on the monitor unit 9. In addition, the picture processing controller 14 delivers data indicating picture processing implemented to the picture data (picture processing information) to the thinning and compression/expansion processing block 4 through the interface 15 and the bus line 7.

2-4 [Description of the operation of the thinning and compression/expansion processing block]

Then, user confirms by the picture image displayed on the monitor unit 9 as to whether or not corresponding picture image is desired one, whereby in the case where the corresponding picture image is desired one, user designates recording of the picture image displayed on the monitor unit 9 by operation of the operation unit 10.

The system controller 6 shown in FIG. 1 is operative so that when designation of recording is made by operation of the operation unit 10, it detects this operation to deliver data indicating that designation of the recording has been made and the picture processing information in the case where such information exists to the thinning and compression/expansion controller 4*i* of the thinning and compression/expansion processing block 4 through the bus line 7 and the interface 4*a* shown in FIG. 5.

The thinning and compression/expansion controller 4*i* is operative so that in the case where the picture processing information exists, it controls the interface 4*a* so as to temporarily store such data and to carry out taking-in of the high resolution picture data. When the high resolution picture data is taken into the thinning and compression/expansion processing block through the interface 4*a*, it is temporarily stored into the buffer 4*b*. When the high resolution picture data is stored into the buffer 4*b*, the thinning and contraction/expansion controller 4*i* allows the buffer 4*b* to undergo read-out control so as to deliver the high resolution picture data to the ¼ thinning circuit 4*c* and the selector 4*f*, e.g., every line.

The ¼ thinning circuit 4*c* implements a thinning processing such that (the number of) pixels of the higher resolution picture data is reduced to one fourth (¼) to thereby form intermediate resolution picture data of 480 pixels × 640 pixels to deliver it to the memory 4*d*. The thinning and compression/expansion controller 4*i* is operative so that when the intermediate resolution picture data is delivered to the memory 4*d*, it controls the memory 4*d* so as to temporarily store such picture data and to read out it. The intermediate resolution picture data which has been read out from the memory 4d is delivered to the 1/60 thinning circuit 4e and the selector 4f.

The 1/60 thinning circuit 4e implements a thinning processing such that (the number of) pixels of the intermediate resolution picture data which has been read out from the memory 4d is reduced to one sixtieth (1/60) to thereby form low resolution picture data of 60 pixels × 80 pixels (picture data for index) to deliver it to the selector 4f.

The selector 4f is subject to switching control by the thinning and compression/expansion controller 4i. Namely, the thinning and compression/expansion controller 4i allows the selector 4f to undergo switching control, e.g., so as to select picture data of respective resolutions delivered to the selector 4f in order of high resolution picture data, intermediate resolution picture data and low resolution picture data to output selected one. The picture data of respective resolutions from the selector 4f are delivered to the raster/block converting circuit 4g.

The raster/block converting circuit 4g divides the respective picture data into, e.g., processing block units of 8 pixels × 8 pixels which are processing unit of compression encoding to deliver them to the compression/expansion circuit 4h.

As stated above, the picture data of respective resolutions are divided into processing block units of 8 pixels × 8 pixels at the raster/block converting circuit 4g. In this case, the low resolution picture data has picture size of 60 pixels × 80 pixels. For this reason, when attempt is made to divide the low resolution picture data into processing block units of 8 pixels × 8 pixels, because the number of pixels in a longitudinal direction cannot be divided by eight (8) (60 pixels 8 pixels=7.5 pixels), it is impossible to divide the low resolution picture data in the processing block units of 8 pixels×8 pixels. From facts as described above, the raster/block converting circuit 4g is operative so that when the low resolution picture data is delivered thereto, it adds dummy data of 4 pixels×80 pixels to the upper row (line) side or the lower row (line) side of the picture data to thereby allow the low resolution picture data of 60 pixels × 80 pixels to be low resolution picture data of 64 pixels×80 pixels. By such a processing, the number of pixels in the longitudinal direction can be divided by eight (8). Thus, the raster/block converting circuit 4g divides the low resolution picture data of 64 pixels × 80 pixels into 8 processing blocks 10 processing blocks × to deliver them to the compression/expansion circuit 4h. It is to be noted that since the dummy data is eliminated in the index display, there is no possibility that pictures according to the dummy data (e.g., black pictures or white pictures) are displayed in the state added to the index picture.

The compression/expansion circuit 4h is composed of Discrete Cosine Transform circuit (DCT circuit), quantizing circuit, and fixed length encoding circuit which are not shown. Accordingly, the picture data of respective resolutions are first delivered to the DCT circuit.

The DCT circuit carries out orthogonal transform processing to transform the picture data of respective resolutions into picture data on the frequency base to form DCT coefficients, thus to deliver, to the quantizing circuit, those picture data of respective resolutions to which the orthogonal transform processing has been implemented.

The quantizing circuit carries out quantization processing of the picture data of respective resolutions by using, e.g., suitable quantization coefficients set by the system controller 6 to deliver quantized picture data to the fixed length encoding circuit.

The fixed length encoding circuit implements fixed length encoding processing to DCT coefficients of the picture data of respective resolutions quantized by the suitable quantization coefficients to feed the result of fixed length encoding processing back to the thinning and compression/expansion controller 4i. The thinning and compression/expansion controller 4i forms quantization coefficients optimum for quantizing that picture data in accordance with the result of the fixed length encoding processing to deliver them to the quantizing circuit. The quantizing circuit carries out quantization of the picture data by using the optimum quantization coefficients set for the second time to deliver it to the fixed length encoding circuit. Thus, at the fixed length encoding circuit, picture data of respective resolutions are permitted to undergo fixed length encoding so that they have predetermined data length.

In more practical sense, by such compression encoding processing, the intermediate resolution picture data is caused to undergo fixed length encoding processing so that it has data length of 2 clusters twice greater than one cluster which is one recording unit, the high resolution picture data is caused to undergo fixed length encoding processing so that it has data length of 8 clusters, and the low resolution picture data is caused to undergo fixed length encoding processing so that it has data length of 1/15 clusters. The picture data of respective resolutions which have been caused to undergo fixed length encoding in this way are delivered to the storage unit 5 shown in FIG. 6 through the interface 4a and the bus line 7. In addition, in the case where picture processing information is added to the delivered picture data as described above, the thinning and compression/expansion controller 4i delivers the picture processing information to the storage unit 5 along with the picture data of respective resolutions.

2-5 [Description of the operation of the storage unit]

Picture data of respective resolutions and picture processing information from the thinning and compression/expansion processing block 4 are delivered to the interface 5a shown in FIG. 6. The storage unit controller 5d is operative so that when the picture data of respective resolutions and the picture processing information are delivered to the interface 5a, it controls the interface 5a so as to take them into the storage unit 5. The picture data of respective resolutions and the picture processing information which have been taken into the storage unit 5 through the interface 5a are delivered to the EFM circuit 5b. When the picture data of respective resolutions and the picture processing information are delivered to the EFM circuit 5b, the storage unit controller 5d controls the EFM circuit 5b so as to implement so called EFM processing (8–14 modulation processing) to the picture data of respective resolutions and the picture processing information which have been caused to undergo fixed length encoding. The picture data of respective resolutions and the picture processing information which have been caused to undergo EFM processing are delivered to the disc recording/reproducing section 5c. When the picture data of respective resolutions and the picture processing information are delivered to the disc recording/reproduction section 5c, the storage unit controller 5d controls the disc recording/reproduction section 5c so as to record the picture data of respective resolutions and the picture processing information onto the optical disc 20. Thus, the picture data of respective resolutions and the picture processing information thereof are recorded onto the optical disc 20.

In more practical sense, the optical disc 20 is, e.g., magneto-optical disc having diameter of 64 mm, and is adapted so that picture data corresponding to 200 pictures (frames) can be rewritten any number of times every respective resolutions. Further, the picture data corresponding to 200 pictures are caused to undergo management in the state divided into four albums in total with picture data corresponding to 50 pictures being as one picture directory. Accordingly, in the case where user carries out recording of such picture data, he selects picture directory into which corresponding picture data is recorded by using the operation unit 10. Thus, the system controller 6 controls the disc recording/reproduction section 5c through the storage unit controller 5d so as to record, in order of taking-in, the picture data of respective resolutions into the picture directory selected by the user.

It is to be noted that, in this instance, the low resolution picture data are recorded as index file for index for displaying a plurality of pictures recorded in the picture directory within one picture on screen, the intermediate resolution picture data are recorded as intermediate resolution picture file for monitor display for displaying a desired one picture recorded in the picture directory, and the high resolution picture data are recorded as high resolution picture file for print for carrying out print of picture according to the high resolution picture data.

3 [Description of the format of the optical disc]

The optical disc 20 on which picture data of respective resolutions are recorded as described above has a novel picture recording format as described below.

3-1 [Cluster structure]

Recording and reproduction (playback) is carried out with respect to the optical disc 20 with "cluster" being as one unit. One cluster corresponds to, e.g., two to three rounds (circumferences) of tracks. These clusters are recorded continuously in point of time, whereby one data track is formed. The one cluster consists of the subdata area of 4 sectors (one sector is 2352 bytes) and the main data area of 32 sectors. Addresses are recorded every respective one sectors.

It is to be noted that the areas in which data are actually recorded within respective sectors are the area of 2048 bytes of the 2352 bytes, and header data by synchronization (sync) pattern or address, etc., and error correction code, etc. are recorded in the area of the remaining bytes.

In the subdata area of four (4) sectors, subdata or linking data indicating that successive data is recorded in another area in the case where the successive data is recorded in another area, etc., are recorded.

In addition, into the main data area of 32 sectors, TOC data, audio (speech) data and picture data, etc. are recorded.

3-2 [Track structure]

Figures 8A, 8B, 8C:
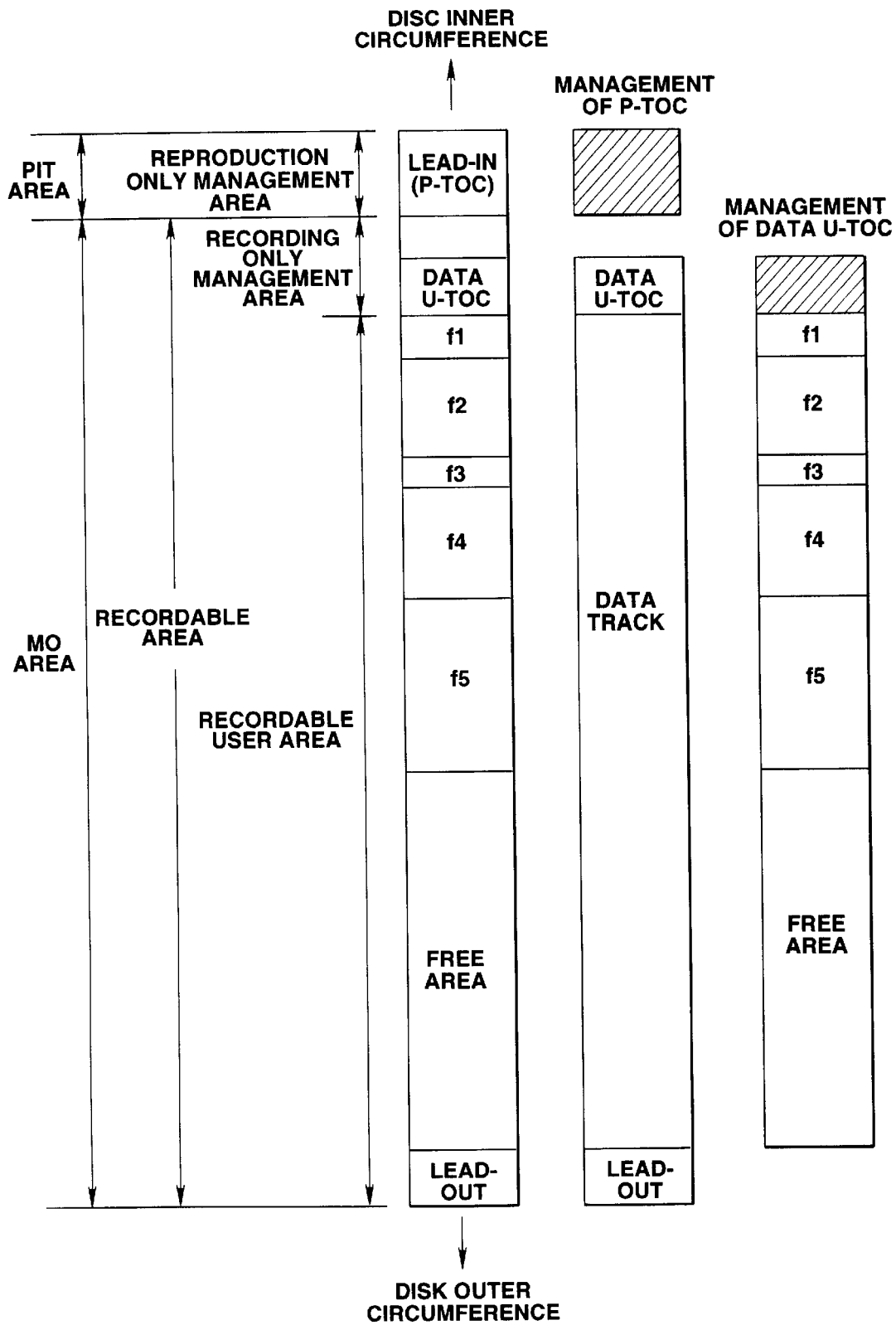
FIGS. 8(a–8(c) are a view for explaining data structure of picture data recorded on the optical disc.

The entire area of the optical disc 20 is composed, as shown in FIG. 8(a), of pit area in which data are recorded by emboss pits and magneto-optical (MO) area in which grooves are provided and data are subjected to recording/reproduction by the magneto-optical system.

The pit area is caused to serve as reproduction (playback) only management area in which P-TOC (Premastered Table Of Contents) which is management information recorded on the optical disc 20 is recorded, and P-TOC sectors which will be described later are repeatedly recorded therewithin.

The MO area is the area from immediately after the lead-in area of the disc innermost circumference side up to the termination of the lead-out area of the disc outermost circumference side. Moreover, the area from immediately after the lead-in area up to the area immediately before the lead-out area of the disc outermost circumference side of the MO area is caused to be recordable area.

The recordable area consists of recording/reproduction (playback) management area formed at the leading portion of the recordable area, and recordable user area formed from immediately after the recording/reproduction management area up to immediately before the lead-out area.

The recording/reproduction (playback) management area is adapted so that U-TOC which is TOC for management of recording/reproduction (playback) is recorded. Moreover, the area except for the U-TOC within the recording/reproduction management area is used as calibration area for carrying out trial writing in order to adjust laser power of the optical pick-up. Recording position of U-TOC within the recording/reproduction area is indicated by the P-TOC. The U-TOCs are recorded continuously by three clusters at a predetermined position within the recording/reproduction (playback) management area.

The recordable user area is of a structure in which data track where the above-described picture data of respective resolutions are recorded, and a free area caused to undergo management as recordable area (not yet recorded area) of picture data are arranged (allocated) in order respectively from the disc inner circumference side to the disc outer circumference side.

At the data track, data file including picture data indicated as "f1", "f2", . . . "f5" in FIG. 8(a), for example, and "data U-TOC" for carrying out management of the respective data files are recorded.

It is sufficient that the data U-TOC may be recorded at any position within the recordable area. In this still picture filing system, the data U-TOC is recorded immediately before data file f1 which is data file serving as the disc innermost circumferential side of the respective data files of the picture data.

Further, as shown in FIG. 8(b), the P-TOC recorded in the recording/reproduction management area carries out management of the recording/reproduction management area where the data U-TOCs are recorded and the entirety of data tracks where the above-described picture data of respective resolutions are recorded.

In addition, the data U-TOC carries out, as shown in FIG. 8(c), management, in cluster units, respective data files f1, f2 . . . f5 within the data track and free area not yet recorded block within the data track.

3-3 [Configuration of Data track]

The configuration of the data track where respective data files FL1, FL2, FL3 including the picture data and data U-TOC are recorded will now be described with reference to FIGS. 9(a–9(c). As described above, management of the data track is carried out as parts (track portion where a series of data physically continuous on the disc are recorded), and managements of respective data files recorded within data track are carried out by data U-TOC recorded within the data track.

Figures 9A, 9B, 9C:
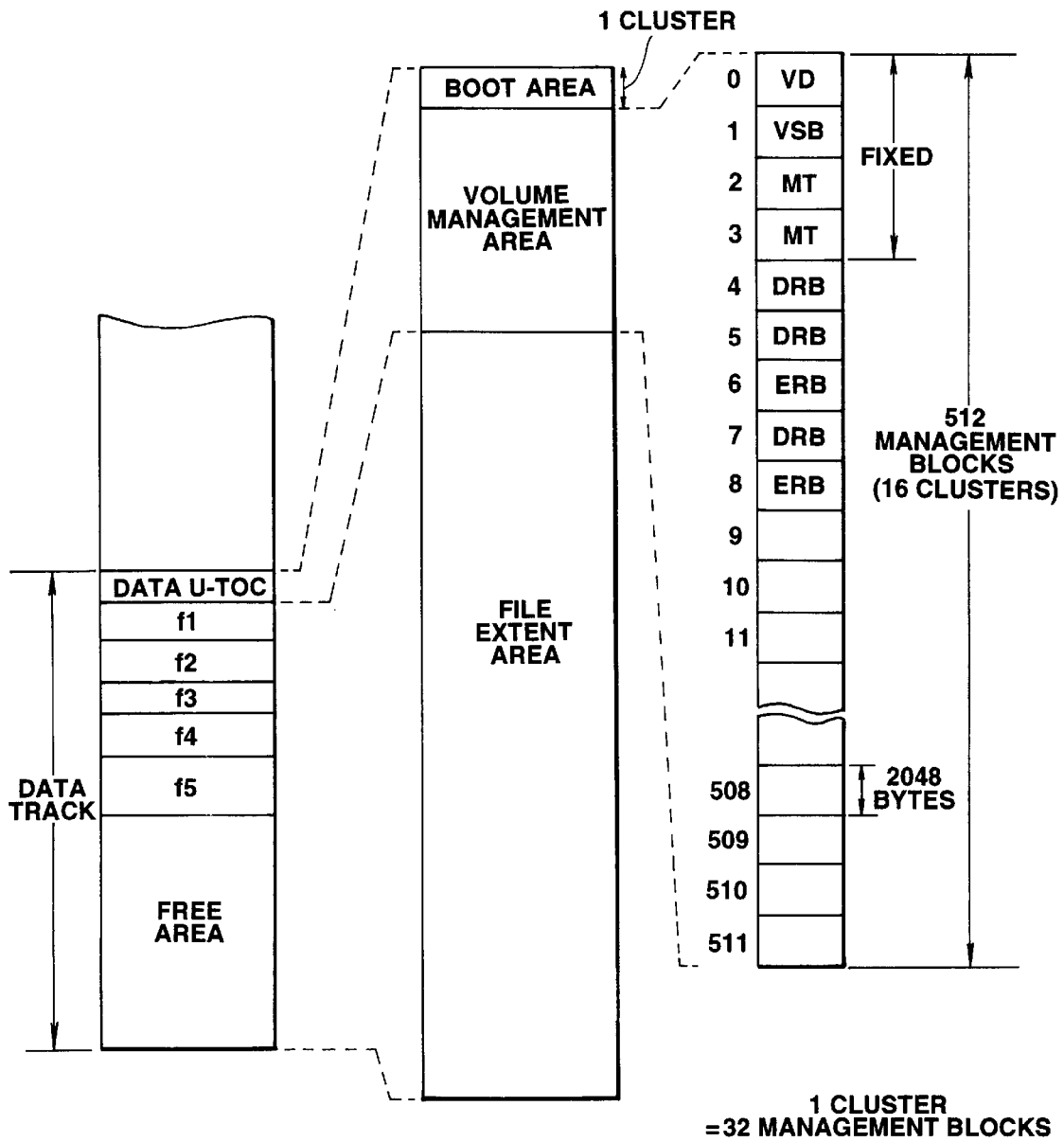
FIGS. 9(a)–9(c) are a view for explaining management block formed in data U-TOC.

As shown in FIG. 9(a), the data U-TOC is recorded at the physically leading position of the data track. Namely, data U-TOC is recorded at the position closer to the innermost disc inner circumferential side within the data track. In the case where the data track is separated into plural parts, data U-TOC is recorded at the leading portion of the parts located at the innermost disc circumferential side.

This data U-TOC consists of boot area of one (1) cluster and volume management area of sixteen (16) clusters as shown in FIG. 9(b). Moreover, the area succeeding to the data U-TOC is caused to be file extents area. In this file extents area, data files FL1 to FL3 including picture data, etc. are recorded as shown in FIG. 9(a). Moreover, data files can be further recorded in the unrecorded or not yet recorded block EB.

The volume management area consists of 512 management blocks of 0 to 511 as shown in FIG. 9(c). Data area in one management block is 2048 bytes, and respective data recorded in the management block are caused to serve as management information for recording/reproduction (playback) of the data file.

Namely, in respective 512 management blocks, block numbers of 0 to 511 are attached thereto, and the management block of the block number 0 is used as "volume descriptor VD". In this case, "volume" is unit including all parts where general data including picture data are recorded. Further, the management block of the block number 1 is used as "volume space bitmap VS", and the management blocks of the block numbers 2 and 3 are used as the management table MT2. Management block of the block number 4 and management blocks succeeding thereto are used as "directory record block DRB", and "extents record block ERB" in dependency upon use mode (form), etc. of the file extents area.

Respective management blocks of the management area have size of one logical block. (This area is the area where data are actually recorded within one sector, and consists of 2048 bytes. For example, 32 sectors become 32 logical blocks.). In the case where data is recorded into the management area and is reproduced therefrom, this logical block (management block) is caused to be minimum unit for recording/reproduction, and is caused to be management unit within the management area.

On the other hand, in the case of recording picture data into the file extents area, allocation block of one logical cluster size is caused to be minimum unit for recording/reproduction, and is caused to be management unit within the file extents area.

It is to be noted that "logical block" is unit actually used as the data recording area within one cluster and consists of 32 sectors. Moreover, "allocation block" indicates the same data unit as the logical cluster. In the case of this example, one logical cluster size is represented as one allocation block. Accordingly, the number of clusters and the number of allocation blocks on the disc are in correspondence with each other. In addition, positions of files on the disc are all designated by allocation block No. of the allocation block.

3-4 [Volume descriptor]

The leading management block in the volume management area is used as volume descriptor VD. This volume descriptor VD serves to carry out basic management of data track (volume) on the disc, and is composed, as shown in FIG. 10, of header where synchronization pattern and address is recorded and data area of 2048 bytes where various management information are recorded.

At the portion from the second byte to the sixth byte of the data area of the volume descriptor VD, character data of "PIC-MD" is recorded, e.g., by ASCII code, as identification information (ID) indicating that corresponding sector is sector of volume descriptor. Succeedingly to the identification information, version ID of this system, logical block size, logical cluster size and allocation block size are recorded.

In more practical sense, as the "logical block size", byte length indicating actual data area within the sector of the data track is recorded. The sector of the data track is 2352 bytes, and 2048 bytes thereof is allocated as the data area. For this reason, "2048" which is the byte length of the logical block is recorded as the logical block size. It is to be noted that this logical block is caused to serve as minimum recording unit for carrying out recording/reproduction within the management area.

Moreover, as the "logical cluster size", there are recorded the number of logical blocks of the logical cluster which is the cluster where management information and/or data are actually recorded. Further, one cluster is caused to consist of 36 sectors. Since 32 sectors (32 logical blocks) among these sectors are allocated for data recording. For this reason, "32" which is block length of the logical cluster is recorded as the logical cluster size.

The number of logical blocks in the allocation block is recorded as the "allocation block size". The allocation block indicates the same data unit as the logical cluster, and is the portion in which management information and/or data file are actually recorded in the data track. For example, the area of 32 sectors as the logical cluster in the volume management area or the file extents area shown in FIG. 9(b) corresponds to one allocation block. It is to be noted that this allocation block is caused to be minimum unit for recording/reproduction within the file extents area.

Subsequently to the allocation block size, the "total number of allocation blocks" indicating total number of allocation blocks within the volume is recorded. It is to be noted in the case of the so-called hybrid disc where audio data and picture data are mixed, the total number of allocation blocks including the number of allocation blocks in the pit area is recorded as the total number of allocation blocks.

Moreover, the "number of allocation blocks" is recorded subsequently to the total number of allocation blocks. This number of allocation blocks indicates total number of recordable allocation blocks, and the number of allocation blocks in the recordable area is recorded. In the case where the optical disc 20 is the premastered disc, "0" (zero) is recorded as the number of allocation blocks.

Moreover, the "number of unrecorded allocation blocks" (which have not yet been recorded) is recorded subsequently to the number of allocation blocks. The number of unrecorded allocation blocks indicates the number of allocation blocks which have not yet been recorded of the recordable allocation blocks within the volume.

Further, "the number of allocation blocks already recorded" is recorded subsequently to the number of unrecorded allocation blocks. This number of recorded allocation blocks indicates the number of allocation blocks which have been already recorded of the recordable allocation blocks within the volume.

Furthermore, the "number of defect allocation blocks" is recorded subsequently to the number of recorded allocation blocks. This number of defect allocation blocks indicates the number of allocation blocks including defect such as crack or flaw, etc. on the disc.

In addition, the "number of directories" indicating number of directories within the volume and "data file" indicating the number of data files within volume are respectively recorded subsequently to the number of defect allocation blocks.

Subsequently to the number of directories and the data file, "ID maximum value" is recorded. This ID maximum value indicates maximum value of ID numbers attached in order such that directories or data files are formed.

Subsequently to the ID maximum value, "volume attribute" is recorded. This volume attribute indicates attribute of data recorded in the volume management area. For example, volume attribute data indicating whether or not the volume management is area recorded in the mirror mode, whether or not corresponding file is invisible file (secret file), whether or not the present state is in the write protect state (protection of write), whether or not back-up is required, and the like are recorded.

Subsequently to the volume attribute, "volume management area length" is recorded. This volume management area length indicates length of the volume management area, and byte length of the volume management area is recorded.

Subsequently to the volume management area length, "volume management area position" is recorded. This volume management area position indicates the position of the volume management area on the disc, and first allocation block No. of the volume management area is recorded.

Subsequently to the volume management area position, other management blocks formed as the result of the fact that management block within the volume management area is recorded are recorded. In more practical sense, as other management blocks, "volume space bitmap position" indicating position of the first allocation block of the volume space bitmap VS, "number of volume space bitmaps" indicating the number of allocation blocks of the volume space bitmap VS, "First management table position" indicating position of the first allocation block of the management table MT, and "number of management tables" indicating the number of allocation blocks of the management table MT are recorded. Moreover, "first extent record block position" indicating position of the first allocation block of the extent record block ERB, "number of extent record blocks" indicating the number of allocation blocks of the extent record block ERB, "first directory record block position" indicating position of the first allocation block of the directory record block DRB, and "number of directory record blocks" indicating the number of allocation blocks of the directory record block are recorded.

Thus, it is possible to retrieve position of the first directory by detecting block No. of the allocation block recorded as the "first directory record block".

Subsequently to the respective management blocks, "root directory length" indicating byte length of directory and "number of root directories" indicating the number of subdirectories within the directory are respectively recorded. Subsequently thereto, various ID and character set codes, etc. are recorded. As the various ID and character set codes, e.g., boot system ID, volume ID, publisher ID, data prepare ID, application ID and character set codes of the respective ID are recorded. In addition to the above, volume formation date, volume updating date, expiring date, and effective data, etc. are recorded.

Subsequently such data area of 2048 bytes, EDC area of 4 bytes and ECC area of 276 bytes are provided. In the ECC area, P parity of 172 bytes and Q parity of 104 bytes based on the so called cross interleaving system are respectively recorded.

In this example, the data area has an area of 2048 bytes, and the area of 1024 to 2047 bytes of the data area of 2048 bytes is used as system extension area for system extension.

3-5 [Volume space bitmap]

Management block of the block No. 1 in the volume management area is used as volume space bitmap VS. This volume space bitmap VS indicates recording state of the file extents area in all allocation block units of the data track.

Figure 11:
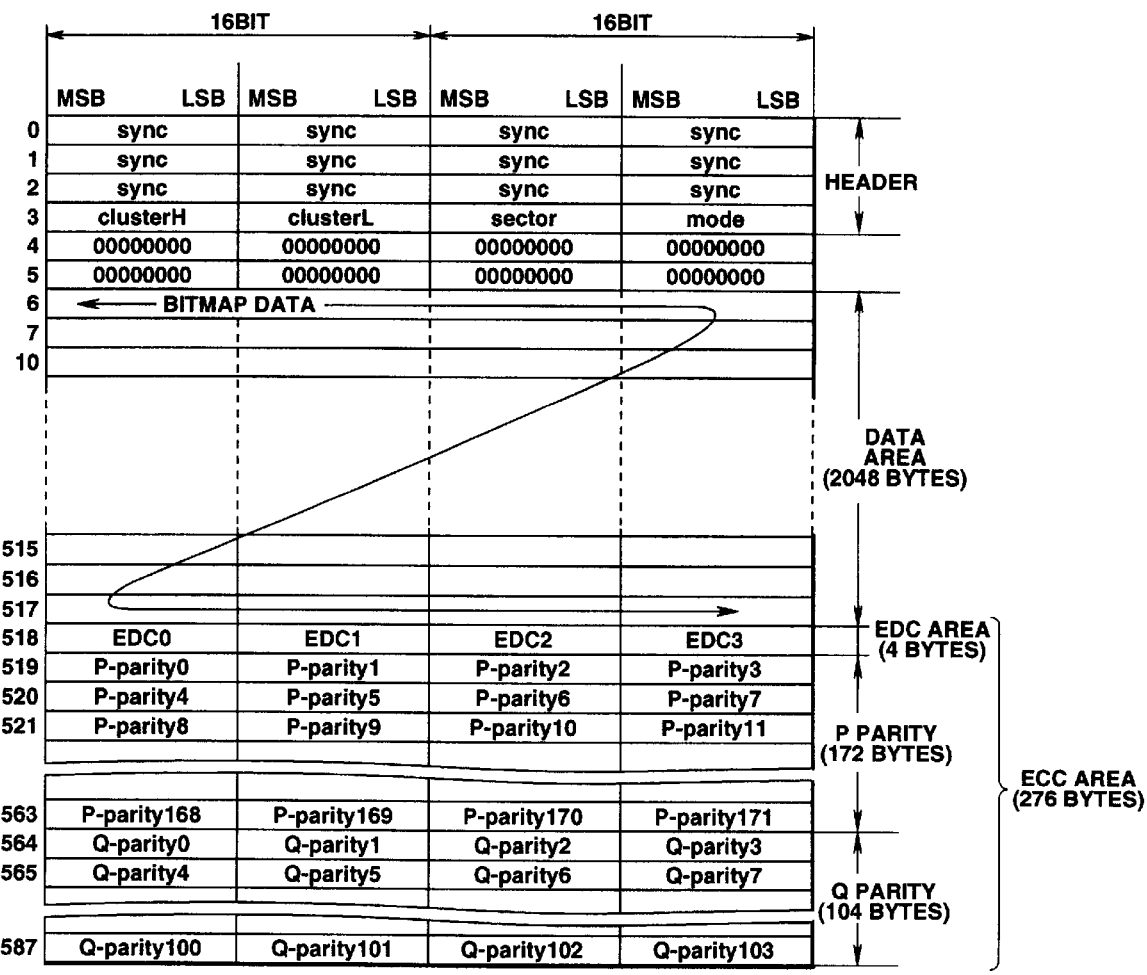
FIG. 11 is a view for explaining sector structure of volume space bitmap.

The volume space bitmap VS is composed, as shown in FIG. 11, of header in which synchronization (Sync) pattern and address are recorded, data area of 2048 bytes, and ECC area of 276 bytes in total of P parity of 172 bytes and Q parity of 104 bytes.

Allocation blocks and types of respective allocation blocks are recorded in the data area.

Figures 12A, 12B:
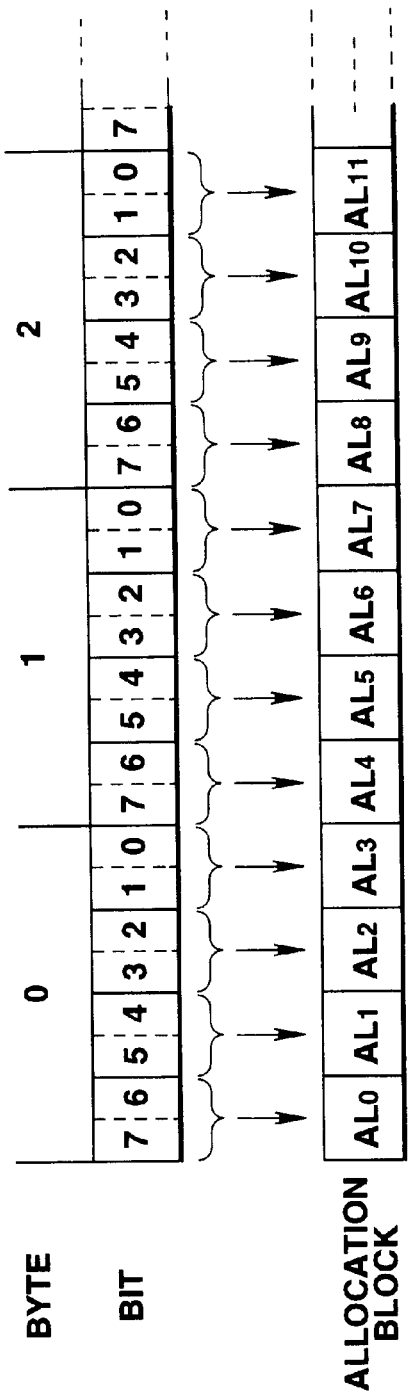
FIGS. 12(a)–12(b) are a view for explaining the configuration of allocation block.

In more practical sense, as shown in FIG. 12(a), allocation block numbers (AL0, AL1, AL2 . . . ) are respectively attached in order of number 0, number 1, number 2 to the respective allocation blocks of the data track. The seventh and sixth bits of the 0-th byte which is the first byte of the data area of the volume space bitmap VS are allocated to the allocation block AL0 of number 0. Moreover, 2 bits are respectively allocated every respective allocation blocks in such a manner that the fifth bit and the fourth bit of the 0-th byte are allocated to allocation block AL1 of the number 1, the third bit and the second bit are allocated to the allocation block AL2 of the number 2, the first bit and the 0th bit are allocated to the allocation block AL3 of the number 3, and the seventh bit and the sixth bit of the first byte are allocated to the allocation block AL4 of the number 4.

The information of 2 bits respectively allocated every respective allocation blocks indicate types of respective allocation blocks, and are as shown in FIG. 12(b) such that "00" is recorded in the case where corresponding allocation block is unrecorded or not yet recorded allocation blocks, "01" is recorded in the case where it is already recorded allocation blocks, "10" is recorded in the case where it is defect allocation blocks, and "11" is recorded in the case where it is undefined or not yet defined allocation blocks.

It is to be noted that, in the remainder area of the data area, i.e., the area in which corresponding block does not exist, "11" is recorded.

In addition, the optical disc 20 has data area of 2200 clusters so that information can be recorded in allocation blocks from AL0 up to AL8191. However, in practice, information are recorded by using allocation blocks of AL0 up to AL2199 thereof.

3-6 [Management table]

Management blocks of the block No. 2 and the block No. 3 in the volume management area are used as the management table MT.

Figure 13:
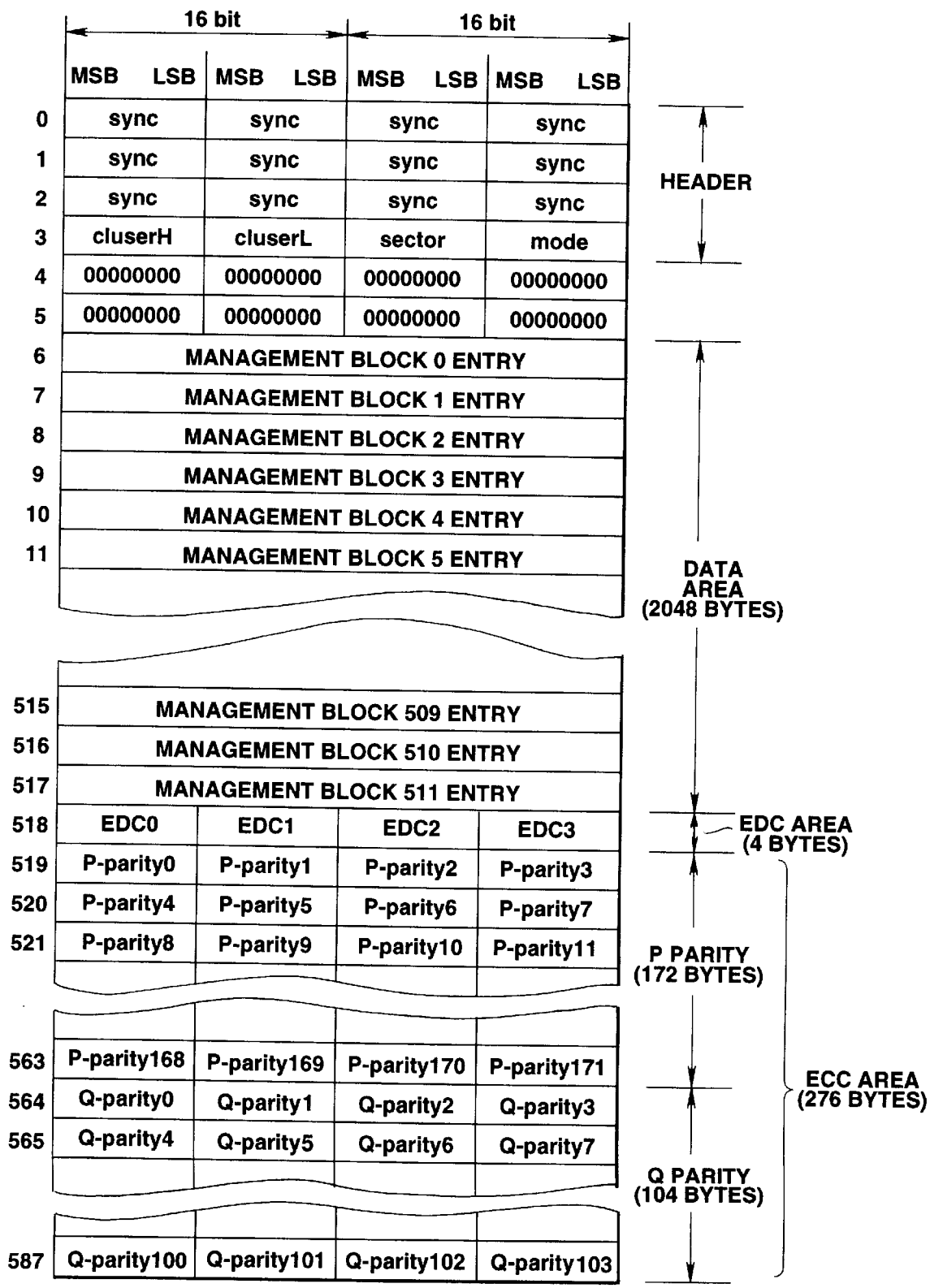
FIG. 13 is a view for explaining sector structure of management table.

This management table MT indicates use mode (form) of respective management blocks in the volume management area, and is composed, as shown in FIG. 13, of header in which synchronization pattern and address are recorded, data area of 2048 bytes, EDC area of four bytes, and ECC area of 276 bytes. In the data area of 2048 bytes, respective management block 0 entry to the management block 511 entry to which 4 bytes are respectively allocated are recorded. Thus, use contents of 512 management blocks of the volume management area are respectively indicated and are caused to undergo management.

The data content of respective entries having 4 bytes (0 entry to 511 entry) is as shown in FIGS. 14(a)–14(h).

Figure 14:
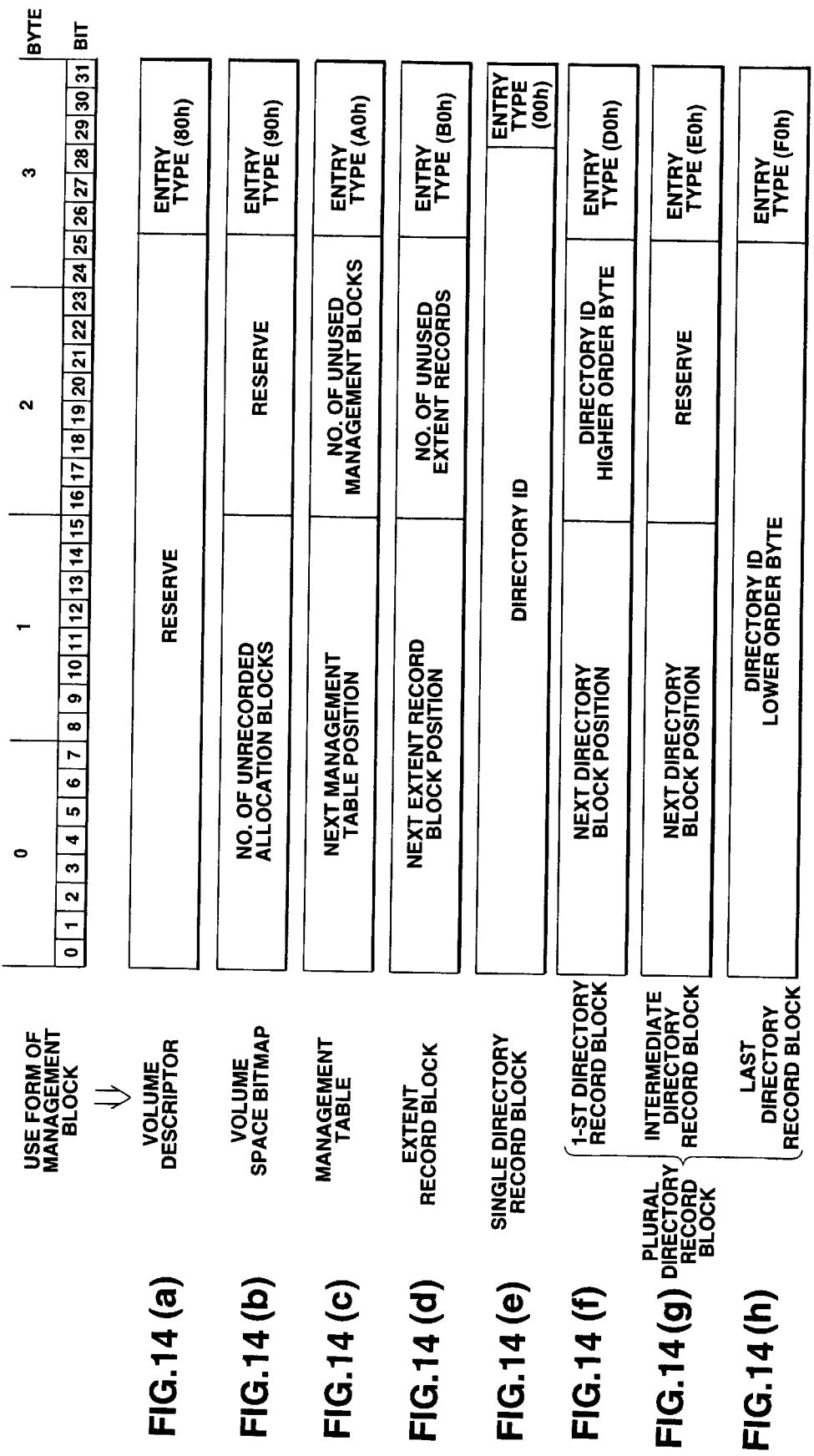
FIGS. 14(a)–14(h) are a view for explaining respective data recorded in the management table.

Initially, the first management block (management block 0) is used as the volume descriptor as shown in FIG. 14(a), and the 0-th byte to the second byte are reserved. Further, as entry type for indicating that the management block 0 entry is volume descriptor, e.g., "80h" is recorded.

Moreover, the second management block (management block 1 entry) is used as the volume space bitmap as shown in FIG. 14(b). The number of unrecorded allocation blocks is recorded in the area of the 0-th byte to the first byte, and the second byte is reserved. In addition, as entry type for indicating that the management block 1 entry is volume space bitmap, e.g., "90h" is recorded at the third byte.

In the management block used as the management table, as shown in FIG. 14(c), position of the next management table is recorded in the area of 0-th byte to the first byte, and the number of unused or not yet used management blocks is recorded at the second byte. Further, as entry type for indicating that corresponding management block is management table, e.g., "A0h" is recorded at the third byte.

In the management block used as extents record block, as shown in FIG. 14(d), position of the next extent record block is recorded in the area from the 0-th byte to the first byte, and the number of unused or not yet used extent record blocks is recorded at the second byte. In addition, as entry type for indicating that corresponding management block is extent record block, e.g., "BOh" is recorded at the third byte.

As the directory record block, there exist "single directory record block" completed by directory record unit recorded by one management block and used by itself, and "plural directory record blocks" which are used so that they are recorded in the state where directory record unit constituting single directory is divided into plural directory record blocks which are plural management blocks.

In the case where the management block is used as single directory record block, in the corresponding management block, as shown in FIG. 14(e), directory ID is recorded in the area of 0-th to 29-th bits, and, e.g., "00h" is recorded in the last 2 bits (in the area of the 30-th bit to the 31-th bit) as entry type for indicating that the corresponding management block is single directory record block.

Moreover, in the case of plural directory record blocks, information as shown in FIGS. 14(f) to 14(h) are respectively recorded in respective management blocks.

Namely, in the case where corresponding management block is "first directory record block (first directory record block)" of the plural directory blocks, as shown in FIG. 14(f), position of the next directory record block is recorded in the area from the 0-th byte to the first byte, and higher order byte of directory ID is recorded at the second byte. In addition, as entry type for indicating that corresponding management block is the first directory record block, "D0h" is recorded at the third byte.

In the case where corresponding management block is the "last directory record block" of plural directory record blocks, as shown in FIG. 14(h), lower order byte of directory ID is recorded in the area from the 0-th byte to the second, byte. In addition, as entry type for indicating that corresponding management block is the last directory record block, "F0h" is recorded at the third byte.

In the case where corresponding management block is intermediate directory record blocks of the plural directory record blocks (in the case where corresponding management block is directory record block except for the first and last directory record blocks) of plural directory record blocks, as shown in FIG. 14(g), position of the next directory record block is recorded in the area from the 0-th byte to the first bytes, and the second byte is reserved. In addition, as entry type for indicating that corresponding management block is the intermediate directory record block, "E0h" is recorded at the third byte.

3-7 [Directory record block]

Management block of the block No. 3 and management blocks succeeding (subsequent) thereto in the volume management area are used as "directory record block DRB". In the directory record block DRB, one or plural directory record units are recorded.

As the directory record unit, there are "directory record unit for directory" for constituting directory and "directory record unit for file" for designating, in correspondence with certain data file, the position thereof, etc. In the directory record block, in accordance with file and subdirectory formed within the directory, directory record unit for file and directory record unit for directory are recorded in the mixed state.

Figure 15:
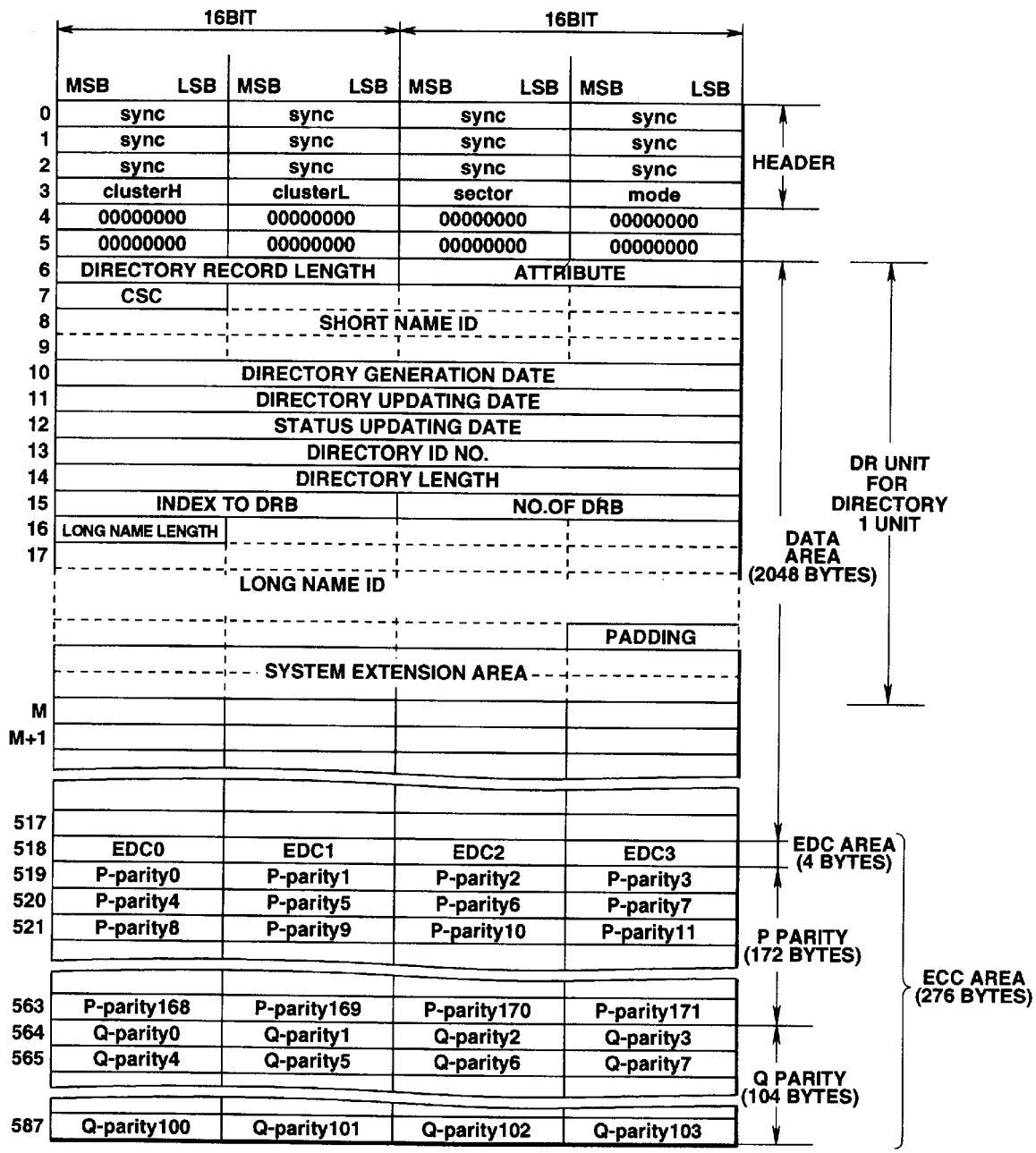
FIG. 15 is a view for explaining sector structure of directory record for directory.

The directory record block DRB in which directory record unit for directory constituting directory is recorded is composed, as shown in FIG. 15, of header in which synchronization pattern and address are recorded, data area of 2048 bytes, EDC area of 4 bytes, and ECC area of 276 bytes.

Into one directory record unit, directory record length indicating byte length of corresponding directory record unit is first recorded. The data length of one directory record unit is caused to be variable length.

Subsequently to the directory record length, attribute of directory is recorded. In more practical sense, as this attribute of directory, information indicating various attributes, such as, for example, whether or not corresponding directory record unit is directory record unit for directory, whether directory within which corresponding directory record unit is included is invisible directory or system directory, etc. are recorded. Thus, whether or not position of data file is indicated by using extents record block which will be described later is indicated.

Subsequently to the attribute of the directory, character set code (CSC) indicating character kind of the short name ID and the short name ID are recorded. The short name ID is recorded by ASCII codes of 11 bytes. Directory name of 11 characters or less can be recorded into the short name ID.

Subsequently to the short name ID, directory formation date and directory updating date are recorded, and updating date of the directory record unit is recorded as status updating date. Further, directory ID No. and directory length are recorded. Subsequently thereto, "Index to DRB" and "No. of DRB" are recorded.

The index to DRB indicates position within the volume management area in the first directory record block DRB in which the content of the designated subdirectory is recorded. For this reason, as the index to DRB, any one value of management numbers 0 to 511 is recorded.

As the No. of DRB, number of directory record blocks for indicating the designated directory is recorded by the number of management blocks.

Subsequently to the number of DRB, "long name ID" is recorded. This long name ID is variable length, and its data length is recorded. It is to be noted that while there are instances where long name ID is not recorded, "00h" is recorded as the long name ID at that time. Moreover, in the case where long name ID is even bytes, "00h" is recorded as padding for filling excess byte. Byte subsequent to the long name ID is utilized as system extension area.

Directory record unit corresponding to directory is constituted as stated above, and plural directory record units are provided within data area of 2048 bytes.

Figure 16:
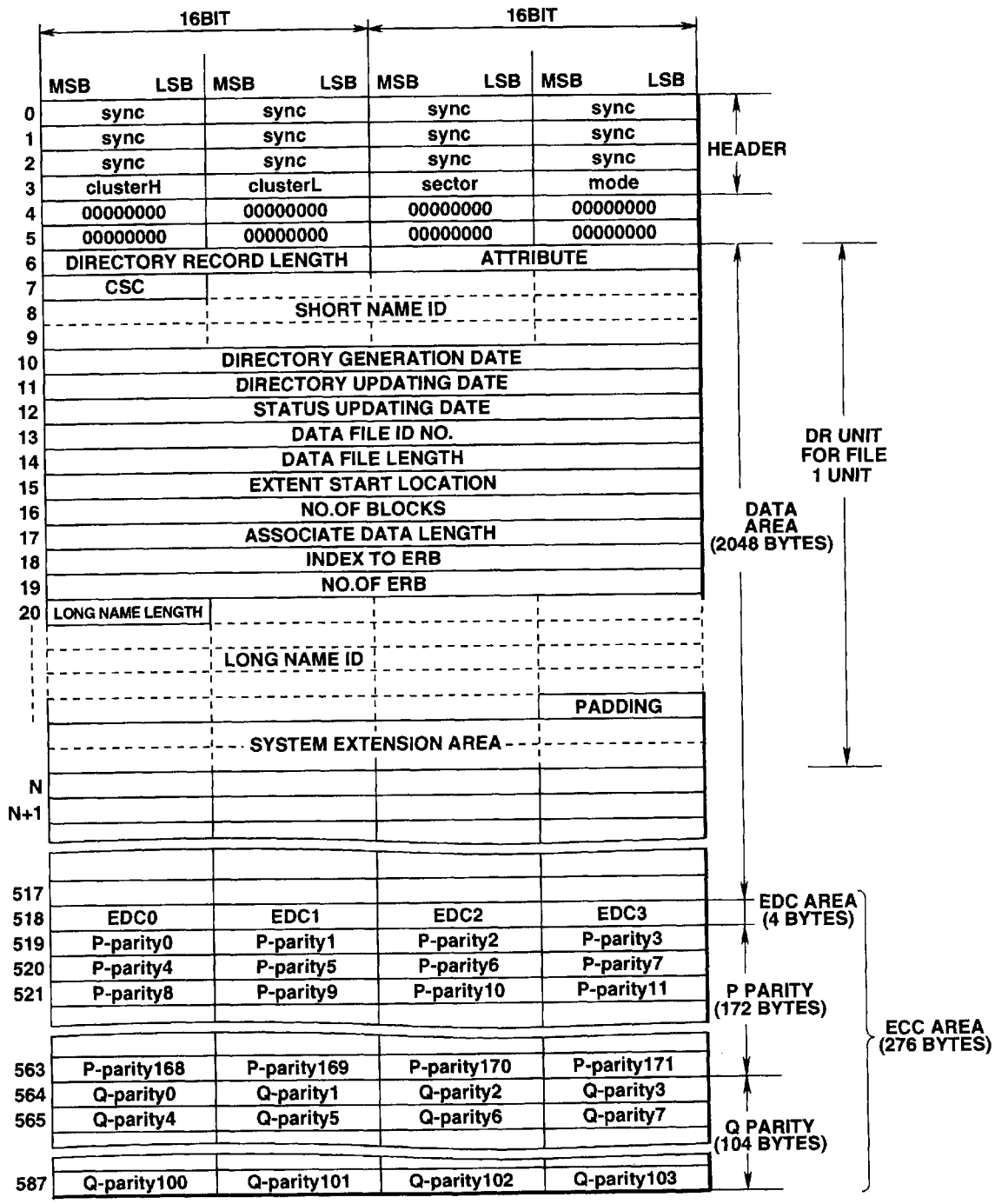
FIG. 16 is a view for explaining sector structure of directory record for file.

The directory record block DRB in which directory record unit for file corresponding to a certain data file is recorded is composed, as, shown in FIG. 16, of header consisting of synchronization pattern and address, data area of 2048 bytes, EDC area of 4 bytes, and ECC area of 276 bytes.

In the data area of 2048 bytes, one or plural directory record units respectively corresponding to data files can be recorded.

Into one directory record unit, similarly to the directory record unit shown in FIG. 15, directory record length is first recorded and attribute is subsequently recorded. By this attribute, various attributes such as whether corresponding directory record unit corresponds to directory, whether or not corresponding data file is invisible file or system file, or whether or not corresponding data file position is designated by extent record unit, etc. are indicated.

Subsequently to the attribute, similarly to the directory record unit shown in FIG. 15, character set code (CSC), short name ID for recording file name, directory formation (preparation) date, directory updating date and status updating date are recorded. As the short name ID, data file name is recorded by ASCII code of 11 characters or less.

Subsequently to the short name ID, data file ID No. and data file length, extent start location, No. of blocks, and associate data length are recorded.

This extent start location indicates position of file recorded in the file extent area by allocation block No. Moreover, No. of blocks indicates the number of allocation blocks used from the start position designated by the extent start location.

Subsequently to the associate data length, "index to ERB" and "No. of ERB" are recorded.

This index to ERB indicates position within volume management area of extents record block including data for indicating respective distributed positions of data files recorded in a distributed manner, and management block numbers of 0 to 511 are recorded.

The No. of ERB indicates the number of extents record blocks for indicating the data file recorded in distributed manner, i.e., dispersely recorded data file, and is recorded by the number of management blocks.

Subsequently to the No. of ERB, long name ID which is variable length is recorded by the data length thereof. In the case where no long name ID is recorded, "00h" is recorded as the long name ID. In the case where long name ID is even bytes, "00h" is recorded as padding for filling excess or remainder bytes.

Bytes subsequent to the long name ID are utilized as system extension area.

Directory record unit corresponding to the data file is constituted as stated above, and such plural directory record units may be provided within the data area of 2048 bytes.

In recording data file such as picture file, etc. onto the disc, there are two kinds of cases as described below. The method of designating position of data file changes in dependency upon respective cases.

The first case is the case where continuous space areas corresponding to data of picture files to be recorded can be ensured on the disc. In this case, picture file is recorded as single file in physically continuous areas. In more practical sense, in this case, recording is made so that one picture file is constituted by continuous allocation blocks. Ordinarily, position of data file is indicated by allocation block No. recorded in physically continuous areas in this way and recorded as extent start location within the directory record unit for file.

The second case is the case where continuous space areas corresponding to data of picture files to be recorded cannot be ensured on the disc. In this case, one picture file is recorded, in a divided (distributed) manner, in the areas distributed on the disc. In more practical sense, one picture file is recorded so that it is constituted by plural separate allocation blocks. In this case, position within the management area of the extents record block which will be described later is designated by the management block No. recorded as index to ERB included within the directory record unit for file, and positions of respective distributed areas are designated on the basis of data included within the extents record block.

It is to be noted that no data of index ERB is recorded in the first case, and no extent start location is recorded in the second case.

3-8 [Extent record block]

Management block of the block No. 4 and management blocks succeeding (subsequent) thereto within the volume management area can be used as extent record block ERB. This extent record block is used in the case where one picture file is recorded into distributed areas designated by separate allocation blocks as in the above-described second case. Moreover, data for indicating allocation block positions of the respective distributed areas are recorded in the extent record block ERB.

In the extent record block ERB, 64 extent record units (ER units) can be recorded at the maximum.

The ER unit consists of ER unit for index of 32 bytes and ER unit for descriptor of 32 bytes.

The ER unit for index is recorded as the leading unit of plural ER units within the extent record block ERB, and thus serves to carry out management of use state (situation) of the second ER unit and ER units succeeding thereto. The second ER unit and ER units succeeding thereto are used as ER unit for descriptor, and recording positions of respective distributed areas are indicated by allocation block number by data included within these units.

Figure 17:
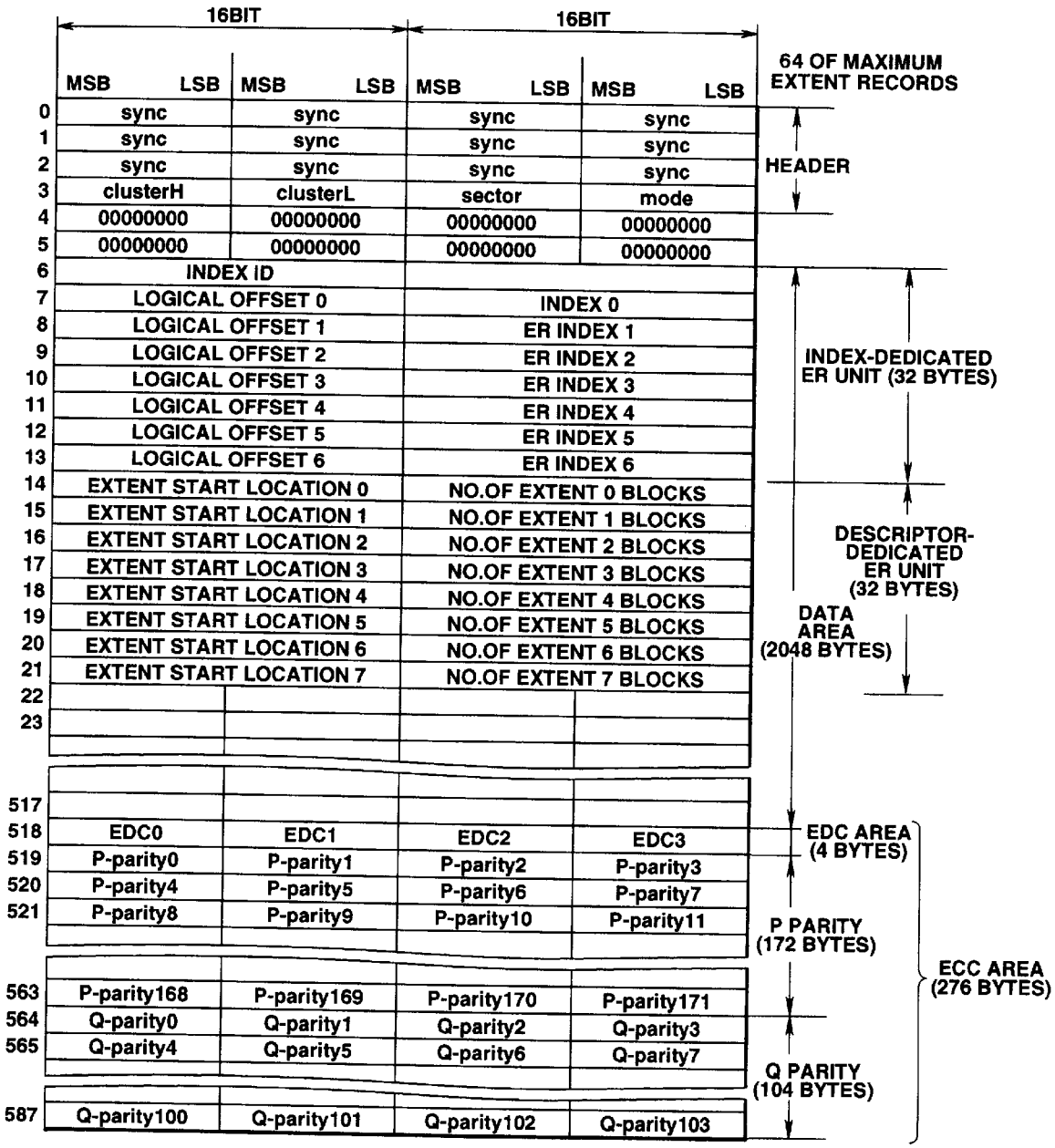
FIG. 17 is a view for explaining sector structure of extent record block.

Namely, as shown in FIG. 17, the extent record block ERB consists of header in which synchronization pattern and address are recorded, data area of 2048 bytes, EDC area of 4 bytes, and ECC area of 276 bytes.

In the data area of 2048 bytes, 64 extent record units can be recorded. In this example, one extent record unit is constituted by 32 bytes.

FIG. 17 shows the example where extent record unit of the first 32 bytes of the data area is used as extent record unit for index.

In the extent record unit for index, index ID is first recorded. In this case, as the index ID, "FFFF" indicating that corresponding extent record unit is used as extent record unit for index is recorded.

Subsequently to the index ID, maximum depth is recorded. Tree structure of extent record is formed by the extent record unit for index, and the maximum depth indicates subtree hierarchy designated by the extent record unit. For example, in the case where the extent record unit including extent descriptor is designated by extent record unit for index, (in the case of the lowest layer (level)), "0000h" is recorded as the maximum depth. Subsequently thereto, logical offsets and ER indices can be recorded by seven at the maximum.

The ER index represents data indicating which ER unit of 64 ER units recorded within the extent record block is data indicating the distributed areas. Moreover, any one of ER unit numbers of 0 to 63 is recorded in the ER index. Further, in the logical offset, data indicating that ER unit indicated by the ER index corresponds to which ER unit of ER units for constituting data file is recorded.

In the example of FIG. 17, the second ER unit and ER units succeeding (subsequent) thereto are used as ER unit for descriptor.

In the ER unit for descriptor, eight extent start locations and eight numbers of allocation blocks are recorded at the maximum.

As the extent start location, allocation block No. indicating recording position of one distributed area is recorded. Moreover, as the number of allocation blocks, data indicating the number of allocation blocks constituting corresponding distributed area is recorded. For this reason, one distributed area is designated by one extent start location and one number of allocation blocks. Accordingly, eight extent start locations and the number of allocation blocks can be recorded in one DR unit for descriptor. For this reason, eight distributed areas at the maximum can be designated by one DR unit for descriptor.

Moreover, in the case where eight distributed areas or more are designated, it is sufficient that the third ER unit is newly used as ER unit for descriptor to link ER unit for descriptor succeeding (subsequent) to the ER unit for descriptor recorded in the second ER unit and ER unit for descriptor newly recorded in the third ER unit by using the ER unit for index.

Explanation will now be given in connection with the case where positions of picture files recorded in plural distributed areas are designated by extent record block ERB in this way.

Initially, position within the management block area of extent record block ERB is designated by index to ERB recorded within the DR unit for file in the directory record block DRB. Subsequently, data of "FFFF" indicating that corresponding extent record unit is used as extent record unit for index is recorded at the leading portion of the first ER unit of ERB. For this reason, by reproducing this data, the first ER unit can be judged as ER unit for index.

Further, in order to retrieve the first ER unit constituting the data file, it is sufficient to retrieve data of logical offset expressed as "0000" to retrieve data of ER index corresponding to data of logical offset of "0000". As described above, eight distributed areas are respectively designated by eight extent start locations and the number of allocation blocks recorded in the ER unit for descriptor indicated by the data of the ER index. For this reason, positions of respective picture files distributed on the disc can be detected by data within the management area. Accordingly, there is no necessity of retrieving the disc in reading out picture file. Thus, high speed reproduction (playback) can be carried out.

4 [Description of file and the hierarchical structure of file]

As the file used in this still picture filing system, there are management file, picture file, and index picture file, etc.

Expander (Expanding Operator) of file name of the management file is "PMF". When expander of "PMF" is detected, corresponding file is discriminated as management file. As the management file, there are overall information management file (OVF_INF. PMF), picture data management file (PIC_INF. PMF), print data management file (PRT_INF. PMF), and reproduction (playback) control management file (PMS_INF. PMF), etc.

Moreover, expanders of file names of respective picture files are "PMP". When this expander of "PMP" is detected, corresponding file is discriminated as picture file. As the picture file, there are high resolution picture file for recording high resolution picture data HD, and intermediate resolution picture file for recording intermediate resolution picture data SD.

Figure 18A:
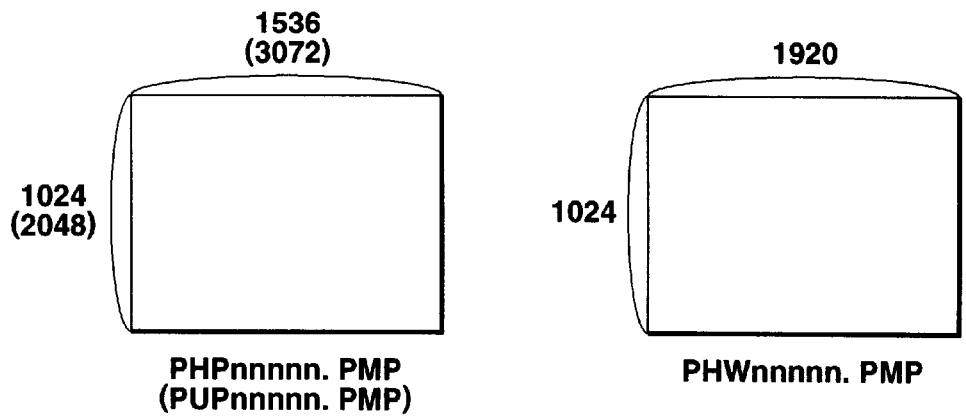
FIGS. 18(a–18(c) are a view for explaining respective resolutions of picture data in the still picture filing system.

As the high resolution picture file, as shown in FIG. 18(a), there are "PHPnnnnn. PMP file" having picture data of 1536 pixels × 1024 pixels of aspect ratio of 3:2, and "PHWnnnnn. PMP file" having picture data of 1920 pixels × 1080 pixels of aspect ratio of 16:9. Moreover, as file for recording ultra (super) high resolution picture data UD as one of high resolution picture files, there is "PUPnnnnn. PMP file" having picture data of 3072 pixels×2048 pixels of aspect ratio of 3:2.

Figure 18B:
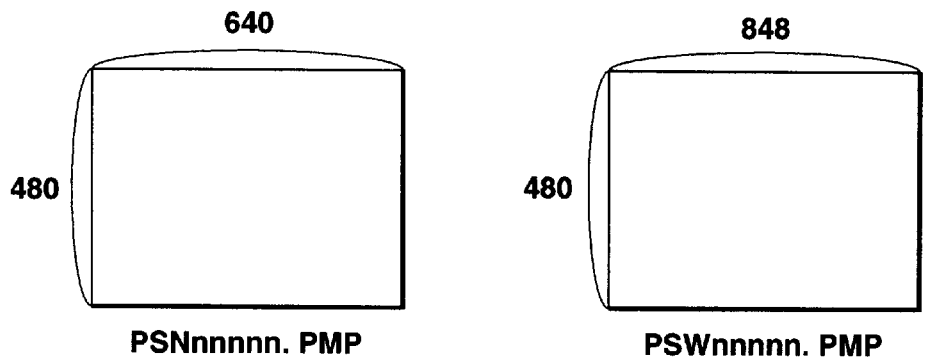

As the intermediate resolution picture file, as shown in FIG. 18(b), there are "PSNnnnnn. PMP file" having picture data of 640 pixels × 480 pixels of aspect ratio of 4:3 and "PSWnnnnn. PMP file" having picture data of 848 pixels × 480 pixels of aspect ratio of 16:9.

It is to be noted that with respect to the file name of the picture file in which the expander is caused to be "PMP", the leading three characters (e.g., PHP, etc.) are determined by kind of picture, and five characters (nnnnn) succeeding (subsequent) thereto are determined by picture numbers given in order of formation (preparation) of picture files.

Figure 18C:
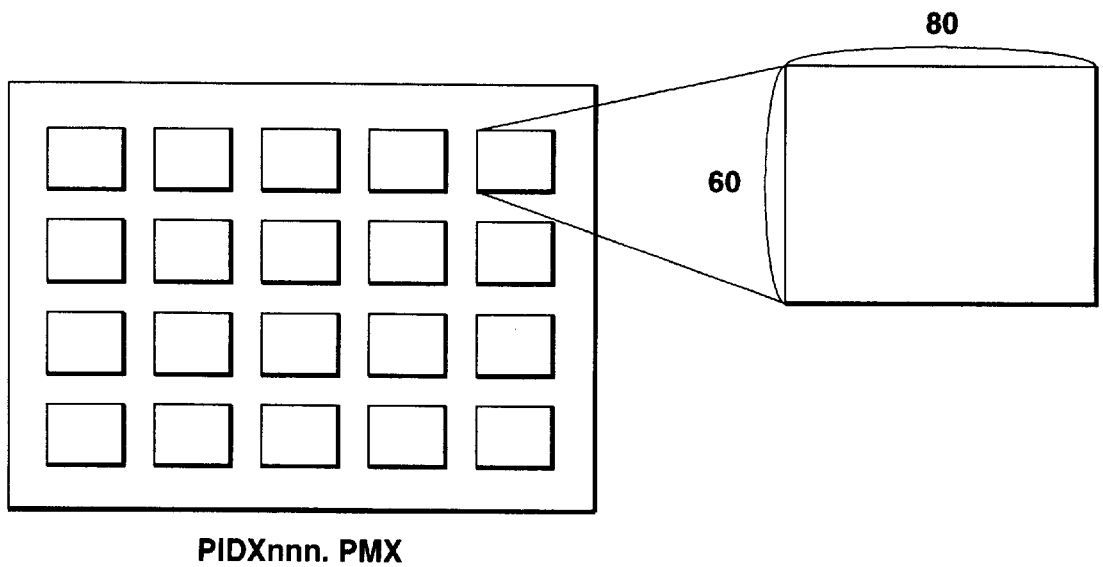

Moreover, expander of the index picture file used in this still picture filing system is caused to be PMX. When it is detected that expander is PMX, corresponding file can be discriminated as index picture file. The file name of the index picture file is designated by PIDX nnn. PMX. As shown in FIG. 18(c), 25 lower resolution picture data are contained (included) as index picture data within the index picture file. One low resolution picture data consists of 60 pixels×80 pixels generated by allowing the intermediate resolution picture data of 640 pixels × 480 pixels to undergo thinning into 1/80 so that the data rate is reduced.

Figure 19:
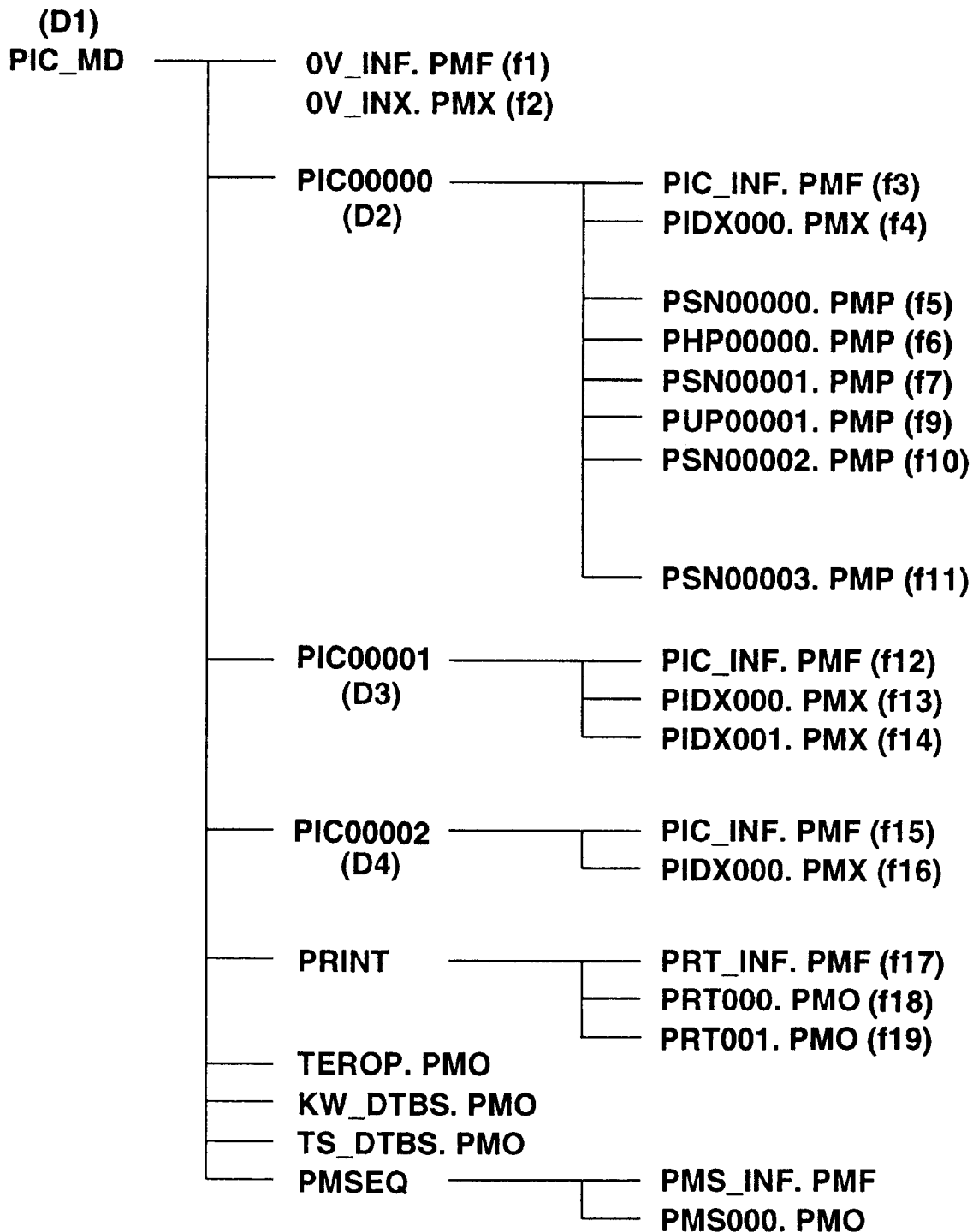
FIG. 19 is a view for explaining hierarchical directory structure for carrying out management of picture data every respective resolutions in the still picture filing system.

This still picture filing system carries out management of picture data recorded on the optical disc 20 by the hierarchical directory structure. This hierarchical directory structure is as shown in FIG. 19, wherein directory D1 (PIC_MD) for recording picture data is provided, and file management is carried out therewithin.

There are provided, within the directory D1, overall information management file f1 (OV_INF. PMF) for carrying out management of the entire information, overall index file f2 (OV_IDX. PMX) for carrying out management of the entire index file, and respective picture directories D2 to D4 (PIC00000 to PIC00002).

In this example, as the picture directory, respective picture directories (PIC00000) to (PIC00002) of directory numbers of "00000" to "00002" are provided. Five characters subsequent to "PIC" of respective picture directories are given as directory numbers in order of formation of respective picture directories. Thus, picture directory name is indicated.

Moreover, there are provided, within the directory (PIC_MD), print directory (PRINT) for carrying out management of print control data such as hue (tint) of print, print size, and rotation, etc., Telop directory (TERO. PMO) for carrying out management of Telop such as title (caption), etc. of picture subjected to monitor display, key word retrieval directory (KW_DTBS. PMO) attached to picture numbers of respective pictures or the respective pictures, time stamp directory (TS_DTBS. PMO) for carrying out management of recording date, etc. of picture, and reproduction (playback) control directory (PMSEQ) for carrying out management of a program reproduction such that only designated picture is reproduced.

In the picture directory D2 (PIC00000), picture data management file f3 (PIC_INF. PMF) for carrying out management of plural picture files designated by directory No. of "00000", and picture index file f4 (PIDX000. PMX) in which index pictures of the corresponding picture directory D2 are collected are recorded. Moreover, in the picture directory D2, intermediate resolution picture file f5 (PSN00000. PMP) and high resolution picture file f6 (PHP00000. PMP) formed on the basis of picture data designated by "00000" of picture number are recorded. Further, intermediate resolution picture file f7 (PSN00001. PMP) and ultra high resolution picture file f9 (PUP00001. PMP) formed on the basis of picture file data designated by picture number of "00001" are recorded. In addition, intermediate resolution picture file f10 (PSN0002. PMP) formed on the basis of picture data designated by picture number of "00002" and intermediate resolution picture file f11 (PSN0003. PMP) formed on the basis of picture data designated by picture number of "00003" are recorded.

In the picture directory (PIC00001) designated by "00001" of directory number, the above-described picture data management file (PIC_INF. PMF) and two index files (PIDX000. PMX, PIDX001. PMX) for carrying out management of index pictures of the respective pictures are recorded. It is to be noted that index picture corresponding to picture file recorded in the picture directory (PIC00001) is caused to undergo management by the two picture index files, and these two index files are used formally in the state where they are linked with each other.

In the print directory (PRINT), print data management file (PRT_INF. PMF) for carrying out management of plural print data files and print data file (PRT000. PM0 to PRT nnn. PM0) caused to undergo management by the print data management file are recorded.

In the reproduction (playback) control directory (PMSEQ), reproduction control management file (PMS__INF. PMF) for carrying out management of reproduction control data file recorded in the reproduction control directory (PMSEQ) and plural reproduction control data files (PMS000. PM0 to PMS nnn. PM0) for controlling the picture sequence are recorded.

As has been explained with reference to the FIG. 9(c) mentioned above, block numbers of 0 to 511 are attached to the management blocks, and volume descriptor VD, volume space bitmap VSB, management table MT, management table MT, directory record block DRB, directory record block DRB, extents record block ERB, directory record block DRB, extents record block ERB . . . are allocated in order from the block No. 0.

The directory record block DRB for indicating directory DI (PIC_MD) is adapted so that it can be discriminated by data of the volume descriptor VD that this block is the fourth block of the management block.

Namely, in FIG. 20, in the directory record block DRB recorded in the fourth block of the management block, two DR units for file for indicating recording positions of the overall information management file f1 and the overall index file f2 shown in FIG. 19 mentioned above are provided succeedingly (subsequently) to the header.

The DR unit for file recorded in the first unit indicates allocation block position of the overall information management file f1 by the allocation block No. recorded as Extent Start Location. Moreover, the DR unit for file recorded in the second unit indicates allocation block position of the overall index file f2 by the allocation block No. recorded as Extent Start Location.

It is to be noted that since the overall information management file f1 and the overall index file f2 are recorded in allocation blocks continuous on the optical disc 20, they are not recorded in Index to ERB.

In the third and fourth units which are the units succeeding to the two DR unit for file, two DR units for directory for indicating recording positions of picture directory D2 indicated by the directory No. of "00000" and picture directory D3 indicated by the directory No. of "00001" are provided.

In more practical sense, in this DR unit for directory, relative position within the management block of DRB corresponding to picture directory D2 is indicated by management block numbers of 0 to 511 recorded as "Index to DRB". In this example, in data of "Index to DRB" in the DR unit for directory of the third unit, "005" is recorded as data indicating block position within the management block of index to DRB of the picture directory D2. Similarly, in data of Index to DRB of DR unit for directory of the fourth unit, "007" is recorded as data indicating block position within the management block of index to DRB of the picture directory D3.

As described above, block position of index to DRB of the fifth block of the management block is designated by DR unit for directory which is the third unit in index to DRB of the fourth block of the management block.

Index to DRB of the fifth block is a block in which data relating to picture directory D2 is recorded. In this DRB, eight DR units for file are provided succeedingly (subsequently) to the header. In seven DR units for file of the first to seventh units, data for indicating recording positions of picture data management file f3, picture index file f4, intermediate resolution picture data file f5, high resolution picture data file f6, intermediate resolution picture data file f7, ultra high resolution picture data file f9, and intermediate resolution picture data file f10 are respectively recorded. Similarly to the above-described DR unit for file, in respective DR units for file, recording positions of the picture data management file f3, the picture index file f4, the intermediate resolution picture data file f5, the high resolution picture data file f6 and the intermediate resolution picture data file f7 are respectively indicated by allocation block numbers recorded as Extent Start Location.

In the DR unit for file provided at the seventh unit, data for indicating recording position of the ultra high resolution picture data file f9 is recorded. This ultra high resolution picture data file is recorded into areas continuous by data length of, e.g., 18 clusters. In the case where continuous space areas corresponding to 18 clusters do not exist on the optical disc 20, this ultra high resolution picture file is recorded in the state distributed into allocation blocks which are not continuous. In the case where one file is recorded in the distributed state in this way, an approach is adopted such that, with respect to data of extent start location of the DR unit for file, extent record block ERB is provided between directory record block DRB and picture file f9 to be designated without directly designating respective distributed areas of the file thus to designate positions of respective distributed areas of picture file by data of the extent record block ERB.

As has been explained with reference to the FIG. 17 mentioned above, four extent record units (ER units) are provided succeedingly (subsequently) to the header. In this example, 64 ER units can be provided at the maximum.

The first ER unit is used as ER unit for index and the second and third ER units are used as ER unit for descriptor. In the ER unit for index, index data relating to the second ER unit and ER units succeeding thereto are recorded. Moreover, in the ER unit for index, data of ER index and logical offset are recorded by the number of ER units used are recorded.

The ER index is data indicating which any one of 64 ER units exists, and is indicated by any one of ER unit Nos. of 0 to 63.

Moreover, the logical offset is data indicating that ER unit indicated by ER index is data indicating which any of ER units that constitute one file.

In the ER unit for descriptor, eight Extent Start positions and eight numbers of Extent blocks can be respectively recorded.

The extent start position is data for indicating start position of the distributed area, and is represented by allocation block No. Moreover, the number of Extent blocks is data for indicating data length of the distributed area, and is represented by the number of allocation blocks. For this reason, it is possible to designate eight distributed areas on the basis of data of Extent start position and the number of Extent blocks by one ER unit for descriptor.

Figure 21:
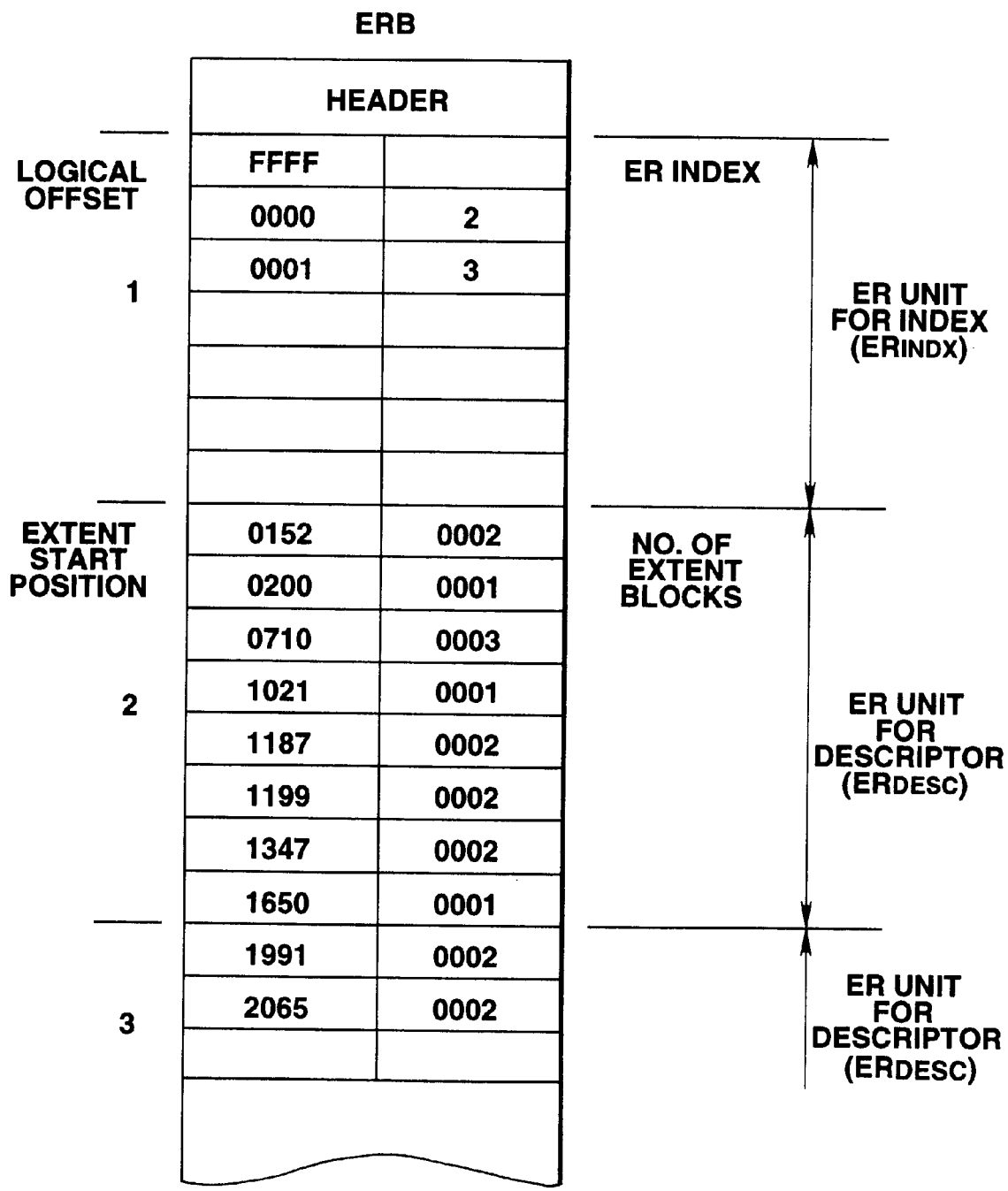
FIG. 21 is a view for explaining the configuration of ERB constituting the management block.

Namely, as shown in FIG. 21, data of "FFFF" indicating ER unit for index is recorded at the leading portion of the first ER unit. In order to retrieve the first ER unit constituting data of the ultra high resolution picture data file f9, it is sufficient to retrieve the portion where data of logical offset is expressed as "0000". Since "2" is recorded as data of ER index corresponding to "0000" of logical offset in the ER unit for index, it is possible to detect that the second ER unit is the first ER unit constituting data of the file f9.

When reference is made to the second ER unit (ER unit for descriptor), it is seen that the start position of the first divisional area of the file f9 is "0152" in terms of the allocation No., and data length of the first divisional area is "0002" in terms of the number of allocation blocks. Similarly, in the ER unit for descriptor, data relating to the second divisional area to the eighth divisional area are recorded in succession.

Then, "0001" which is the next data of the logical offset "0000" in the index for index is retrieved as data subsequent to the ER unit for descriptor which is the second ER record. Since data of the ER index in which logical offset is expressed as "0001" is recorded as "3", it is indicated that the third ER unit exists as data continuous to the second ER unit.

When reference is made to the third ER unit (ER unit for descriptor), allocation block Nos. indicating start positions of the ninth distributed area and the tenth distributed area and the number of allocation blocks indicating data length are respectively recorded.

As stated above, respective allocation block positions of distributed areas distributed into 10 areas are indicated by the ER unit for descriptor of extent record block ERB. For this reason, even in the case where one file is recorded in distributed manner, it is possible to grasp positions of respective distributed areas within the management block having extent record block ERB. For this reason, also in the case where distributed respective areas are continuously reproduced from the optical disc 20 as one file, there is no necessity of respectively retrieving, on the disc, respective distributed areas on the disc. Thus, high speed reproduction (playback) can be made.

It is to be noted that such distribution recording of picture file is not limited to the time of recording of the above-described ultra high resolution picture file, but may be carried out also in the case where the unrecorded (not yet recorded) area on the disc is reduced as the result of the fact that recording of picture file is repeated, so continuous space areas corresponding predetermined number of clusters corresponding to picture files of respective resolutions cannot be ensured.

5 [Configuration of file]

The respective files consist of header and data body. Start address of the data body is prescribed (provided) by the header. The data body starts from, e.g., address of multiple of 4. With respect to data of 2 bytes or more, preference is given to higher order byte. Moreover, the data size is caused to be multiple of 4 except for respective picture data which have been caused to fixed length encoding (including dummy data of 00h added when the above-described low resolution picture data is subjected to raster/block conversion), and character train is terminated with null data (00h). It is to be noted that there may be employed a configuration in which space area is provided between the header and the data body.

5-1 [Configuration of the header]

The header consists of a plurality of tables. "Format table" indicating what corresponding file is allocated to the leading portion, and option tables such as the picture processing information, etc. are allocated in an arbitrary order. The respective tables are started from, e.g., address of multiple of 4, and the interval between the table and the next table is 256 bytes or less. It is to be noted that there may be employed a configuration in which space data exists between the table and the next table.

In more practical sense, as kind of the table, there exist format table (10h), name table (11h), comment table (12h), disc ID table (14h), picture parameter table (20h), recording information table (21h), color management parameter table (22h), and option table (90h), etc. (symbol within the parenthesis is identification symbol (ID) of each table).

5-2 [Format table]

The format table consists, as shown in FIG. 22, of table ID (1 byte), next table pointer (1 byte), format version (2 bytes), file form (1 byte), file form version (1 byte), the number of all tables (1 byte), space area (reserved: 1 byte), data start address (4 bytes), data size (4 bytes), and space area (reserved: 4 bytes). They are all recorded in binary (B) data form.

Moreover, as "file form" recorded by 1 byte, the above-described overall information management file is recorded by "00h", the picture data management file is recorded by "01h", the print data management file is recorded by "03h", the reproduction control management file is recorded by "05h", the picture data file is recorded by "10h", the overall index file is recorded by "11h", and the picture index file is recorded by "12h". In addition, the print data file is recorded by "30h", Telop data file is recorded by "32h", the key word retrieval data file is recorded by "33h", the time stamp retrieval data file is recorded by "34h", and the reproduction control data file is recorded by "35h".

5-3 [Picture parameter table]

This picture parameter table is recorded into the headers of respective picture files for recording high resolution picture data and intermediate resolution picture file data, and the picture processing information relating to the original picture data which provide basis of the high resolution picture data and the intermediate resolution picture data are recorded as parameter.

In this still picture filing system, high resolution picture data and intermediate resolution picture data are formed on the basis of original picture data taken from scanner, etc., and are recorded as high resolution picture file and intermediate resolution picture file. However, since the original picture itself is not recorded on the disc by any means, there is no possibility that the original picture data is left. However, it is possible to recognize, on the basis of data of the picture parameter table recorded in the header of the picture file, how the original picture which provides basis of the high resolution picture data is recorded, and how it is processed so that high resolution picture data and intermediate resolution picture data are formed. Accordingly, in order to allow information relating to the original picture data to be left, data of these picture parameter tables are recorded into the header of the picture file along with the picture data, and are not caused to undergo rewrite operation.

In the picture parameter table, as shown in FIG. 23, table ID of 1 byte, next table pointer of 1 byte, picture size (lateral size) of 2 bytes, picture size (longitudinal size) of 2 bytes, picture component of 1 byte, length and breadth discrimination of 1 byte, wide ID of 1 byte, compression rate of corresponding picture data of 1 byte, copyright/editorial right information of 1 byte, and input equipment ID information of 1 byte are recorded. In addition, space area (reserved) of 3 bytes and information indicating presence or absence of the dummy data of 1 byte, etc. are recorded.

The "Picture size" is information indicating size of the number of pixels of picture. Moreover, the "Picture component" is such that "00h" is recorded in the case where the ratio between luminance (Y), color difference (Cr) and color difference (Cb) is 4:2:0, "01h" is recorded in the case of orthogonal case of 4:2:0, "10h" is recorded in the case of 4:2:2 and "20h" is recorded in the case of orthogonal of 4:2:2. It is to be noted that "orthogonal" indicates that Y data and C data of the leading portion are in correspondence with each other.

Moreover, the "length and breadth discrimination" is rotation information (in counterclockwise direction) for displaying picture, and is such that "00h" is recorded in the case of ordinary lateral display, "01h" is recorded in the case of the longitudinal display rotated by 90 degrees with respect to the lateral display, "02h" is recorded in the case of lateral display rotated by 180 degrees with respect to the lateral display, and "03h" is recorded in the case of longitudinal display rotated by 270 degrees with respect to the lateral display. Additionally, "FFh" is undefined at present.

These respective information are all reproduced so that they can be displayed. For this reason, user displays this picture parameter table on monitor unit 9, thereby making it possible to recognize, with ease, parameters of corresponding picture.

5-4 [Overall information management file]

The overall information management file is management file for synthetically carrying out management of all data files recorded in the directory (PIC_MD).

The overall information management file consists of header and data body as shown in FIG. 24(a). In the header, format table (10h), name table (11h), comment table (12h), disc ID table (14h), and option table (90h) are recorded as described above. In the data body, total number of pictures of 2 bytes, next picture directory No. of 2 bytes, total number of picture directories of 2 bytes, information indicating presence or absence of reproduction control directory of 1 byte, the number of reproduction control files of 1 byte, the number of print data files of 1 byte, and information indicating presence or absence of Telop data file of 1 byte are recorded. In addition, information indicating presence or absence of retrieval information file of 1 byte, automatic starting file No. of 1 byte, last access picture directory No. of 2 bytes, last access picture No. of 2 bytes, pass word of 8 bytes, narration language information of 6 bytes, space area (reserved) of 2 bytes, and picture directory information unit of 48 bytes are recorded by N (N is the number of picture directories). It is to be noted that these respective information are all recorded in binary data form.

The "Total number of pixels" is information indicating the total number of pixels of picture of ordinary resolution (intermediate resolution picture data) of aspect ratio of 3:4, "Next picture directory No." is information in which 1 is added to the last No. of the picture directory, and "Total number of picture directories" is information indicating the number (N) of picture directories. In addition, "presence or absence of the number of files of telop data" is such that "00h" is recorded in the case where no telop data exists and "01h" is recorded in the case where telop data exists.

As described above, picture directory information unit consisting of 48 bytes is recorded in a manner caused to be in correspondence with index picture recorded in the overall index file. In this overall index file, respective one index pictures that user has selected of index pictures included in respective picture directories are recorded in order of the picture directories. Accordingly, since respective one index pictures are taken out from the picture directories, index pictures having the same number (N) as that of the picture directories are recorded in the overall index file.

Moreover, one picture directory information unit corresponds to one index picture recorded in the overall index file, and picture directory information unit corresponding to index picture recorded in the m-th overall index file is recorded as the m-th unit. Namely, these picture directory information units are recorded in the same order as the recording order of the index pictures of the overall index file and by the same number as above.

Respective picture directory information units consist, as shown in FIG. 24(b), of directory No. of 2 bytes, index picture No. of 2 bytes, the number of pictures within directory of 2 bytes, index picture individual information of 1 byte, character ID code of 1 byte, directory name of 36 bytes, and space area of 4 bytes. While information are all recorded in binary data form except for the "directory name", the "directory name" is recorded by ASCII code (A).

It is to be noted that the "directory name" is recorded by codes except for ASCII code, such as, for example, ISO code or JIS code, etc., its data form becomes "C".

In the directory No., directory No. for indicating picture directory including picture file corresponding to index picture is recorded. In the index picture No., picture No. for indicating No. of picture file corresponding to index picture is recorded. Accordingly, when the m-th index picture of the overall index file is designated by user, reference is first made to the m-th picture directory information unit from the leading picture directory information unit. Subsequently, what picture directory includes designated picture index is retrieved by data of directory No. recorded in the picture directory information unit to which reference has been made. In addition, in the index picture individual information, rotation information, etc. in displaying index picture on the monitor is recorded. In displaying the index picture, display is carried out on the basis of the information.

5-5 [Picture data management file]

Respective one picture data management files are necessarily provided in the picture directories, and data for carrying out management of respective pictures stored in the directory are recorded.

The picture data management file consists of header and data body as shown in FIG. 25(a). In the header, format table (10h), name table (11h), comment table (12h), disc ID table (14h) and option table (90h) are recorded.

Moreover, in the data body, link ID of 1 byte, space area (reserved) of 3 bytes, next picture No. of 2 bytes, No. of pictures of 2 bytes, space area of 2 bytes (reserved),x No. of picture index files of 1 byte, Next picture index file No. of 1 byte, index file information of 4×256 bytes, and picture information units of 16 bytes are recorded by N (the number of pictures). It is to be noted that these respective information are recorded in binary data form.

The "No. of pictures" is information indicating total number of pictures (N) in the picture directory. Moreover, "index file information" are arranged (allocated) in accordance with display order, and, e.g., 256 entries are prepared irrespective of the number of actually existing index files.

The picture information unit of 16 bytes is recorded in a manner caused to be in correspondence with index picture recorded in picture index file which will be described later. In this picture index file, index pictures for indicating all picture files included in the picture directory are recorded in order of display. For this reason, N number of index pictures which have the same number as the total number N of pictures in the picture directory are recorded in the picture index file.

Moreover, one picture information unit corresponds to one index picture recorded in the picture index file, and picture information unit corresponding to the m-th index picture recorded in this picture index file is recorded as the m-th unit. Namely, these picture information units are recorded in the same order as the recording order of index pictures of the picture index files and by the same number as above.

In the "picture information unit", as shown in FIG. 25(b), directory No. of 2 bytes, picture No. of 2 bytes, picture kind information of 1 byte, picture individual information of 1 byte, No. of links of 1 byte, narration information of 1 byte, key word retrieval data No. of 2 bytes, time stamp retrieval data No. of 2 bytes, Telop No. of 2 bytes, and space area of 2 bytes (reserved) are recorded. It is to be noted that these information are respectively recorded in the binary data form.

In the directory No., directory No. for indicating picture directory including picture file corresponding to index picture is recorded. In the picture No., picture No. for indicating No. of picture file corresponding to the index picture is recorded. For this reason, when the m-th index picture of the picture index file is designated by user, reference is first made to the m-th picture information unit from the leading portion. Namely, which picture directory includes the designated picture index is retrieved by data of the directory No. recorded in the picture information unit to which reference has been made. Subsequently, which picture file of that picture directory is retrieved by picture No.

In addition, data indicating picture kind such as "PSN" representing intermediate resolution picture file and "PHP" representing high resolution picture file, etc. are recorded in the picture kind information. In designating the high resolution picture file and the intermediate resolution picture file by the index picture, file name (leading three characters) is designated on the basis of the picture kind information.

5-6 [Print data management file]

Figures 26A, 26B:
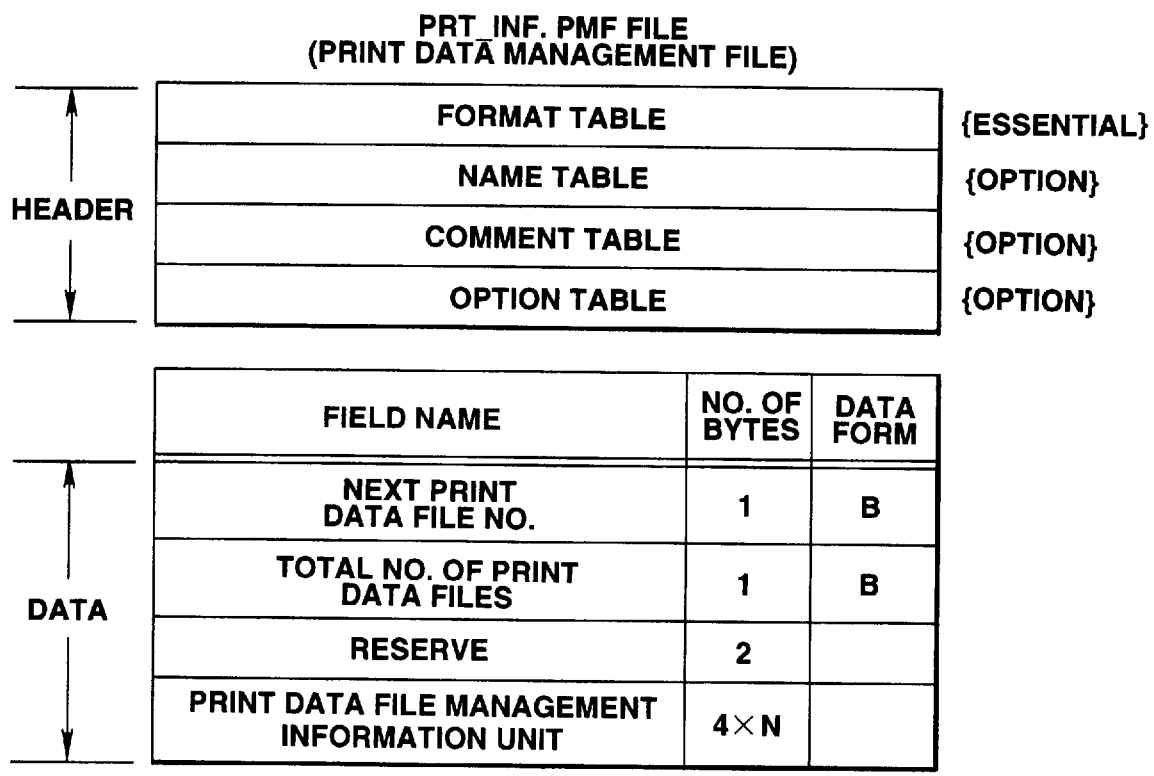
FIGS. 26(a–26(b) are a view for explaining print data management file in the hierarchical directory structure.

The print data management file consists of header and data body as shown in FIG. 26(*a*). Format table (10h), name table (11h), comment table (12h), and option table (90h) are recorded in the header.

Next print data file No. of 1 byte, total No. of print data files of 1 byte, space area of 2 bytes (reserved), and print data file management information unit of 4×N (number of pictures) bytes are recorded in the data body.

As the "next print data file No.", value obtained by adding 1 to No. of the last print data file is recorded. As the "total No. of print data files", total number of the print data files is recorded. As the "print data file management information unit", the number of print data files is recorded.

In the "print data file management information"unit, as shown in FIG. 26(*b*), print data file No. of 1 byte, print execution ID of 1 byte, and space area of 2 bytes (reserved) are recorded.

The print data file No. is information indicating No. of print data file. As shown in FIG. 19, numbers corresponding to three characters "000" subsequent to PRT of print data file PRT000. PM0 are recorded. In addition, as the "print execution ID", "01h" is recorded in the case where no print is carried out by print data file designated by corresponding print data file number, and "00h" is recorded in the case where print is carried out by print data file designated by corresponding print data file number.

5-7 [Picture data file]

Figure 27:
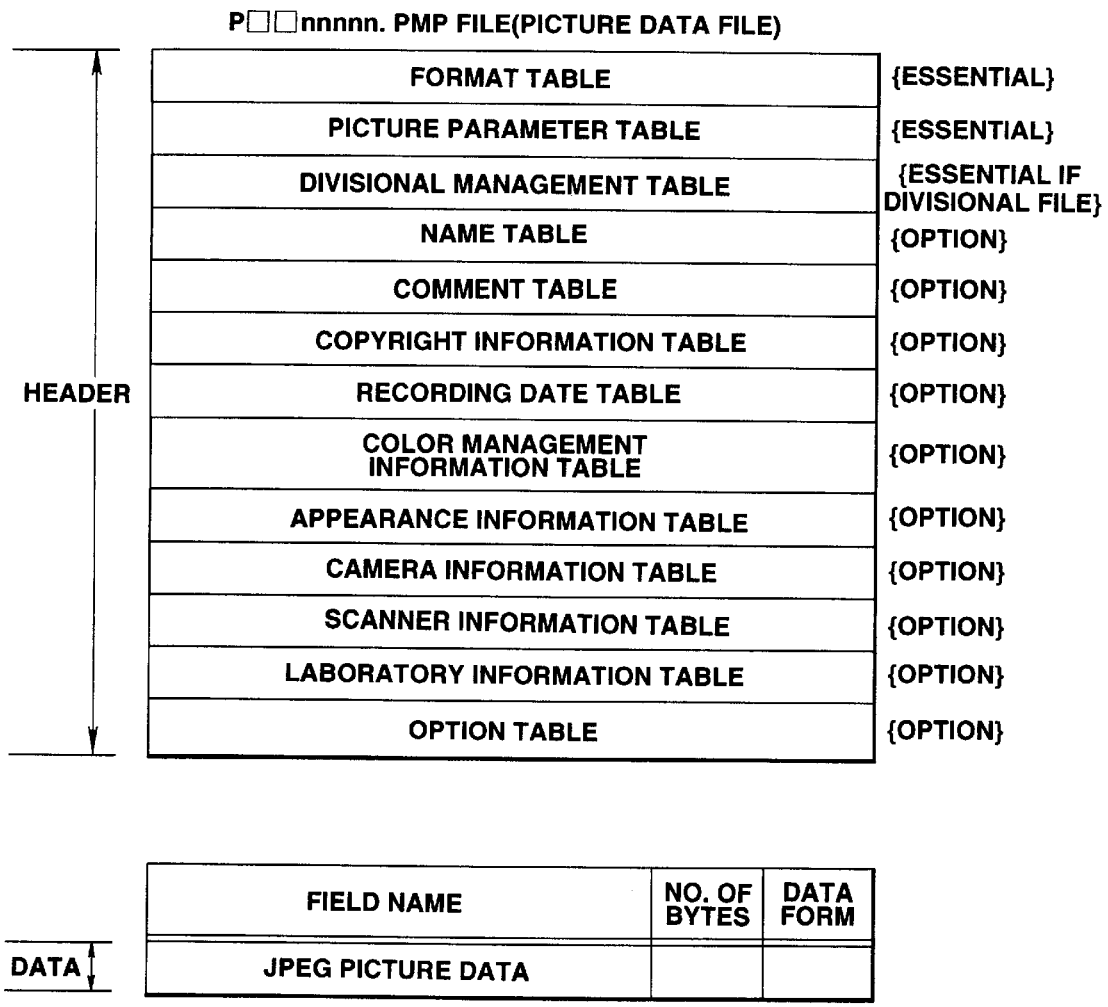
FIG. 27 is a view for explaining picture data file in the hierarchical directory structure.

The picture data file consists of header and data body as shown in FIG. 27. Format table, picture parameter table, divisional management table, name table, comment table, copyright information table, recording date table, color management information table, appearance information table, camera information table, scanner information table, laboratory information table, and option table are recorded in the header. It is to be noted that the "format table" and the "picture parameter table" are essential (inevitable) recording matter in the case of constituting the system, and other tables are option matter.

Respective data recorded in respective tables are picture processing information, etc. indicating condition in processing original picture data to form high resolution data or intermediate resolution picture data. For this reason, there is no possibility that data recorded in these tables are rewritten at the time of the ordinary recording/reproduction.

In this example, the data body is adapted so that high resolution picture data or intermediate resolution picture data which has been caused to undergo fixed length encoding is recorded thereinto.

5-8 [Overall index file]

Respective one index pictures that user has selected of plural index pictures included in respective directories are recorded into the overall index file in the order displayed on the monitor. Accordingly, the same number of index pictures as that of respective picture directories are recorded in the overall index file.

The overall index file is set of index picture data (low resolution picture data), and header of the file itself is not provided. The number of index pictures is recorded as the "total number of directories" by the above-described overall information management file. In addition, respective indices are arranged (allocated) in the same order as the order of the management files.

In more practical sense, the overall index file consists of only data body of index picture data 0 to N each having 4096 bytes as shown in FIG. 28(*a*). The respective index picture data consist of header and data body as shown in FIG. 28(*b*). Format table is recorded in the header. It is to be noted that space area is provided succeedingly (subsequently) to the format table so that arbitrary user information can be recorded. Index picture data (low resolution picture data) which has been caused to undergo fixed length encoding are recorded into the data body. It is to be noted that space area is provided in the data body succeedingly (subsequently) to the index picture data.

5-9 [Picture index file]

In the picture index file, index pictures for indicating all picture files included in corresponding picture directory are recorded in display order. Accordingly, N index pictures having the same number as the total number of pictures in the picture directory are recorded in the picture index file.

Moreover, the picture index file is set of index picture data (low resolution picture data). This picture index file is of a structure as shown in FIG. 29(*a*) in which it includes no header of the file itself, and instead includes headers every respective index picture data. The number of index pictures is recorded as the total number of directories by the overall information management file. In addition, respective indices are arranged (allocated) in the same order as the order of the management files.

In more practical sense, as shown in FIG. 29(*b*), the respective index picture data consist of header including format table and space area, and data body including low resolution picture data which have been caused to undergo fixed length encoding and space area. The total capacity of the header and the lower resolution picture data is, e.g., 4096 bytes. In addition, the header is fixed capacity of 256 bytes including space area as well.

5-10 [Print data file]

Figure 30:
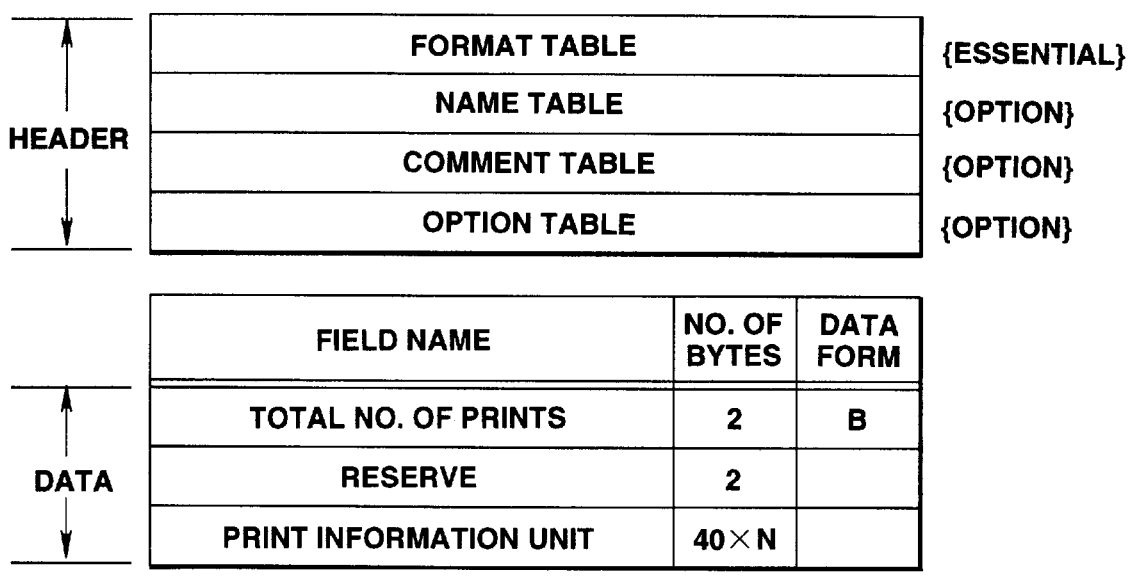
FIG. 30 is a view for explaining print data file in the hierarchical directory structure.

The print data file consists of header and data body as shown in FIG. 30. Format table, name table, comment table, and option table are recorded in the header. Moreover, total number of prints of 2 bytes, space area of 2 bytes (reserved), and print information unit of 40 bytes are recorded by N (number of pictures) in the data body.

In the "total number of prints", information indicating total number of pictures subjected to print is recorded. In the "print information unit", data indicating picture data subjected to print and print control data for controlling the printer 2 in carrying out print-out of the picture by the printer 2, etc. are recorded.

It is to be noted that these information are respectively recorded in binary data form.

In the "print information unit", as shown in FIG. 31, as data indicating picture data, picture directory No. of 2 bytes, picture No. of 2 bytes, and picture kind of 1 byte are recorded.

Moreover, in the "print information unit", as print control data, data indicating the number of prints of 1 byte, reserve of 1 byte, extraction ID of 1 byte, extraction start position of 2 bytes (picture lateral direction=X direction), extraction start position of 2 bytes (picture longitudinal direction=Y direction), extraction size of 2 bytes (longitudinal direction=X direction), and extraction size of 2 bytes (lateral direction=Y direction) are recorded. Further, data of rotation ID of 1 byte, mirror ID of 1 byte, print size ID of 1 byte, regular shape designation of 1 byte, non-regular size designation of 2 bytes (lateral direction=X direction), non-regular size designation of 2 bytes (longitudinal direction=Y direction), multi ID of 1 byte, multi mode of 1 byte, caption ID of 1 byte, caption kind of 1 byte, and color processing ID of 1 byte are recorded. In addition, data indicating red (R) gain of 1 byte, green (G) gain of 1 byte, blue (B) of 1 byte, contrast of 1 byte, brightness of 1 byte, sharpness of 1 byte, saturation of 1 byte, and hue of 1 byte (rotational angle of color coordinates) are recorded.

The print control data of the "number of prints" is data indicating the number of prints of the same picture. Moreover, the print control data of the "extraction ID" is data indicating whether or not a desired portion extracted from high resolution picture data recorded on the disc is subjected to print. In the case where high resolution picture data recorded on the disc is subjected to print as it is, "00h" is recorded as the extraction ID. In the case where a desired portion is extracted and the extracted portion is subjected to print, "01h" is recorded as the extraction ID.

The print control data indicating the "extraction start position" are data for designating respective extraction start positions in the lateral direction (X direction) and the longitudinal direction (Y direction) of picture in the case where desired portion extracted from high resolution picture data recorded on the disc is subjected to print, and those data are respectively recorded in pixel units.

The "mirror ID" is data for designating whether corresponding high resolution picture data is subjected to print in the normal state, or is subjected to print in inverted state. In the case where print in the normal state is designated, "00h" is recorded as the mirror ID. In the case where print in the inverted state is designated, "01h" is recorded as the mirror ID. The "print size ID" is data for designating whether print is carried out at the regular shape size which will be described later, or print is carried out at the non-regular shape size arbitrarily designated. In the case where print of the regular shape size is designated, "00h" is recorded as the print size ID. In the case where print at the non-regular shape size is designated, "01h" is recorded.

The "regular shape designation" is data for selecting desired print size from existing print sizes. In the case where the so-called E type print size is selected, "00h" is recorded. In the case where the L type print size is selected, "01h" is recorded. In the case where the K type print size is selected, "02h" is recorded. In the cabinet (LL size) is selected, "03h" is recorded. In the case where one-sixth size is selected, "04h" is recorded. In the case where quarter size is selected, "05h" is recorded. Moreover, in the case where A6 size is selected, "10h" is recorded. In the case where A5 size is selected, "11h" is recorded. In the case where A4 size is selected, "12h" is recorded. In the case where A3 size is selected, "13h" is recorded.

It is to be noted that in the case where print at the non-regular shape size is designated by the "print size ID", "FFh" is recorded as the print control data of the "regular shape designation".

The print control data of the "non-regular (shape) size designation" is data for allowing user to arbitrarily designate print size except for the above-described print sizes of the regular (shape) sizes, and these data can be respectively set in mm units in the longitudinal direction (X direction) and the lateral direction (Y direction). In the case where user selects regular shape by the "print size ID" to select desired print size from the respective sizes, "FFFFh" is recorded as the print control data of the "non-regular (shape) size designation".

The print control data of the "multi ID" is data indicating whether or not there is a print designation of the so-called multi-screen to divide a picture on screen into plural portions to respectively display the same pictures at those portions. In the case where print of the multi-screen is not carried out, "00h" is recorded on the basis of the judgment that "multi processing is absent". In the case where print of the multi-screen is carried out, "01h" is recorded on the basis of the judgment that "multi processing is present".

The print control data of the "multi mode" is data for designating the number of divisions of one picture on screen in the case where print of the multi screen is carried out. In the case where one picture on screen is divided into two portions (halved), "00h" is recorded. In the case where one picture is divided into four portions (quartered), "01h" is recorded. In the case where one picture on screen is divided into six portions, "02h" is recorded. In the case where one picture on screen is divided into eight portions, "03h" is recorded. In the case where one picture on screen is divided into sixteen portions, "04h" is recorded.

The print control data of the "caption ID" is data for designating whether or not, e.g., characters such as caption (title) or recording date, etc. attached to corresponding picture are also subjected to print together on the lower (or upper) portion of the picture subjected to print. The characters such as caption (title) and recording date, etc. are recorded by the ASCII code of 244 bytes as described above, and can be recorded by 244 (characters) (122 (characters) if Kanji is used). Further, in the case where print of picture is carried out along with the caption and recording date, etc., "01h" is recorded as the caption ID. In the case where print of picture is not carried out along with the caption and recording date, etc., "00h" is recorded.

The print control data of the "caption kind" is data for designating whether or not respective data constituting the header of picture data file which has been described with reference to FIG. 27 are subjected to print. This caption kind is such that in the case where designation is made so that name data included in "name table" is printed out along with picture data, "11h" is recorded thereinto as table ID of the name table; in the case where designation is made so that comment data included in the "comment table" is printed out along with picture data, "12h" is recorded thereinto as table ID of the comment table, and in the case where designation is made so that recording date data included in the "recording date table" is printed out along with picture data, "14h" is recorded thereinto as table ID of the recording date table.

The print control data of the "color processing ID" is data indicating whether or not user implements color processing to emphasize red, etc. to a desired portion with respect to corresponding picture. In the case where the color processing is not implemented, "00h" is recorded. In the case where the color processing is implemented, "01h" is recorded.

The print control data of the "respective gains of R, G, B" are data indicating gains of respective color data. The respective color data are adapted so that gains of multiple of 0 to 5 can be respectively adjusted at 1/256 (8 bits) intervals. As the print control data of the respective gains, data indicating gains thus adjusted are recorded.

The print control data of the "contrast" is data indicating contrast of picture subjected to print, and can be adjusted at 1/256 intervals similarly to the above-mentioned gain. Further, value indicating contrast thus adjusted is recorded as the print control data.

The print control data of the "brightness" and "hue" are data indicating brightness of picture subjected to print, and are recorded by percentage in the + direction and in the − direction with 128 indicated by 8 bits being as ±0.

The print control data of the "sharpness" is data indicating edge emphasis rate (degree) of picture adjusted between magnification of 0 to 5, and value adjusted at 1/256 (8 bits) interval is recorded.

In addition, the print control data of the "saturation" is also such that value adjusted at 1/256 (8 bits) intervals between magnification of 0 to 5 is recorded.

6 [Recording operation]

The recording operation of the still picture filing system will now be described with reference to the flowcharts of FIGS. 32 and 33 in a manner based on the premise of the hierarchical directory structure and the respective file configurations.

Figure 32:
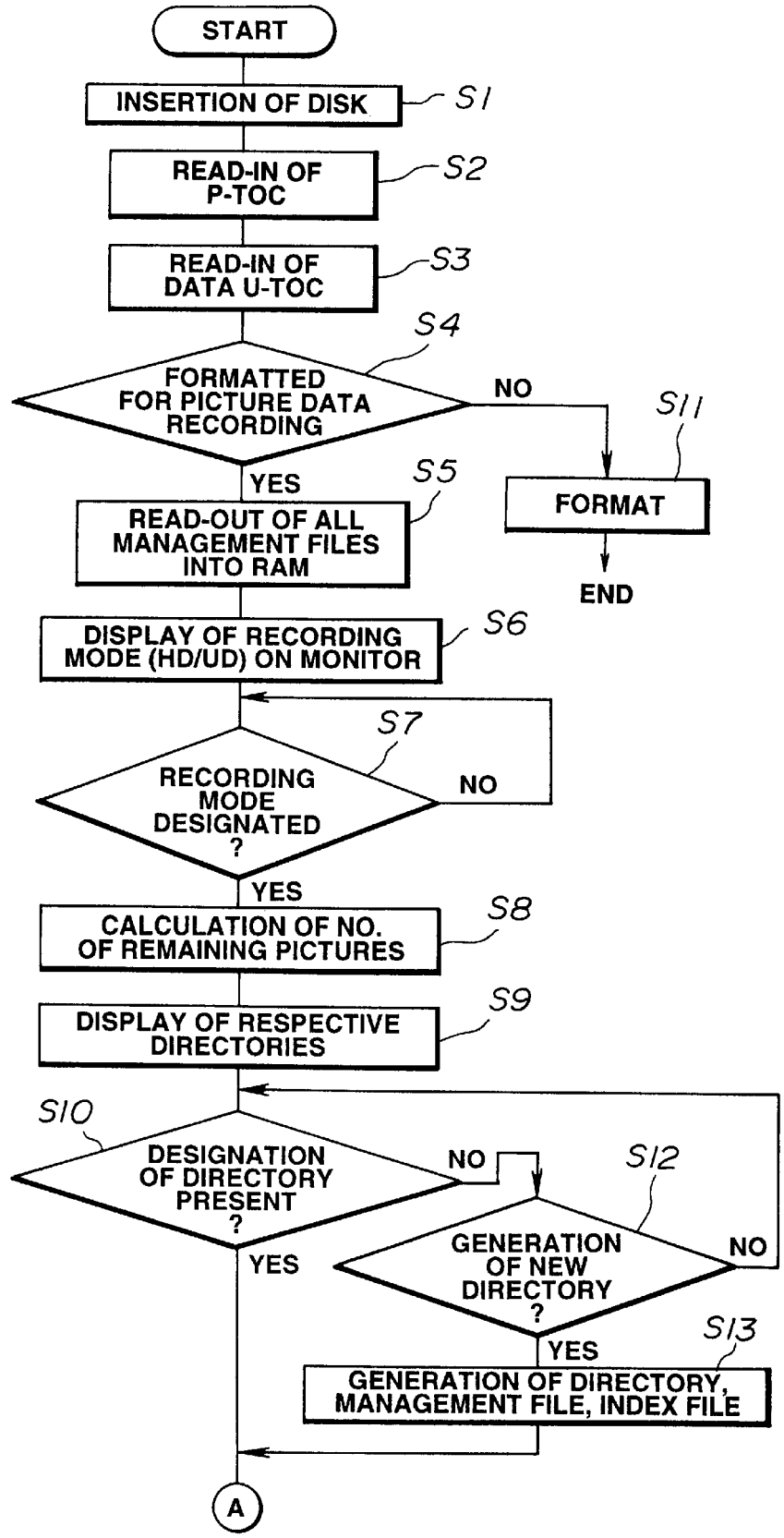
FIG. 32 is a flowchart for explaining the recording operation of the first half in the still picture filing system.

Initially, in the flowchart shown in FIG. 32, when the storage unit 5 is brought into stand-by state, the processing operation by this flowchart starts to proceed to step S1.

When user inserts optical disc 20 at the step S1, the processing operation then proceeds to step S2. Thus, the inserted optical disc 20 is loaded into the storage unit 5, resulting in the recordable/reproducible state of picture data.

At the step S2, system controller 6 controls the disc recording/reproduction section 5c so as to read P-TOC on the optical disc 20 shown in FIG. 8(a) through the storage unit controller 5d shown in FIG. 6. Then, the controller 5d transfers respective data of the P-TOC thus read out to the system controller 6 shown in FIG. 1. The system controller 6 detects respective data of the P-TOC thus transferred to thereby confirm whether or not data U-TOC exists, and confirms recording position of the U-TOC.

The system controller 6 judges, in the case where the data file exists, that U-TOC exists at the leading portion of the data file. Thus, the processing operation proceeds to step S3.

At the step S3, the system controller 6 controls the disc recording/reproduction section 5c so as to read the data U-TOC on the optical disc 20 shown in FIG. 8(a) through the storage unit controller 5d. Then, the controller 5d transfers data of the data U-TOC thus read out to RAM 6a of the system controller 6. The system controller 6 temporarily stores the data of the data U-TOC into the RAM 6a to read out it therefrom to thereby grasp positions of respective picture directories and respective files. Thus, the processing operation proceeds to step S4. It is to be noted that retrieval of memory position of file will be described in detail at the chapter of [Description of operation at the time of retrieval] which will be described later.

At the step S4, the system controller 6 discriminates, on the basis of the data of the data U-TOC stored in the RAM 6a, whether or not directory (PIC_MD) and overall information management file exist to thereby discriminate whether or not the optical disc 20 is formatted for recording of picture data. In the case of Yes, the processing operation proceeds to step S5. In the case of No, the processing operation proceeds to step S11.

At the step S11, since the optical disc 20 is not formatted for picture data, the system controller 6 formats the optical disc 20 for recording of picture data. Then, the entire routine shown in FIGS. 32 and 33 is once completed. The system is brought into standby state until recording is designated for a second time.

On the other hand, at the step S5, the system controller 6 controls the disc recording/reproduction section 5c so as to read out all management files through the storage unit controller 5d, and temporarily stores, into the RAM 6a, all the management files which have been read out. Thus, the processing operation proceeds to step S6.

At the step S6, the system controller 6 carries out display control of monitor unit 9 so as to display picture to select the recording mode of picture to be recorded from now. In more practical sense, select picture of the HD recording mode for recording picture of high resolution of 1024 pixels × 1536 pixels and select picture of the UD recording mode for recording picture of ultra high resolution of 2048 pixels × 3072 pixels are displayed on the monitor unit 9.

It is to be noted that while the picture of intermediate resolution is recorded at fixed data length of 2 clusters as described above, there may be employed an approach in which recording mode for recording picture of the intermediate resolution by fixed data length of 1 cluster is provided so that any one of the fixed length encoding at the data length of 2 clusters and fixed length encoding at the data length of 1 cluster can be selected by the user's intention. Thus, when the recording mode of fixed data length of 2 clusters is selected, intermediate resolution picture data of higher resolution can be recorded. On the other hand, when the recording mode of the fixed data length of 1 cluster is selected, recording in which the number of recording pictures is caused to be increased can be conducted although resolution is somewhat poor.

At the step S7, the system controller 6 detects operation state of the operation unit 10 to thereby discriminates whether or not any one of the HD recording mode and the UD recording mode is selected. In the case of No, the step S7 is repeated until the above-mentioned selection is made. In the case of Yes, the processing operation proceeds to step S8.

At the step S8, the system controller 6 calculates, on the basis of the total number of recorded pictures (total number of pictures of intermediate resolution picture data) within the overall information management file stored in the RAM 6a, and the number of pictures and picture kind information of picture information within the picture data management file, the number of recordable pictures in the HD recording mode or the UD recording mode designated by user.

In more practical sense, on the optical disc 20, recording of about 200 pictures can be carried out by combination of only intermediate resolution picture data of 2 clusters and high resolution picture data of 8 clusters, and recording of about 100 pictures can be carried out by combination of only intermediate resolution picture data of 2 clusters and ultra high resolution picture data of 18 clusters. For this reason, when the recorded capacity is subtracted from recordable capacity of the entirety of the optical disc 20, the number of recordable pictures in the case where the HD recording mode is selected and the number of recordable pictures in the case where the UD recording mode is recorded are respectively calculated.

Subsequently, at step S9, the system controller 6 reads out picture directory information unit within the overall management file from the RAM 6a to allow the monitor unit 9 to undergo display control so as to display data of directory name, directory No. and the number of pictures within the picture directory, etc. Thus, the processing operation proceeds to step S10.

At the step S10, the system controller 6 detects operation state of the operation unit 10 to thereby discriminate whether or not designation of picture directory for recording corresponding data is made from user. In the case of No, the processing operation proceeds to step S12. In the case of Yes, the processing operation proceeds to step S14 shown in FIG. 33.

At the step S12, since designation of picture directory is not made from user, the system controller 6 detects operation state of the operation unit 10 to thereby discriminate whether or not formation of new directory except for the existing picture directories is designated. In the case of No, the step S10 and the step S12 are repeated until formation of the new directory is designated. In the case of Yes, the processing operation proceeds to step S13.

At the step S13, since formation of the new directory is designated, the system controller 6 judges the number of the existing picture directories by the overall information management file to attach directory No. of the new directory, and to form picture data management file and picture index file in the picture directory. Thus, the processing operation proceeds to the step S14 sown in FIG. 33.

Figure 33:
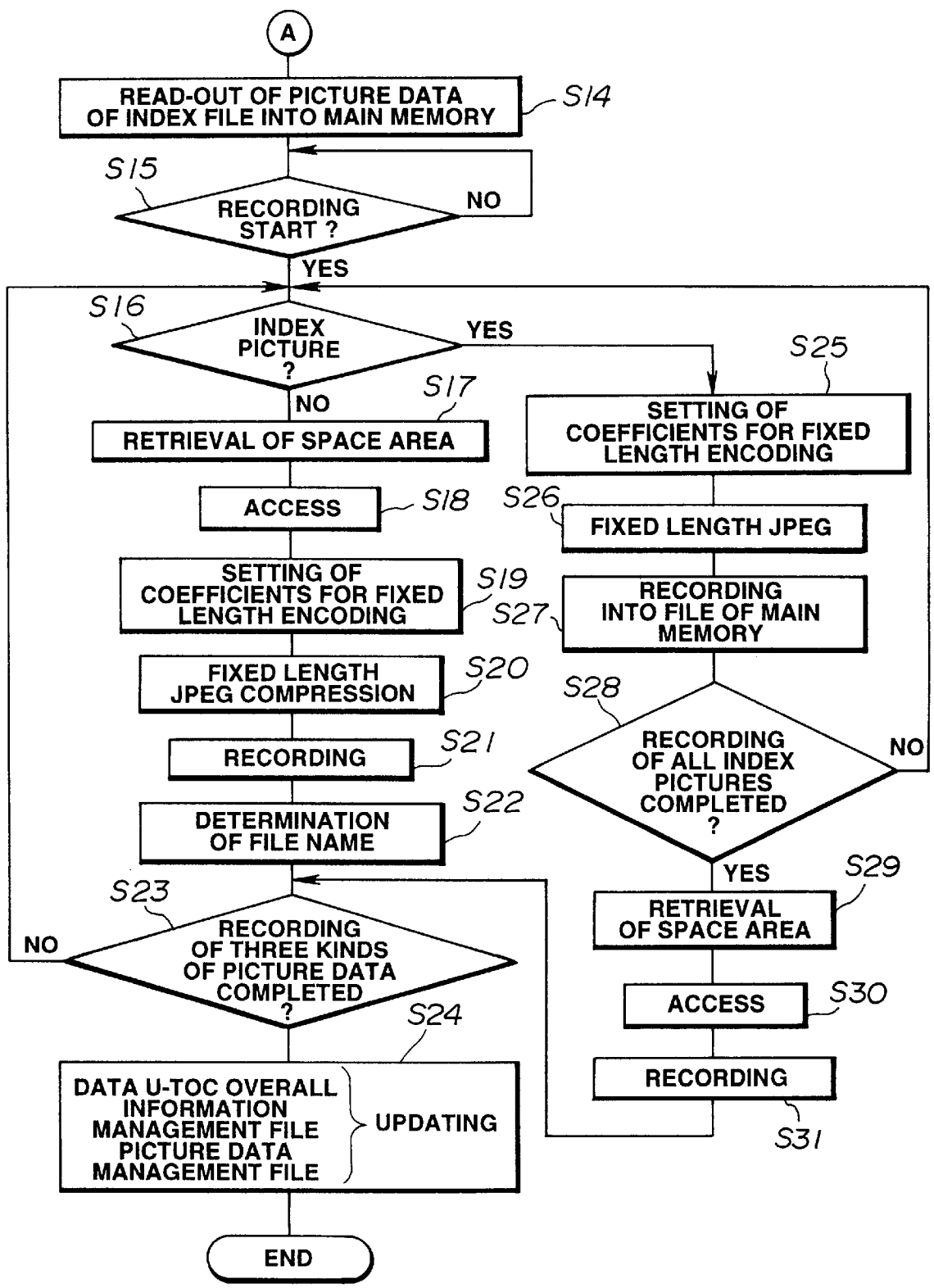
FIG. 33 is a flowchart for explaining the recording operation of the latter half in the still picture filing system.

At the step S14 shown in FIG. 33, the system controller 6 controls the disc recording/reproduction section 5c through the storage unit controller 5d so as to read out all the picture data recorded in the index file of the designated directory, and to conduct a control to transfer the picture data of the index file to the main memory 11a shown in FIG. 4. Thus, the processing operation proceeds to step S15. It is to be noted that the picture data recorded after undergone fixed length encoding along with the header is read out from the index file as it is without allowing it to undergo expansion decoding processing to transfer it to the main memory 11a. In addition, when no picture data is recorded in the index file, there is no possibility that picture data is read out into the main memory.

At the step S15, the system controller 6 detects operation state of the operation unit 10 to thereby discriminate whether or not designation of recording start is made from user. In the case of No., the step S15 is repeated until designation of the recording start is made. In the case of Yes, the processing operation proceeds to step S16.

At the step S16, the system controller 6 discriminates whether or not picture to be recorded from now on is index picture. In the case of No, the processing operation proceeds to step S17. In the case of Yes, the processing operation proceeds to step S25.

At the step S25, the system controller 6 delivers data indicating that picture to be recorded from now on is index picture to the thinning and contraction/expansion controller 4i shown in FIG. 5. The thinning and contraction/expansion circuit 4i is operative so that when the data is delivered thereto, it sets fixed length encoding coefficients for index picture at the contraction/expansion circuit 4h. Thus, the processing operation proceeds to step S26.

At the step S26, the system controller 6 controls the compression/expansion circuit 4h so as to implement compression encoding processing to the picture data which has been caused to undergo thinning processing into $\frac{1}{4}$ on the basis of the set fixed length encoding coefficients through the thinning and compression/expansion controller 4i to thereby form index picture which has been caused to undergo fixed length encoding so that the fixed data length of $\frac{1}{15}$ clusters is provided. The processing operation thus proceeds to step S27.

At the step S27, the system controller 6 controls the memory controller 13 so as to record index picture of 4096 bytes in total in which header is added to index file stored in the main memory 11a shown in FIG. 4. Thus, the processing operation proceeds to step S28.

At the step S28, the system controller 6 discriminates whether or not all index pictures are recorded into the main memory 11a. In the case of No, the processing operation returns to the step S16. In the case of Yes, the processing operation proceeds to step S29.

At the step S29, the system controller 6 retrieves the portion where entry of 2 bits (code indicating available allocation block) of the allocation block No. of volume space bitmap VS in the data U-TOC stored in the RAM 6a is "00" to thereby detect space area. Thus, the processing operation proceeds to step S30.

At the step S30, the system controller 6 controls the disc recording/reproduction section 5c so as to provide access to the space area detected on the optical disc 20 through the storage unit controller 5d. Thus, the processing operation proceeds to step S31.

At the step S31, the system controller 6 controls the disc recording/reproduction section 5c so as to record index file having the index picture into the space area on the optical disc 20 through the storage unit controller 5d. Thus, the processing operation proceeds to the step S23.

Namely, in the still picture filing system, in the case where the index picture is caused to undergo fixed length encoding to record it onto the optical disc 20, an approach is employed to temporarily record, before a predetermined number of index pictures which have been caused to undergo fixed length encoding are recorded onto the optical disc 20, such pictures in order into the main memory 11a to thereby form single index file from the predetermined number of index pictures in the main memory 11a thereafter to record it into physically continuous areas on the optical disc 20.

On the other hand, one index picture is caused to undergo fixed length encoding so that data length of $\frac{1}{15}$ clusters is provided as described above. For this reason, in order to record the picture data of data length of $\frac{1}{15}$ clusters onto the optical disc 20, it is necessary to add dummy data corresponding to $\frac{14}{15}$ clusters with respect to the picture data of $\frac{1}{15}$ clusters so that data length of one cluster is provided. Accordingly, if picture data are recorded onto the disc every time the picture data of $\frac{1}{15}$ clusters are formed, the recording area for the dummy data would become greater than the recording area for picture data for index, thus failing to effectively utilize the recording area on the disc.

For this reason, in the still picture filing system, such an approach is employed to temporarily record a predetermined number of picture data for index into the main memory 11a as index file to record the index file which has been recorded in the main memory 11a onto the disc after taking-in operations of all index pictures are completed.

Namely, in the case where, e.g., index file having 25 index pictures is recorded, 15 index pictures (15×$\frac{1}{15}$ clusters) are recorded in the area of 1 cluster and the remaining 10 index pictures (10×$\frac{1}{15}$ clusters) and dummy data of $\frac{5}{15}$ clusters are recorded in the area of the next 1 cluster. Thus, data quantity of dummy data recorded onto the disc can be lessened. As a result, the recording area on the disc can be effectively used. Moreover, in the still picture filing system, since such an approach is employed to temporarily record plural index pictures which have been caused to undergo fixed length encoding into the main memory 11a to thereby form single file by a predetermined number of index pictures in the main memory 11a to record this index file into the physically continuous areas on the disc, index files recorded onto the disc can be necessarily continuous files. For this reason, in the case of reading out the index files from the optical disc 20, those files can be read out at a high speed because they are continuously recorded on the disc.

It is to be noted that in the case where new index picture is supplemented to the index file, as described above, prior to recording, data of the index file is read out into the main memory 11a. In recording, new index picture is recorded in the area immediately after the index picture recorded last after dummy data added after the index picture recorded last is deleted (erased) (There is no necessity of deletion in the case where there is no dummy data).

On the other hand, when discrimination result is No at the step S16, the processing operation proceeds to step S74. At the step S17, the system controller 6 detects space area on the optical disc 20 for recording picture of intermediate resolution or picture of high resolution. Thus, the processing operation proceeds to step S18.

In more practical sense, the system controller 6 retrieves the portion where entry of 2 bits (code indicating available allocation block) of the allocation block No. of the volume space bitmap VS in the data U-TOC stored in the RAM 6a is "00" to thereby to carry out detection of the space area.

At the step S18, the system controller 6 detects optimum space area of space areas retrieved at the step S17 to control the disc recording/reproduction section 5c through the storage unit controller 5d so that access thereto is provided.

In this case, it is the most desirable that the optimum recording position is an area after the recorded file (file recorded last) recorded in order under the same directory and an area where areas of pictures (corresponding to several clusters) to be recorded are physically continuous.

However, in the case where large capacity data such as high resolution picture data (8 clusters) or ultra high resolution picture data (18 clusters) are recorded, and in the case where unrecorded area of the optical disc 20 is less, there are instances where it is impossible to ensure areas physically continuous in the area after the file recorded last of the same directory. In such a case, extent record block ERB is formed within the management block to link, by this ERB, distributed plural areas which are not continuous to record one file.

Subsequently, at step S19, the system controller 6 sets fixed length encoding coefficients corresponding to the high resolution picture data or the ultra high resolution picture data at the thinning and compression/expansion controller 4i. Thus, the processing operation proceeds to step S20.

At the step S20, the thinning and compression/expansion controller 4i controls the compression/expansion circuit 4h so as to form high resolution picture data of 8 clusters or ultra high resolution picture data of 18 clusters on the basis of the set fixed length encoding coefficients. Thus, the processing operation proceeds to step S21.

At the step S21, the system controller 6 controls the disc recording/reproduction section 5c so as to record the picture data which has been caused to undergo fixed length encoding into the detected optimum area on the optical disc 20 through the storage unit controller 5d. Thus, the processing operation proceeds to step S22.

At the step S22, the system controller 6 carries out recording control of the picture data, and determines, in succession, data of picture data management file of the designated directory and file names corresponding to resolutions of respective picture data. Thus, the processing operation proceeds to step S23.

In more practical sense, e.g., recording in the HD recording mode of first to sixth pictures which have been read from the negative film into the picture directory "PIC00001" is as follows.

Namely, since the number of pictures recorded in the HD recording mode can be judged to be zero from data of the picture data management file in the RAM 6a before recording, high resolution (HD) of the first picture is caused to be PHP00000. PMP, and the intermediate resolution (SD) thereof is caused to be PSN00000. PMP. Accordingly, when the six pictures have been all recorded, files of PHP00000. PMP to PHP00005. PMP as the high resolution and PSN00000. PMP to PSN00005. PMP as the intermediate resolution are formed.

It is to be noted that in the case where index pictures of these six pictures are recorded, these six index pictures are recorded in order into the PIDX000. PMX which has been read into the main memory 11a. For this reason, new index file is not formed. It is to be noted that in the case the number of index pictures recorded in one index file is above the number of index pictures set in advance (e.g., 25 in this description), second index file such as PIDX001. PMX, etc. is newly formed.

At step S23, the system controller 6 discriminates whether or not picture data of three kinds of resolutions of low resolution picture data (index picture), intermediate resolution picture data and high resolution picture data (or ultra high resolution picture data) have been all recorded. In the case of No, the processing operation returns to the step S16 to record picture data of resolutions which have not yet recorded. In the case of Yes, the processing operation proceeds to step S24.

At the step S24, the system controller 6 updates data of the data U-TOC, the overall information management file and the picture data management file recorded on the disc by respective data of data U-TOC, overall information management file and picture data management file recorded in the RAM 6a to complete the entire routine according to the recording operation shown in FIGS. 32 and 33.

In more practical sense, in the data U-TOC, respective data such as Volume Descriptor (VD), Volume Space Bitmap (VS), Management Table (MT), Directory Record Block (DRB) and Extents Record Block (ERB), etc. are mainly rewritten.

Namely, in the VD, data relating to allocation block (recordable allocation block, etc.), No. of directories (in the case where formation of new directory is designated), No. of files, data relating to directory record block DRB (in the case where directory or file is newly formed), and data relating to extent record block ERB (in the case where newly formed file is recorded at physically discontinuous positions and is linked by extent record block ERB), etc. are rewritten. Moreover, in the volume space bitmap VS, codes of 2 bits indicating attribute of respective allocation blocks, etc. are rewritten.

Further, in the management table MT, MT is subjected to entry when directory record block DRB and extent record block ERB are newly formed. It is to be noted that in the case where one directory record unit in the existing directory record block DRB is supplemented, management table MT is not updated.

Further, in the directory record block DRB, in the case where directory is newly formed, directory record unit for directory is supplemented by one. Similarly, in the case where file is formed, directory record unit for file is supplemented by one per each file.

In addition, in the extent record block ERB, in the case where files are designated by the directory record block DRB and those files are not physically continuous, that ERB is formed. It is to be noted that the ERB is not formed at the time of format.

In the overall information management file, data such as total number of pictures, next picture directory No., total number of picture directories, and picture directory information unit, etc. are mainly rewritten. With respect to the picture directory information unit, when picture directory is newly formed, one unit is formed.

Moreover, with respect to the picture data management file, when picture directory is newly formed, picture data management file is newly formed within the newly formed picture directory. Further, data such as No. of pictures, No. of picture index files, next picture index file No., index file information, and picture information unit, etc. are mainly updated. With respect to the index file information, when index file is newly formed, that information is updated. Moreover, with respect to the number of indices, when No. of indices in the index file is supplemented, that No. of indices is updated. Further, since picture information units are provided in correspondence with respective index pictures, the number of picture information units is increased by the increased number of pictures. In the ordinary recording, data in the picture information unit is not updated. However, when switching of order of index pictures is carried out, switching of picture No. is carried out so that the data subjected to switching is updated.

7. [Description of Second Recording Operation]

Another recording operation for picture data of respective resolutions will now be described with reference to the flowchart of FIG. 34. When the routine of the step S1 to the step S13 of the flowchart which has been described with reference to FIG. 32 is completed, the processing operation by the flowchart of FIG. 34 starts to proceed to step S41.

At the step S41, the system controller 6 reads out all picture data which have been recorded in the index file of the designated directory. Thus, the processing operation proceeds to step S42.

At the step S42, the system controller 6 detects operation state of the operation unit 10 to thereby detect whether or not recording start from user is designated. In the case of No, this step S42 is repeated until recording start is designated. In the case of Yes, the processing operation proceeds to step S43.

Figure 34:
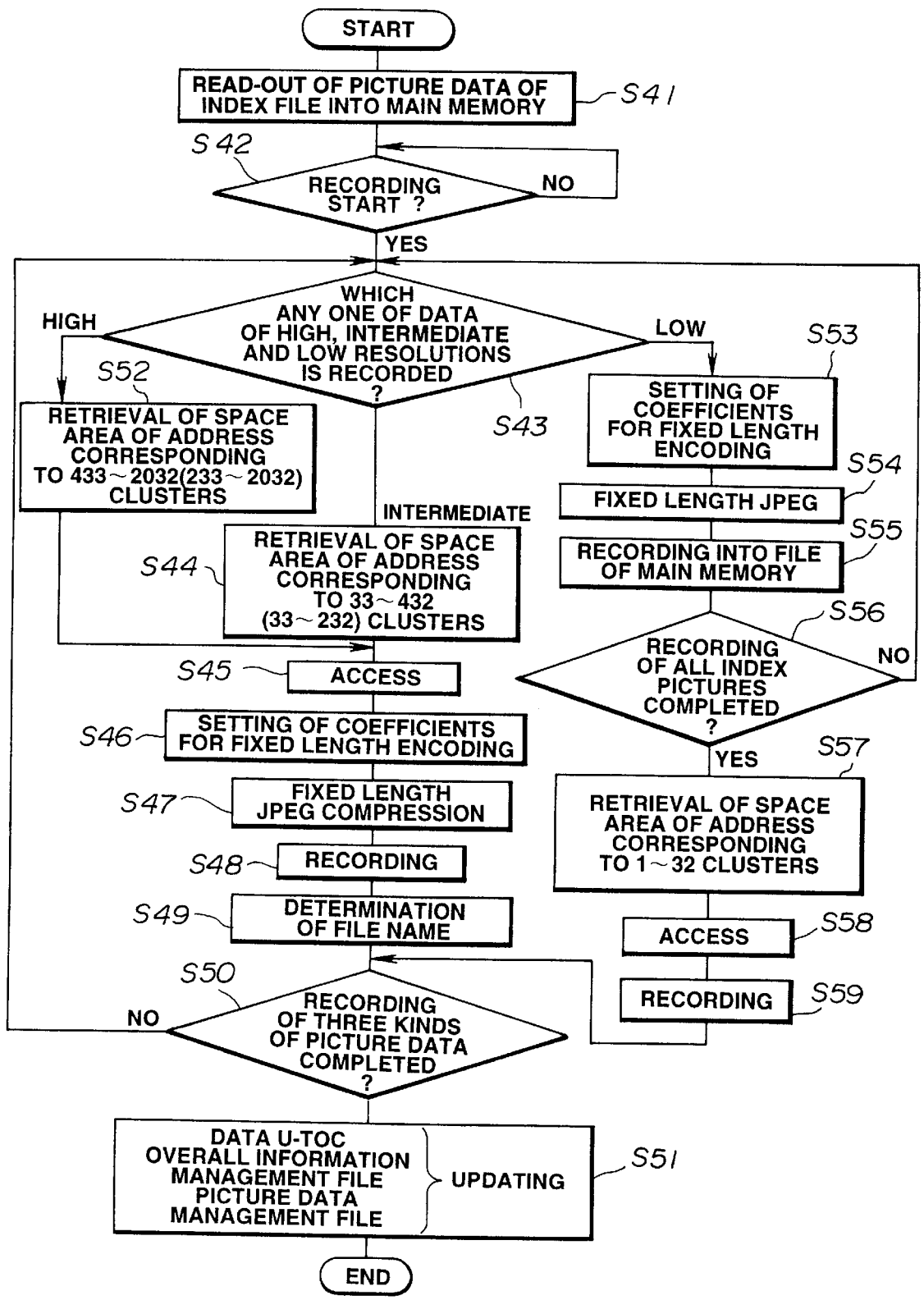
FIG. 34 is a flowchart for explaining the recording operation of picture data every respective resolutions in the still picture filing system.

It is to be noted that the steps S41 and S42 shown in FIG. 34 are steps respectively corresponding to the steps S14 and S15 which have been described with reference to FIG. 33.

At the step S43, the system controller 6 discriminates whether picture data to be recorded is high resolution picture data (HD or UD), intermediate resolution picture data (SD) or low resolution picture data (index picture data). When current recording operation is discriminated as recording of low resolution picture data, the processing operation proceeds to step S53. When the current recording operation is discriminated as recording for intermediate resolution picture data, the processing operation proceeds to step S44. When the current recording operation is discriminated as recording for high resolution picture data, the processing operation proceeds to step S52.

Steps 53 to 59 to which the processing operation proceeds after the current recording operation is discriminated as recording for low resolution picture data at the step S43 respectively correspond to the steps S25 to S31 shown in FIG. 33.

Namely, at the step S53, the system controller 6 delivers data indicating that picture to be recorded from now on is index picture to the thinning and compression/expansion controller 4$i$ shown in FIG. 5. The thinning and compression/expansion controller 4$i$ is operative so that when the data is delivered thereto, it sets fixed length encoding coefficients for index picture at the compression/ expansion circuit 4$h$. Thus, the processing operation proceeds to step S54.

At the step S54, the system controller 6 controls the compression/expansion circuit 4$h$ on the basis of the set fixed length encoding coefficients so as to implement compression encoding processing to the picture data which has been caused to undergo thinning processing into ¼ through the thinning and compression/expansion controller 4$i$ to thereby form index picture which has been subjected to fixed length encoding so as to have fixed data length of $\frac{1}{15}$ clusters. Thus, the processing operation proceeds to step S55.

At the step S55, the system controller 6 controls memory controller 13 so as to record index picture of 4096 bytes in total in which header is added to the file stored in the main memory 11$a$ shown in FIG. 4. Thus, the processing operation proceeds to step S56.

At the step S56, the system controller 6 discriminates whether or not all of index pictures have been recorded into the main memory 11$a$. In the case of No, the processing operation returns to the step S43. In the case of Yes, the processing operation proceeds to step S57.

At the step S57, the system controller 6 retrieves the portion where entry of 2 bits (code indicating available allocation block) of allocation block No. of volume space bitmap VS within data U-TOC stored in the RAM 6$a$ is "00" to thereby detect space area. Thus, the processing operation proceeds to step S58.

At the step S58, the system controller 6 controls the disc recording/reproduction section 5$c$ so as to provide access to the detected space area on the optical disc 20 through the storage unit controller 5$d$. Thus, the processing operation proceeds to step S59.

At the step S59, the system controller 6 controls the disc recording/reproduction section 5$c$ so as to record the index picture into the space area on the optical disc 20 through the storage unit controller 5$d$. Thus, the processing operation proceeds to step S50.

Subsequently, at the step S57, space area for low resolution picture data is detected. At the step S44, space area for intermediate resolution picture data is detected. At the step S52, space area for high resolution picture data (or for ultra high resolution picture data) is detected. This space area detection is carried out by retrieving the portion where entry of 2 bits (code indicating available allocation block) of allocation block No. of volume space bitmap VS within the data U-TOC stored in the RAM 6$a$ is "00" as described above. In this instance, designations of addresses to be retrieved are carried out in correspondence with recording of respective resolutions.

Namely, the case of recording of low resolution picture data (step S57) will be described below. In the ordinary use, as far as 200 index images at the maximum can be recorded in the HD recording mode. In both the case where HD recording mode is selected and the case the UD recording mode is selected, since the index picture has fixed data length of $\frac{1}{15}$ clusters, the area necessary as the area for index picture consists of 200×$\frac{1}{15}$ clusters=13.33 clusters. However, when the number of directories is increased, there may also exist directories where only one or two index pictures are recorded. Since the maximum number of picture directories is set to 20, capacity necessary for recording as index picture is required to the maximum degree in such a case. As a result, at least 32 clusters are required. For this reason, the system controller 6 carries out, in detecting space area at the time of recording index picture, retrieval of code of allocation blocks designated by addresses corresponding to 1 to 32 clusters from the disc inner circumference to detect space area. It is to be noted that detection of other space areas is not carried out in this case.

The case of recording of the intermediate resolution picture data (step S44) will be described below. In the HD recording mode, 200 pictures can be recorded at the maximum. Since the picture of intermediate resolution (SD) is recorded by fixed data length of 2 clusters, 2 clusters×200 pictures=400 clusters are required as the picture area of the intermediate resolution. For this reason, the system controller 6 carries out, in detecting space area at the time of recording picture of intermediate resolution, retrieval of code of allocation blocks of areas of 400 clusters succeeding to the area (1 to 32 clusters) of index picture from the disc inner circumference, i.e., areas designated by addresses corresponding to 33 to 432 clusters to detect space area. Thus, the processing operation proceeds to step S45.

Similarly, in the UD recording mode, as far as 100 pictures at the maximum can be recorded. Since picture of intermediate resolution (SD) is recorded by fixed data length of 2 clusters, 2 clusters×100 pictures=200 clusters are required as the picture area of the intermediate resolution. For this reason, the system controller 6 carries out, in detecting space area at the time of recording picture of the intermediate resolution, retrieval of code of allocation block of area of 200 clusters succeeding to the area (1 to 32 clusters) of the index picture from the disc inner circumference, i.e., area designated by addresses corresponding to 33 to 232 clusters to detect space area. Thus, the processing operation proceeds to step S45.

The case of recording of high resolution picture data and ultra high resolution picture data (step S52) will now be described. Initially, in the HD recording mode, 200 pictures at the maximum can be recorded, and high resolution picture data is caused to have fixed data length of 8 clusters. For this reason, 8 clusters×200 (pictures)=1600 clusters are required in the picture area for the high resolution picture data. From facts as above, the system controller 6 carries out, at the step S53, retrieval of code of allocation block of area of 1600 clusters succeeding to the area of index picture (1 to 32 clusters) and the area of picture of intermediate resolution (33 to 432 clusters) from the disc inner circumference, i.e., area designated by address corresponding to 433 to 2032 clusters to detect space area. Thus, the processing operation proceeds to step S45.

Similarly, in the UD recording mode, as far as 100 pictures at the maximum can be recorded, and the ultra high resolution picture data is caused to have fixed data length of 18 clusters. Accordingly, space area of 18 clusters×100= 1800 clusters is required as the picture area for the ultra high resolution. For this reason, the system controller 6 carries out, in detection of space area at the time of recording picture of the ultra high resolution, retrieval of code of allocation block of area of 1800 clusters succeeding to the index picture area (1 to 32 clusters) and the intermediate resolution picture area (33 to 232 clusters) from the disc inner circumference, i.e., areas designated by addresses corresponding to 233 to 2032 clusters to detect space area. Thus, the processing operation proceeds to step S45.

When such retrieval of space area is completed, the system controller 6 controls, at the step S45, the disc recording/reproduction section 5c through the storage unit controller 5d so as to provide access to an optimum area of the retrieved space areas. Thus, the processing operation proceeds to step S46. As a retrieval method for optimum recording position in this case, there may be employed a method of respectively carrying out space area retrievals irrespective of the directory to record, in order, respective data at the positions where space area first exists. Accordingly, recorded data are recorded in order from the leading portions of respective areas.

At the step S46, the system controller 6 sets fixed length encoding coefficient corresponding to high resolution picture data or ultra high resolution picture data at the thinning and compression/expansion controller 4i. Thus, the processing operation proceeds to step S47.

At the step S47, the system controller 6 controls the compression/expansion circuit 4h so as to form high resolution picture data of 8 clusters or ultra high resolution picture data of 18 clusters on the basis of the set fixed length encoding coefficients through the thinning and compression/ expansion controller 4i. Thus, the processing operation proceeds to step S48.

At the step S48, the system controller 6 controls the disc recording/reproduction section 5c so as to record the picture data which has been caused to undergo fixed length encoding into the detected optimum area on the optical disc 20 through the storage unit controller 5d. Thus, the processing operation proceeds to step S49.

At the step S49, the system controller 6 carries out recording control of the picture data, and successively determines file names corresponding to data of picture data management file of the designated picture directory and resolutions of respective picture data. Thus, the processing operation proceeds to step S50.

At the step S50, the system controller 6 discriminates whether or not picture data of three kinds of resolutions of low resolution picture data (index picture), intermediate resolution picture data and high resolution picture data (or ultra high resolution picture data) have been all recorded. In the case of No, the processing operation returns to step S43 to record picture data of resolution which has not yet been recorded. In the case of Yes, the processing operation proceeds to step S51.

At the step S51, the system controller 6 updates related data of the data U-TOC, the overall management information file and the picture data management file recorded on the disc into respective data of the data U-TOC, the overall management information file and the picture data management file recorded in the RAM 6a. Thus, the entire routine according to another recording operation shown in FIG. 34 is completed.

It is to be noted that these steps S45 to S51 respectively correspond to the above-described steps S18 to S24 sown in FIG. 33.

In such another recording operation, retrieval areas of low resolution, intermediate resolution and high resolution (or ultra high resolution) are respectively designated by addressing of allocation blocks within the VS stored in the RAM 6a. Namely, by only reading out data of the VS of the RAM 6a, the recording area on the disc is divided by addressing. For this reason, detection of space area can be made at high speed.

For example, it is conceivable to physically determine recording positions of respective areas on the disc to carry out recording. However, since area quantities used in the HD recording mode and the UD recording mode (area of intermediate resolution and area of higher resolution) are different from each other in this case, it is necessary to ensure the area in advance on the assumption that the area quantity is required to the maximum degree. Namely, it is necessary to ensure respective areas of 400 clusters at the time of HD recording mode in the intermediate resolution area and 1800 clusters at the time of UD mode in the high resolution area. For this reason, it is impossible to effectively utilize the recording area.

In addition, while it has been described that addresses for retrieval of space area are designated as addresses for index, intermediate resolution and higher resolution from the disc inner circumferential side, addresses for retrieval of space area may be designated as addresses for index, intermediate resolution and high resolution from the disc outer circumferential side in a manner opposite to the above. Such addressing method may be suitably changed in accordance with design.

As stated above, such an approach is employed to form intermediate resolution picture data and low resolution picture data on the basis of high resolution picture data which has been read out from the frame memory 11 to record picture data of different resolutions of the same picture onto the optical disc 20, thereby making it possible to select and reproduce picture data of resolution corresponding to output equipment or use purpose of picture data.

Namely, when only the high resolution picture data is recorded as picture data to be recorded on the optical disc 20, in the case where picture image is displayed on the monitor unit, since the number of pixels of the high resolution picture data is too great, suitable thinning processing is implemented thereto to deliver the data thus obtained to the monitor unit. However, the above-mentioned three kinds of picture data are recorded in advance, thereby making it possible to directly the intermediate resolution picture data for monitor. For this reason, the time required until displayed on the monitor unit can be shortened.

Moreover, since picture data of the required resolution can be directly read out, there is no necessity of carrying out thinning processing, etc. in dependency upon equipment. Thus, the circuit for thinning processing, etc. can be omitted.

Further, since the above-mentioned two kinds of picture data are formed on the basis of high resolution picture data from the frame memory 11, the time required for taking in picture data can be shortened as compared to the case where three kinds of picture data are independently supplied. In addition, since it is sufficient to carry out only one read-out control of the frame memory 11, the constraint time of the frame memory 11 can be shortened.

Further, since the picture data of respective resolutions are recorded after respectively undergone fixed length encoding, fixing of recording/read-out times and fixing of the recording number of pictures can be realized. In addition, since data size to be handled is fixed, the configuration of the file management system can be simplified.

8. [Description of the Third Recording Operation]

The third recording operation in which the system controller 6 records, onto the optical disc 20, high resolution picture data and intermediate resolution picture data, and records index picture data into overall index file (OV INDX. PMX).

This overall index file is caused to undergo management by overall information management file, and is file in which what index pictures are recorded in respective picture directories are edited as a single file.

For example, in this example, in the case where five picture directories including 25 index pictures are formed, respective one index pictures of the leading portions of respective directories are taken out to record respective pictures in order to form overall index file consisting of five index pictures. In addition, in the case where the number of picture directories is set to smaller value, leading five pictures of index pictures may be respectively taken out from respective directories to form overall index file.

This overall index file is formed at the time of format for picture data. For this reason, such overall index file is already formed in recording picture.

Figure 35:
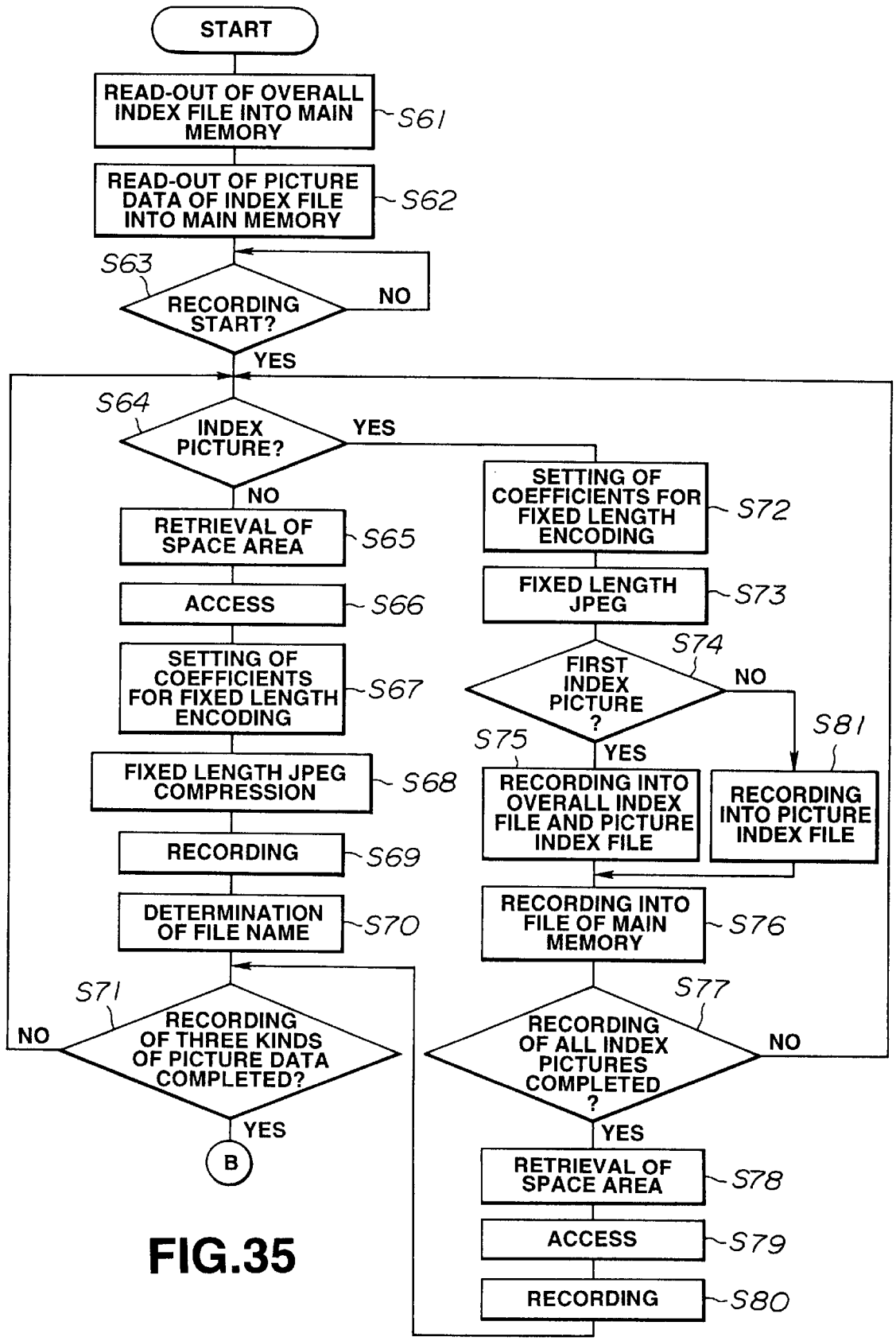
FIG. 35 is a flowchart for explaining the forming operation of the first half of overall index file in the still picture filing system.

The operation for forming the overall index file is as indicated by the flowchart of FIG. 35. The processing operation by the flowchart shown in FIG. 35 starts when discrimination result of Yes is provided at step S10 of FIG. 32. Thus, the processing operation proceeds to step S61. It is to be noted that the routine before the step S10 is entirely the same, their description is omitted.

Subsequently, at step S61, the system controller 6 reads out the overall index file into the main memory 11a. Thus, the processing operation proceeds to step S62.

At the step S62, the system controller 6 controls the disc recording/reproduction section 5c through the storage unit controller 5d so as to read out all picture data recorded in the picture index file of the designated picture directory, and carries out a control for transferring picture data of the picture index file into the main memory 11a shown in FIG. 4. Thus, the processing operation proceeds to step S63.

It is to be noted that picture data recorded after undergone fixed length encoding along with header is read out as it is from the picture index file and the overall index file without allowing it to undergo expansion decoding processing to transfer it into the main memory 11a. In addition, when no picture data is recorded within the picture index file and the overall index file, there is no possibility that picture data is read out into the main memory.

At the step S63, the system controller 6 detects operation state of the operation unit 10 to thereby whether or not designation of recording start is made from user. In the case of No, this step S63 is repeated until designation of the recording start is made. In the case of Yes, the processing operation proceeds to step S64.

At the step S64, the system controller 6 discriminates whether or not picture to be recorded from now on is index picture. In the case of No, the processing operation proceeds to step S65. In the case of Yes, the processing operation proceeds to step S72.

At the step S72, the system controller 6 delivers data indicating that picture to be recorded from now on is index picture to the thinning and compression/expansion controller 4i shown in FIG. 5. When the data is delivered, the compression/expansion controller 4i sets fixed length encoding coefficients for index picture at the compression/expansion circuit 4h. Thus, the processing operation proceeds to step S73.

At the step S73, the system controller 6 controls, through the thinning and compression/expansion controller 4i, the compression/expansion circuit 4h so as to implement compression encoding processing to the picture data which has been caused to undergo thinning processing into ¼ on the basis of the set fixed length encoding coefficients to thereby form index picture which has been caused to undergo fixed length encoding so as to have fixed data length of $1/15$ clusters. Thus, the processing operation proceeds to step S74.

At the step S74, the system controller 6 discriminates, on the basis of data of the overall information management file stored in the RAM 6a, whether or not the index picture which has been caused to undergo fixed length encoding at the step S73 is the index picture which is first recorded in the designated picture directory. In the case of No, the processing operation proceeds to step S81. In the case of the index picture, the processing operation proceeds to step S75.

At the step 81, the system controller 6 records the index picture which has been caused to undergo fixed length encoding into the picture index file. Thus, the processing operation proceeds to step S76.

At the step S75, the system controller 6 records the first index picture into the overall index file and the picture index. Thus, the processing operation proceeds to step 76.

At the step S76, the system controller 6 controls the memory controller 13 so as to record index picture of 4096 bytes in total in which headers are added into respective index files stored in the main memory 11a shown in FIG. 4. Thus, the processing operation proceeds to step S77.

At the step S77, the system controller 6 discriminates as to whether or not all index pictures are recorded into the main memory 11a. In the case of No, the processing step returns to the step S64. In the case of Yes, the processing operation proceeds to step S78.

At the step S78, the system controller 6 retrieves the portion in which entry of 2 bits (code indicating available allocation block) of allocation block No. of Volume Space Bitmap VS in the data U-TOC stored in the RAM 6a is "00" to thereby detect space area. Thus, the processing operation proceeds to step S79.

At the step S79, the system controller 6 controls the disc recording/reproduction section 5c so as to provide access to the detected space area on the optical disc 20 through the storage unit controller 5d. Thus, the processing operation proceeds to step S80.

At the step S80, the system controller 6 controls the disc recording/reproduction section 5c so as to record the index picture into the space area on the optical disc 20 through the storage unit controller 5d. Thus, the processing operation proceeds to step S71.

As described above, in the case where the index pictures are caused to undergo fixed length encoding to record them onto the optical disc 20, before the index pictures which have been caused to undergo fixed length encoding are recorded onto the optical disc 20, they are temporarily recorded in order into the main memory 11a to thereby form one index file from all the index pictures in the main memory 11a thereafter to record it into physically continuous areas on the optical disc 20.

On the other hand, when the discrimination result is No at the step S64, the processing operation proceeds to step S65. At the step S65, the system controller 6 detects space area on the optical disc 20 for recording picture of intermediate resolution or picture of high resolution. Thus, the processing operation proceeds to step S66.

In more practical sense, the system controller 6 retrieves the portion in which entry of 2 bits (code indicating available allocation block) of allocation block No. of Volume Space Bitmap VS in the data U-TOC stored in the RAM 6a is "00" to thereby carry out detection of the space area.

At the step S66, the system controller 6 detects optimum space area of space areas retrieved at the step S65 as described above to control the disc recording/reproduction section 5c through the storage unit controller 5d so as to provide access thereto. Thus, the processing operation proceeds to step S67.

At the step S67, the system controller 6 sets fixed length encoding coefficients corresponding to high resolution picture data or ultra high resolution picture data at the thinning and compression/expansion controller 4i. Thus, the processing operation proceeds to step 68.

At the step S68, the thinning and contraction/expansion controller 4i controls the compression/expansion circuit 4h so as to form high resolution picture data of 8 clusters or ultra high resolution picture data of 18 clusters on the basis of the set fixed length encoding coefficients. Thus, the processing operation proceeds to step S69.

At the step S69, the system controller 6 controls the disc recording/reproduction section 5c so as to record the picture data which has been caused to undergo fixed length encoding into the detected optimum area on the optical disc 20. Thus, the processing operation proceeds to step S70.

At the step S70, as described above, the system controller 6 carries out recording control of the picture data, and successively determines file names corresponding to data of the picture data management file of the designated directory and resolutions of respective picture data. Thus, the processing operation proceeds to step S71.

At the step S71, the system controller 6 discriminates whether or not picture data of three kinds of resolutions of low resolution picture data (index picture), intermediate resolution picture data and high resolution picture data (or ultra high resolution picture data) have been all recorded. In the case of No, the processing operation returns to step S64 to record picture data of resolution which has not yet been recorded. In the case of Yes, the processing operation proceeds to step S91 shown in FIG. 36.

When recording of picture to be recorded is completed in this way, it is possible to carry out switching of the data of overall index picture by user. Since setting is made such that, e.g., first index pictures of respective directories are recorded in advance, in the overall index file formed simultaneously with formation of files of respective pictures of high resolution, intermediate resolution and index, only the first index pictures of respective directories are recorded. However, in the case where user has a desire, it is possible to carry out switching between the first index picture and registered in the overall management file and any other index picture.

Figure 36:
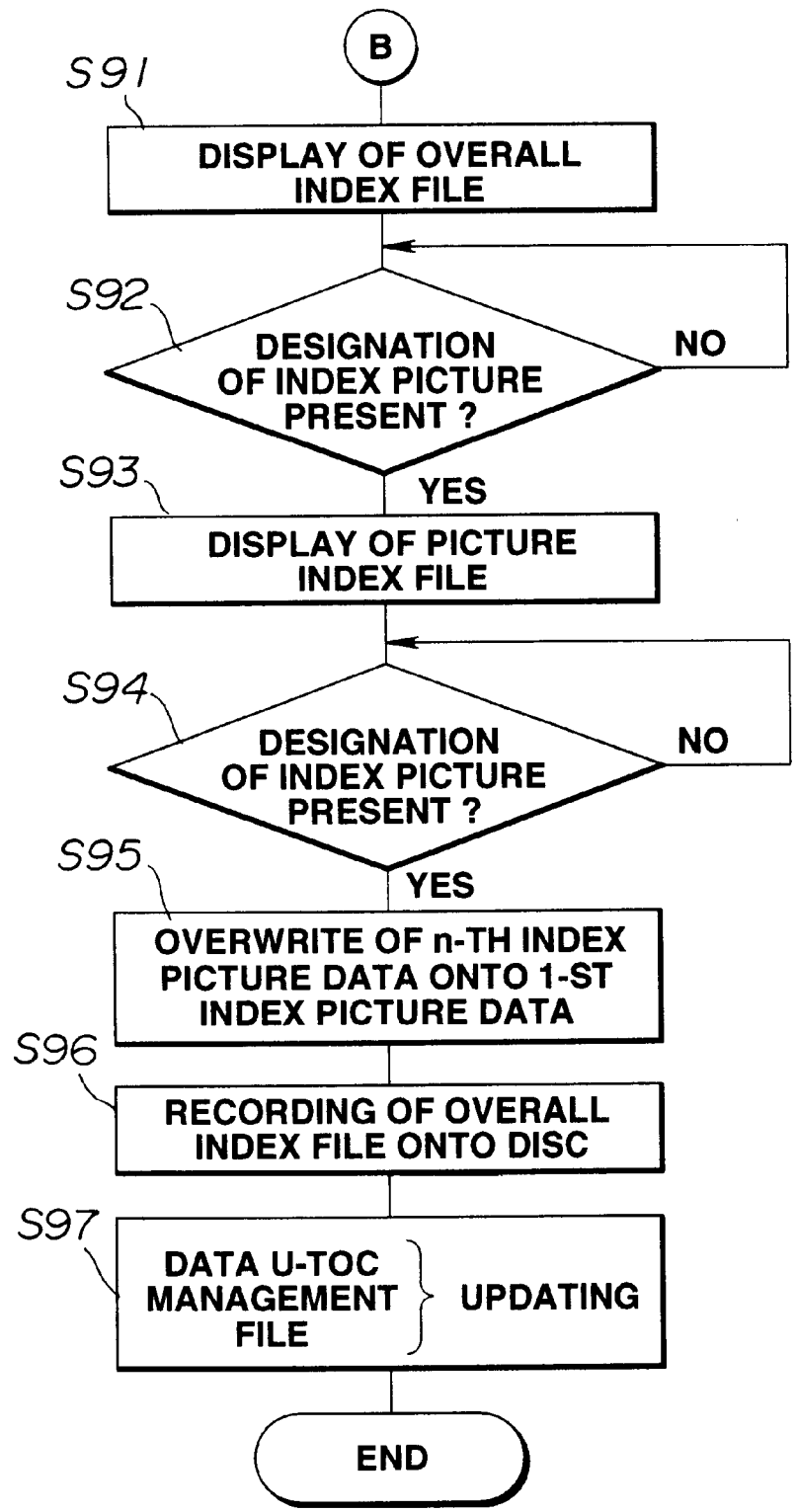
FIG. 36 is a flowchart for explaining the forming operation of the latter half of the overall index file in the still picture filing system.

The switching operation of the desired index picture is as indicated by the routine of the step S91 and steps subsequent thereto of FIG. 36.

Namely, at the step S91 of FIG. 36, the system controller 6 carries out display control of the overall index picture. Thus, the processing operation proceeds to step S92.

At the step S92, the system controller 6 detects operation state (situation) of the operation unit 10 to thereby discriminate whether or not designation of index picture that user desires is made. In the case of No, this step S92 is repeated. In the case of the index picture, the processing operation proceeds to step S93.

Namely, at this step S92, desired index picture is designated from the overall index file. This indicates that picture directory corresponding to the designated index picture is designated. It is to be noted, in the following description, the designated picture directory is assumed to be picture directory recorded at the n-th position.

Subsequently, at the step S93, the system controller 6 carries out a control to reproduce the picture index file of the n-th picture directory designated at the step S92 to display it on the monitor unit. Thus, the processing operation proceeds to step S94.

At the step S94, the system controller 6 detects operation state (situation) of the operation unit 10 to thereby discriminate whether or not a desired index picture is designated from a predetermined number of index pictures of the picture index file displayed on the monitor unit. In the case of No, this step S94 is repeated. In the case of Yes, the processing operation proceeds to step S95.

Namely, at this step S94, desired index picture is designated from the n-th picture index file. Namely, this indicates that index picture recorded in place of the first index picture is designated. It is to be noted, in the following description, this designated index picture is assumed to be index picture recorded at the m-th position of the picture index file.

At the step S95, the system controller 6 controls the memory controller 13 so as to overwrite the m-th index picture data recorded in the picture index file of the n-th picture directory in the main memory at the position where the n-th index picture data recorded in the overall index file is recorded. At the same time, in the RAM 6a, index picture number "00001" recorded in the picture directory information unit corresponding to the n-th picture directory, i.e., the n-th picture directory information unit is replaced by picture number "0000m" corresponding to the newly switched (replaced) index picture. Thus, the processing operation proceeds to step S96.

At the step S96, the system controller 6 controls the disc recording/reproduction section 5c so as to record the overall information management file onto the optical disc 20. Thus, the processing operation proceeds to step S97.

At the step S97, the system controller 6 updates related data of the data U-TOC, the overall information management file and the picture data management file recorded on the disc into respective data of the data U-TOC, the overall information management file and the picture data management file recorded in the RAM 6a. Thus, the entire routine is completed.

It is to be noted that while the above-described overall index file is adapted so that while first one index pictures of respective directories are recorded at the data recording time, an approach may be employed such that in the case where the number of directories is reduced, first five index pictures of respective directories are registered. For instance, an example in which four picture directories are formed to resister five index pictures thereof will now be described. As described below, 20 units are formed so that units of picture directory information correspond to 5 (pictures)×4 directories=20 (pictures) of the number of index pictures within the overall index file.

|  | Directory No. | Index Picture No. |
| --- | --- | --- |
| First picture directory information | 00 | 00 |
| second picture directory information | 00 | 01 |
| Third picture directory information | 00 | 02 |
| Fourth picture directory information | 00 | 03 |
| Fifth picture directory information | 00 | 04 |
| Sixth picture directory information | 01 | 00 |
| Seventh picture directory information | 01 | 01 |
| Eighth picture directory information | 01 | 02 |
| Ninth picture directory information | 01 | 03 |
| Tenth picture directory information | 01 | 04 |
| Eleventh picture directory information | 02 | 00 |
| Twelfth picture directory information | 02 | 01 |
| Thirteenth picture directory information | 02 | 02 |
| Fourteenth picture directory information | 02 | 03 |
| Fifteenth picture directory information | 02 | 04 |
| . | | |
| . | | |
| . | | |

9. [Playback (Reproduction) and Display of Index Picture]

The playback (reproduction) and display operations of pictures in the still picture filing system will now be described in more detail with reference to the flowchart of FIG. 37.

Figure 37:
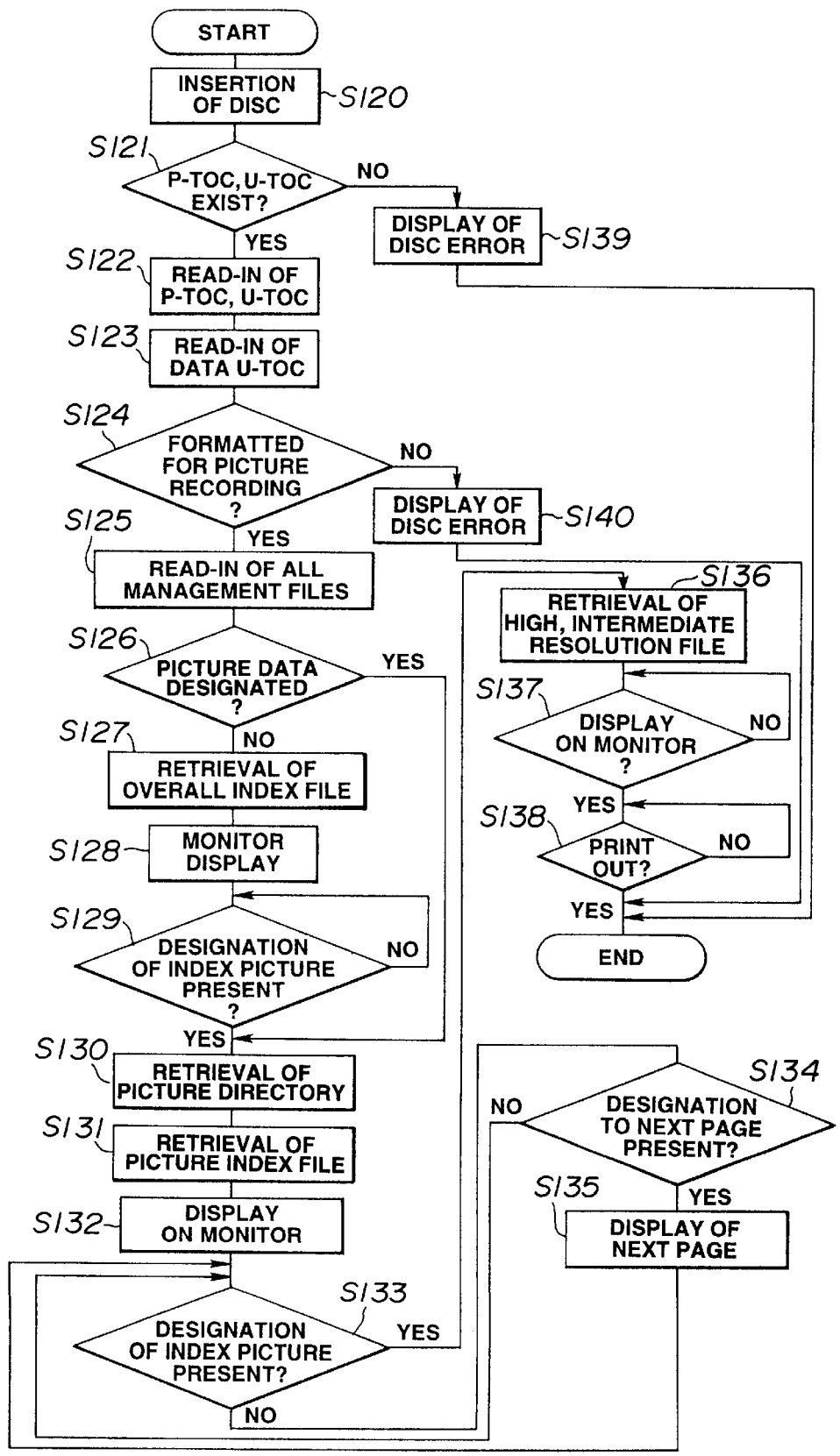
FIG. 37 is a flowchart for explaining reproduction (playback) operation in the still picture filing system.

When the storage unit 5 is brought into stand-by state, the processing operation by the flowchart shown in FIG. 37 starts to proceed to step S120.

At the step S120, user inserts optical disc 20. Then, the processing operation proceeds to step S121. Thus, the inserted optical disc 20 is loaded into the storage unit 5, resulting in the state where picture data can be reproduced.

At the step S121, the system controller 6 controls the disc recording/reproduction section 5c so as to read thereinto P-TOC and U-TOC recorded on the optical disc 20 to discriminate whether or not P-TOC and U-TOC exist on the optical disc 20. In the case where the respective TOC do not exist, the processing operation proceeds to step S139 to allow the display section 26 to undergo display control so as to display "disc error". In the case where the respective TOC exist, the processing operation proceeds to step S122.

At the step S122, the system controller 6 controls the disc recording/reproduction section 5c so as to read thereinto the P-TOC and the U-TOC to confirm position of data U-TOC. Thus, the processing operation proceeds to step S123. Since management of the area where data file is formed cannot be carried out by the U-TOC, in the case where data file exists, it is judged that data U-TOC exists at the leading portion thereof.

At the step S123, the system controller 6 stores data of the data U-TOC into the RAM 6a to grasp positions of respective directories and files. Thus, the processing operation proceeds to step S124.

At the step S124, the system controller 6 discriminates whether or not the optical disc 20 is formatted for picture recording. In more practical sense, the system controller 6 discriminates, on the basis of data of the data U-TOC stored in the RAM 6a, whether or not directory (PIC_MD), overall information management file, (at least one) picture directory, picture data management file, and picture index file exist to thereby discriminate whether or not the optical disc 20 is formatted for picture recording. In the case of No, the processing operation proceeds to step S140 at which the display section 26 is caused to undergo display control so as to display "disc error". Then, the processing operation is completed as it is. In the case of Yes, the processing operation proceeds to step S125.

At the step S125, the system controller 6 controls the disc recording/reproduction section 5c so as to read out all management files (overall information management file, picture data management files of respective directories, print control data management file, reproduction control management file) through the storage unit controller 5d, and temporarily stores, into the RAM 6a, all the management files which have been read out. Thus, the processing operation proceeds to step S126.

At the step S126, the system controller 6 discriminates whether or not designation of picture to be displayed is made. In the case of Yes, the processing operation proceeds to step S130. In the case of No, the processing operation proceeds to step S127.

At the step S127, the system controller 6 retrieves overall index file recorded on the optical disc 20. Thus, the processing operation proceeds to step S128.

Particularly, in the case where no designation of picture directory is made, it is necessary to display what picture data are recorded in respective directories to cause user to designate desired picture. For this reason, at the step S128, the system controller 6 controls the disc recording/reproduction section 5c so as to display overall index file recorded on the optical disc 20. Thus, the processing operation proceeds to step S129. The overall index file is file in which index picture data which are the same as an arbitrary one index picture of index picture data stored in the picture index files within respective picture directories are registered in display order of monitor. By monitor-displaying the overall index file, user can carry out designation of desired picture directory.

At the step S129, the system controller 6 detects operation state of the operation unit 10 to thereby discriminate, whether or not index picture that user desires is designated, from the monitor-displayed index picture. In the case of No, the step S129 is repeated until that designation is made. In the case of Yes, the processing operation proceeds to step S130.

At the step S130, the system controller 6 retrieves picture directory corresponding to designated index picture. Thus, the processing operation proceeds to step S131.

Namely, picture directory information unit (data of 48 bytes) in the overall information management file stored in the RAM 6a are registered by the same number as the number of index pictures (=the number of picture directories) displayed, and are recorded in order so as to correspond to the display order of index pictures. For example, explanation will be given by taking the example where the second index picture displayed is designated by the overall information management file. Initially, picture directory information unit of 48 bytes corresponding to the designated second index picture is recorded at the second portion from the leading portion. In the directory No. of the second picture directory information unit, data of "00001" is recorded. By this data, it is understood (recognized) that the directory in which this index picture is recorded is picture directory of the second PIC0001.

At the step S131, the system controller 6 retrieves picture index file within the directory retrieved at the step S130. Thus, the processing operation proceeds to step S132.

At the step S132, the system controller 6 allows the monitor unit 9 to undergo display control so as to display the first picture index files (including index pictures corresponding to 25 pictures) within the retrieved directory. Thus, the processing operation proceeds to step S133.

At the step S133, the system controller 6 detects operation state of the operation unit 10 to thereby discriminate whether or not designation of picture that user desires is made from index pictures displayed on the monitor unit 9. In the case of No, the processing operation proceeds to step S134. In the case of Yes, the processing operation proceeds to step S136.

At the step S134, the system controller 6 detects the operation state of the operation unit 10 to thereby discriminate whether or not designation of display of the next picture index file (including index pictures corresponding to the remaining 25 pictures) is made. In the case of No, the processing operation returns to the above-described step S133. In the case of Yes, the processing operation proceeds to step S135.

At the step S135, the system controller 6 allows the monitor unit 9 to undergo display control so as to display index pictures corresponding to the remaining 25 pictures thereon. Thus, the processing operation returns to the above-described step S133.

On the other hand, at the step S133, in the case where it is discriminated that designation of index picture is made, the processing operation proceeds to step S136. At this step, the system controller 6 retrieves high resolution picture file or intermediate resolution picture file corresponding to the designated index picture. Thus, the processing operation proceeds to step S137.

In more practical sense, the system controller 6 selects picture data management file corresponding to the picture directory in which displayed index file exists from respective picture data management files of respective picture directories stored in the RAM 6a. In the picture information units (16 bytes) of the selected picture data management file, there are registered picture information units having the same number as the number (N) of indices registered in the picture index file. In addition, these picture information units are recorded in order so as to correspond to the order of displayed indices.

For example, explanation will now be given in connection with the case where 25 index pictures displayed by the picture index file are index file of the first picture directory and the fourth index picture is designated from that index file. Initially, since the displayed index file is the index file of the first picture directory, the system controller 6 initially makes reference to data of the first picture data management file in the RAM 6a. When the fourth index picture is designated by user, the system controller 6 carries out retrieval of the fourth picture information unit of the picture data management file to which reference has been made. In the data of the retrieved picture information unit, data of "00000" is recorded as the directory No. and data of "00003" is recorded as picture information. Accordingly, with respect to the picture file of high resolution corresponding to the designated index picture, file name in the picture directory "PIC00000" is judged to be "PHP00003". With respect to the picture file of intermediate resolution, file name in the picture directory "PIC00000" is judged to be "PSN00003".

It is to be noted that when index picture is selected as described above to retrieve picture files of high resolution and intermediate resolution corresponding thereto, an approach is employed such that, on the basis of data in the picture information unit of the picture data management file, picture file corresponding thereto is necessarily retrieved.

For example, when position of the index picture is changed by editing, etc. which will be described later, any difference takes place between the display order of index pictures and the picture No. of picture files. However, in the still picture filing system, since the display order of the index pictures and picture No. of picture files are in correspondence with each other, even in the case where display order of index pictures is changed, correspondence relationship between index pictures and picture files of high resolution and intermediate resolution is attained by the picture information unit of the picture data management file. The detail thereof will be described in the chapter of "Edit of picture" which will be referred to later.

At the step S137, the system controller 6 detects operation state of the operation unit 10 to thereby discriminate whether or not monitor display of the retrieved picture file of the intermediate resolution is designated. In the case of Yes, the processing operation proceeds to step S138. In the case of No, this step S137 is repeated.

At the step S138, the system controller 6 controls the disc recording/reproduction section 5c so as to read out data of the retrieved picture file of intermediate resolution to allow the monitor unit 9 to undergo display control so as to display the picture file of intermediate resolution reproduced by such an operation, and to discriminate whether or not designation of printout of the retrieved picture file of high resolution is made. As a result, in the case of No, the step S138 is repeated. On the other hand, in the case of Yes, the system controller 6 controls the disc recording/reproduction section 5c so as to read out the retrieved picture file of high resolution to deliver it to the printer unit 2 through the main memory 11a. Thus, the entire routine of reproduction and display of the index picture shown in FIG. 37 is completed.

In this example, at the printer unit 2 to which the picture file of high resolution has been delivered, high resolution picture data delivered as respective data of R, G, B are converted into yellow (Y), magenta (M) and cyan (C) to print these data onto the printer paper by the thermal head in order from the Y data.

10. [Retrieval of File and Picture Directory]

Figure 38:
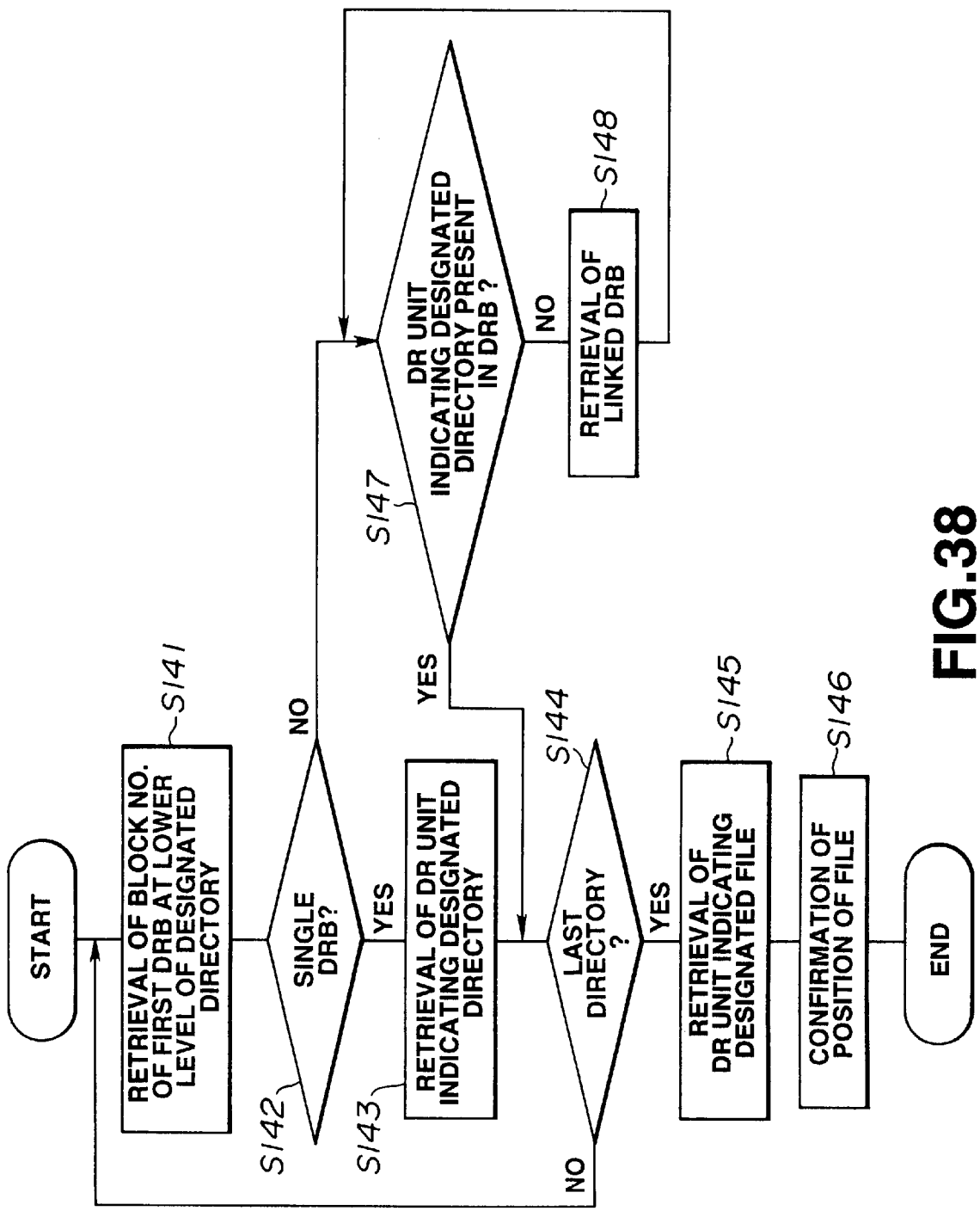
FIG. 38 is a flowchart for explaining retrieval operation of picture data designated in the still picture filing system.

Explanation will be given in connection with the case where, e.g., picture file f5 (PSN00000. PMP) is retrieved with reference to the hierarchical structure of file which has been described with reference to the FIG. 19 mentioned above, etc. This retrieval operation is as indicated by the flowchart of FIG. 38. The processing operation by the flowchart shown in FIG. 38 starts when data of the data U-TOC is stored into the RAM 6*a* and desired picture directory and file name are designated by user to proceed to step S141.

At the step S141, the system controller 6 retrieves, on the basis of Volume Descriptor (VD) of the volume management area, block No. of the first Directory Record Block (DRB) indicating directory (PIC-MD). Thus, the processing operation proceeds to step S142.

In more practical sense, position of DRB within the management block is recorded in terms of the block No. by data indicating position of the first directory record block of the VD. In this still picture filing system, block No. of the first DRB is expressed as "0004" as described above. Accordingly, the system controller 6 judges that DRB for indicating directory D1 (PIC-MD) is DRB indicated by the management block number "0004".

Subsequently, at step S142, the system controller 6 discriminates, by making reference to entry of the management block in MT, whether or not the designated DRB is single DRB or successive DRBs. In the case of single DRB, the processing operation proceeds to step S143. In the case where DRB is not single, the processing operation proceeds to step S147.

Figure 20:
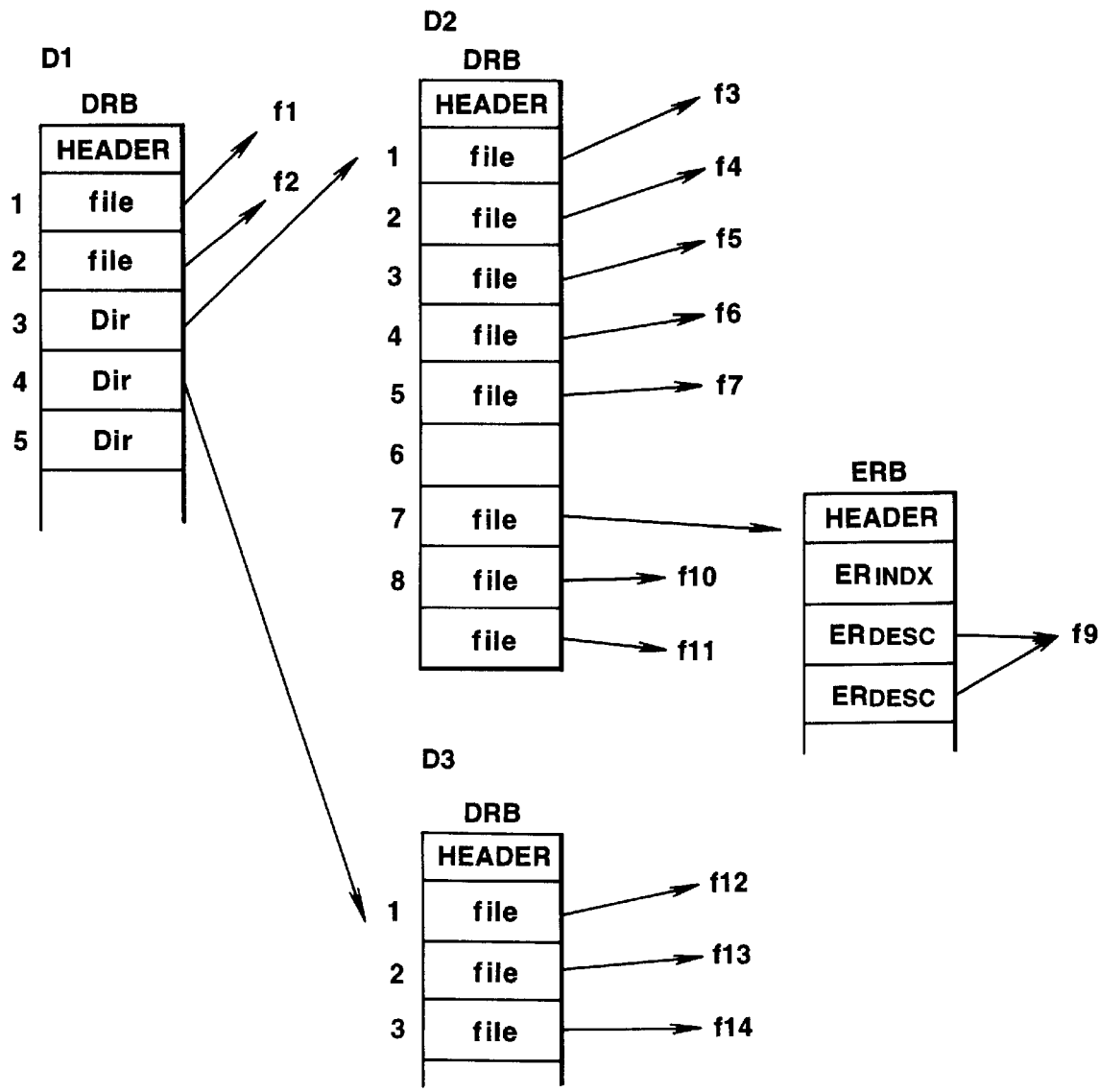
FIG. 20 is a view for explaining DRB and ERB constituting the management block.

It is to be noted that since DRB of the management block number "0004" is single DRB in the file hierarchical structure shown in FIG. 20, the processing operation proceeds to step S143.

At the step S143, the system controller 6 retrieves DR unit for directory for indicating recording position of picture directory D2 (PIC00000) where picture file f5 exists from plural DR units provided in the DRB indicating directory D1.

In the file hierarchical structure shown in FIG. 19, since the third DR unit of the DRB indicating directory D1 is DR unit for directory for indicating recording position of picture directory D2, DR unit for directory which is the third DR unit is retrieved. In the DR unit for directory which is the third DR unit, "Index to DRB" is recorded. By management block number recorded as "Index to DRB", block position of DRB indicating picture directory D2 is designated. Namely, since "0005" is recorded as data of "Index to DRB" in the file hierarchical structure shown in FIG. 19, it is judged that DRB for indicating picture directory D2 is DRB indicated by management block number "0005".

On the other hand, at the step S147, the system controller 6 retrieves in order DR units within the DRB to judge whether or not DR unit for directory for indicating designated picture directory exists. In the case of No (i.e., in the case where no DR unit indicating designated picture directory exists within the linked first DRB), the processing operation proceeds to step S148. In the case of Yes (i.e., in the case where DR unit indicating designated picture directory exists within the linked first DRB), the processing operation proceeds to step S144. It is to be noted that in the case where picture file f5 is retrieved in the file hierarchical structure of FIG. 20. since DRB indicating directory D1 (PIC-MD) and DRB indicating picture directory D2 (PIC00000) are both single DRB, these steps S147 and S148 are not used.

At the step S144, the system controller 6 judges whether or not the DR unit for directory retrieved at the step S143 is DR unit for directory indicating designated directory. Since the file structure used in this still picture filing system is tree structure as shown in FIG. 19, whether or not the retrieved directory is the last directory (directory of the lowermost layer (level)) in the process coming to the designated directory. In this example, in retrieving picture file f5 in the file hierarchical structure of FIG. 19, picture directory D2 indicated at step S143 is the lowermost layer (level) directory. For this reason, judgment result at the step S144 becomes Yes. The processing operation proceeds to step S145.

At the step S145, the system controller 6 retrieves DR unit for file for indicating recording position of picture file f5 from plural DR unit provided in DRB for indicating the picture directory D2 retrieved at the step S143.

Namely, in the file hierarchical structure shown in FIG. 19, the third DR unit of DRB indicating picture directory D2 is DR unit for file for indicating picture file f5. For this reason, DR unit for file which is the third DR unit is retrieved by this step S145. In the DR unit for file, "Extent Start Location" is recorded. By the allocation block number recorded as "Extent Start Location", recording position of the picture file f5 is designated. Thus, the processing operation proceeds to step S146.

At the step S146, the system controller 6 provides an access to the allocation block position retrieved at the step S145 within the file extents area to confirm that the picture file f5 exists at the position to which access has been made. It is possible to reproduce picture file f5 with the access position being as the leading portion.

In this still picture filing system, since retrieval of picture files is carried out in a manner as described above, the number of physical read-in operations for file retrieval can be reduced. Thus, picture files within picture directories caused to be of the hierarchical directory structure can be retrieved with ease and at a high speed.

Moreover, since information relating to the hierarchical directory structure are concentrated into the second area (volume management area), in the case of reading out information necessary for file retrieval, it is sufficient to provide access only to the volume management area. For this reason, recording position of file can be grasped. Accordingly, the number of picture files can be reduced, and the read-out operation of the picture files are thus carried out at a high speed.

In addition, since any large capacity of data such as picture data, etc. is not recorded in the volume management area, but only management data is recorded, such data are very suitable for storing them into the RAM. Thus, once such management data is caused to be stored into the RAM, the number of access operations to the optical disc for the purpose of retrieving file can be further reduced.

11. [Edit of Picture]

When recording of picture is completed, it becomes possible to carry out editing of index pictures by selection of user. The editing of picture refers to, e.g., work for moving picture data of a certain picture directory to another picture director, and work for carrying out switching of index pictures within the same directory to change display order of index pictures, etc.

The case where index picture displayed at the fifth position within the first directory is moved to the tenth display position of the second directory will be described below as an example with reference to the flowchart of FIG. 39.

Figure 39:
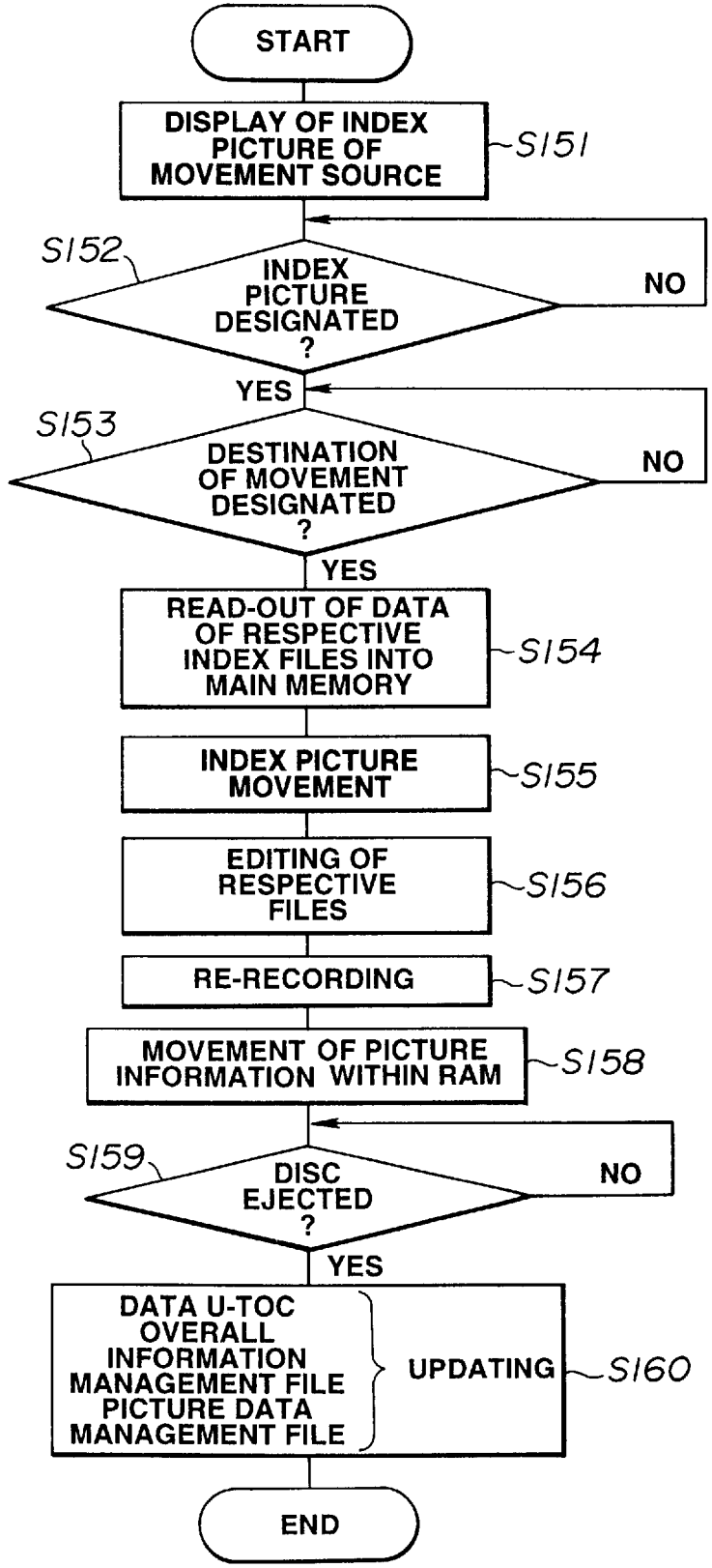
FIG. 39 is a flowchart for explaining the editing operation of picture data in the still picture filing system.

The processing operation by the flowchart shown in FIG. 39 starts when recording of a desired picture is completed and user allows the edit designation key to be turned ON to proceed to step S151.

At the step S151, the system controller 6 controls the disc recording/reproduction section 5c so as to read out index file of (the first) picture directory of movement source to display 25 index pictures. Thus, the processing operation proceeds to step S152 (see the chapter of reproducing operation).

At the step S152, the system controller 6 discriminates whether or not index picture to be moved within the picture directory of movement source is designated (whether or not index picture displayed at the fifth position (location) of the first directory is designated). In the case of No, this step S152 is repeated. In the case of Yes, the processing operation proceeds to step S153.

At the step S153, the system controller 6 detects operation state of the operation unit 10 to thereby discriminate whether or not picture directory of movement destination and movement position are designated (the original picture is moved to the tenth index picture of the second directory in the case of this example). In the case of No, this step S153 is repeated. In the case of Yes, the processing operation proceeds to step S154.

At the step S154, the system controller 6 controls the disc recording/reproduction section 5c, etc. so as to read out all index pictures of index file of picture directory of movement source and all index pictures of index file of picture directory of movement destination into the main memory 11a. Thus, the processing operation proceeds to step S155.

At the step S155, the system controller 6 controls the memory controller 13 so as to move only the designated index picture (including header as well) from the index file of source of movement (first picture directory) to index file of destination of movement (second picture directory). Thus, the processing operation proceeds to step S156.

Namely, in the picture index file, respective index pictures have fixed capacity of 4096 bytes in all including the header and the data body. Accordingly, since, in this example, 4096 bytes subsequent to 4096×3 bytes from the leading portion of the index file is determined to be data of the fourth index picture (including header as well), position of index picture within the picture index file can be easily grasped. Similarly, since destination of movement of data of the index picture (4096 bytes) to be moved is designated to be area subsequent to 4096×9 bytes of index file of (the second) directory of destination of movement, corresponding index picture is inserted into the area. The insertion mentioned here refers to the fact that corresponding index picture is inserted into the portion between the eighth index picture and the ninth index picture, but does not refer to the fact that it is overwritten onto the ninth index picture.

Subsequently, at the step S156, the system controller 6 controls the memory controller 13 so as to delete (erase) the moved index picture of the index file of source of movement to update file to supplement the moved index picture of the index file of destination of movement. Then, the system controller 6 updates the file of destination of movement. Thus, the processing operation proceeds to step S157.

At the step S157, the system controller 6 re-records, at the same portion on the disc, the index file of the source of movement and the index file of the destination of movement which have been respectively edited. Thus, the processing operation proceeds to step S158. It is to be noted that if there is any other portion where the area can be ensured in place of the same portion, that portion may be employed (utilized).

At the step S158, the system controller 6 moves, in the RAM 6a, picture information unit recorded at the fifth recording position of plural picture information units (16 bytes) which have been recorded within the picture data management file of source of movement (first directory) to the tenth picture information unit within the picture data management file of destination of movement (second directory) without changing data. Thus, the processing operation proceeds to step S159. It is to be noted that any updating of data is not implemented to files of picture data of high resolution and intermediate resolution.

Subseqently, at the step S159, the system controller 6 discriminates whether or not eject operation is designated at the operation unit 10. In the case of No, this step S159 is repeated. In the case of Yes, the processing operation proceeds to step S160.

At the step S160, the system controller 6 controls the disc recording/reproduction section 5c so as to read out data U-TOC, overall information management file and picture data management file in the RAM 6a to write them onto the disc to thereby update the respective data. Thus, the entire routine according to the editing operation of picture is completed.

A recording medium adapted to be provided with header in which data for carrying out correspondence with display order of index pictures is recorded at the leading portion of the file of high resolution or intermediate resolution picture data is taken as an example here. When attempt is made to carry out editing as described above in such a recording medium, it is possible to establish correspondence with display order of index pictures by rewriting data of the header. However, it is necessary for rewriting data of the header to temporarily read out all data of picture file (including picture data as well), with the result that it takes much time in reproduction (playback) from the disc.

In the above-described editing operation in this still picture filing system, however, an approach is employed such that, with respect to the index file, switching of physical position on the disc is carried out in accordance with the order actually displaced, but, with respect to the picture data of high resolution and intermediate resolution, switching of data of picture information unit within the picture data management file which has been read into the RAM 6a is carried out without carrying out any change of position on the disc. Further, correspondence between the display order of index pictures and high resolution picture file and intermediate picture file can be ensured only by such switching (replacement) between respective data. For this reason, rewrite operation is required only for switching of index pictures within the index file and rewriting of picture data management file in the RAM 6a. Accordingly, rewrite data can be extremely reduced. Thus, rewrite work can be carried out at a high speed.

Moreover, since physical position on the disc of the index picture is changed so that the index files take the same order as the display order, it is possible to realize high speed read-out operation of index file.

Further, also when order of display of index pictures is changed within the same index file of the same picture directory, such a change can be carried out by similar control. For example, in the case of changing display order so as to display the seventh index picture within the same index file at the second position (location), all data of the index file are first once read out from the disc into the main memory 11a to move the seventh index picture to the second recording position to edit the index file in the main memory thereafter to re-record it onto the disc. On the other hand, in the RAM 6a, within the picture data management file, the seventh picture information unit of 16 bytes is inserted into the second position without changing data. Namely, also in the case where order of display of index pictures is changed within the same picture directory, only the index file and the picture information unit in the RAM are rewritten, but actual picture data are not rewritten.

12. [Description of Index Print]

The index print will be described below. The index print described below means an operation for printing index pictures onto an index card accommodated within a cassette case for accommodating a disc cassette therewithin.

Figure 40:
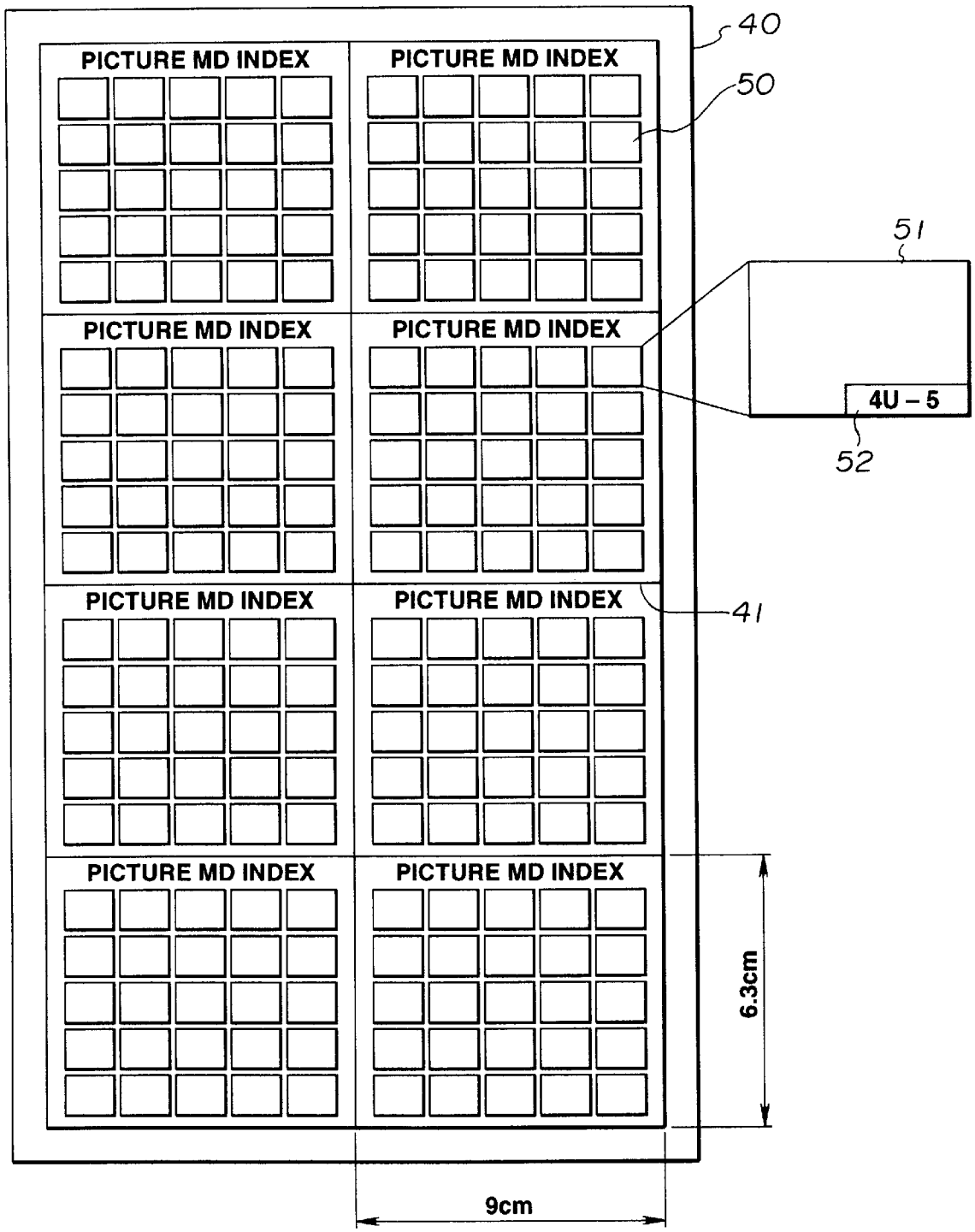
FIG. 40 is a plan view of index card subjected to print by the still picture filing system.

Explanation will be given below in more practical sense with reference to the attached drawings. Initially, index cards 50 onto which index picture is subjected to print (i.e., printed) in this still picture filing system are printed in such a manner that plural ones are arranged on a print paper 40 as shown in FIG. 40. In a first embodiment of the index print in this still picture filing system, print paper of A4 size is used as the print paper 40. Eight index cards 50 are arranged on the print paper 40 of A4 size, and plural index pictures are printed thereonto. On respective index cards 50, pairs of picture print portions 51 and related information print portions 52 are respectively printed by 25. Within the picture print portion 51, index picture data is printed. Moreover, within the related information print portion 52, characters of number "4" indicating picture directory, "U" indicating the recording mode of high resolution picture data, and "5" indicating picture No. are printed. It is to be noted that detailed explanation relating to respective related information recorded within the related information print portion 52 will be given later. Then, the index cards 50 printed out on the print paper 40 are cut along cutting lines 41 so that they are separated (divided) into eight index cards 50 having dimensions of length of 6.3 cm and breadth of 9.0 cm. The dimensions (length of 6.3 cm×breadth of 9.0 cm) of this index card 50 are set in advance so as to have dimensions such that the index card can be accommodated into cassette case which will be described later.

Figure 41:
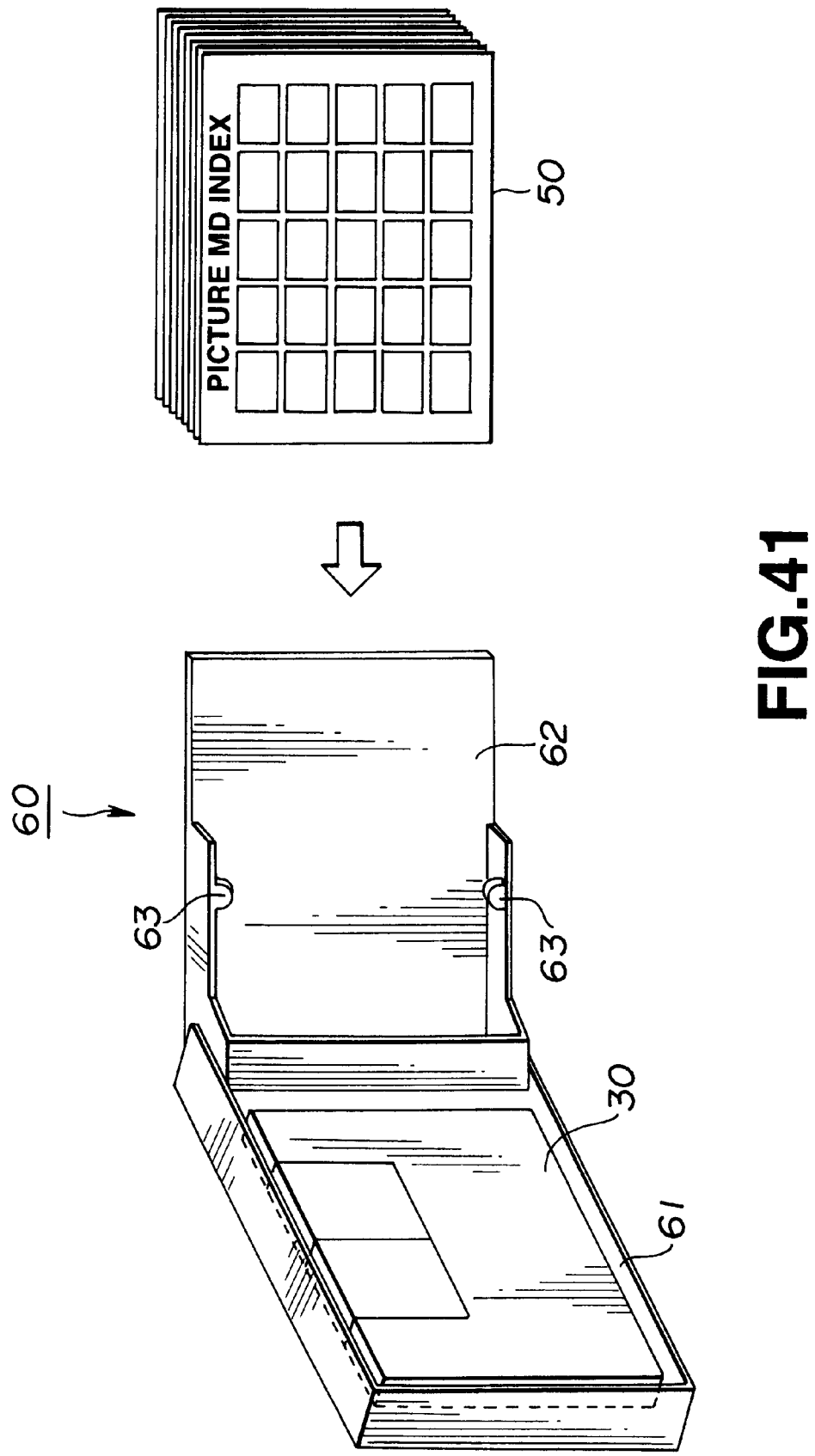
FIG. 41 is a perspective view showing the structure of cassette case for accommodating the index card therewithin along with disc cassette.

The cassette case 60 for accommodating a disc cassette 30 includes, as shown in FIG. 41, a cassette accommodating portion 61 for accommodating the disc cassette 30, and a cover portion 62. At the cover portion 62, holding portions 63 for holding the index card 50 are provided. The eight index cards 50 respectively cut out are stacked and are accommodated at the internal side of the cover portion 62 so that they are held by the holding portions 63.

By taking out eight index cards 50 accommodated within the cassette case 60, it is possible to carry out, as a list, visual observation of index pictures printed on the eight index cards 50 without work for loading the disc into the reproducing unit to reproduce picture data recorded on the disc to confirm them. Accordingly, user can easily discriminate that index pictures are recorded.

While, in the first embodiment of the index print, print paper of A4 size is used as the print paper 40, index pictures may be printed on a print paper of dimensions (length of 6.3 cm×breadth of 9.0 cm) of the index card in order to omit the work for printing index pictures thereafter to carry out cutting work along the cutting lines 41. In such a case, eight index print operations are carried out.

Figure 42:
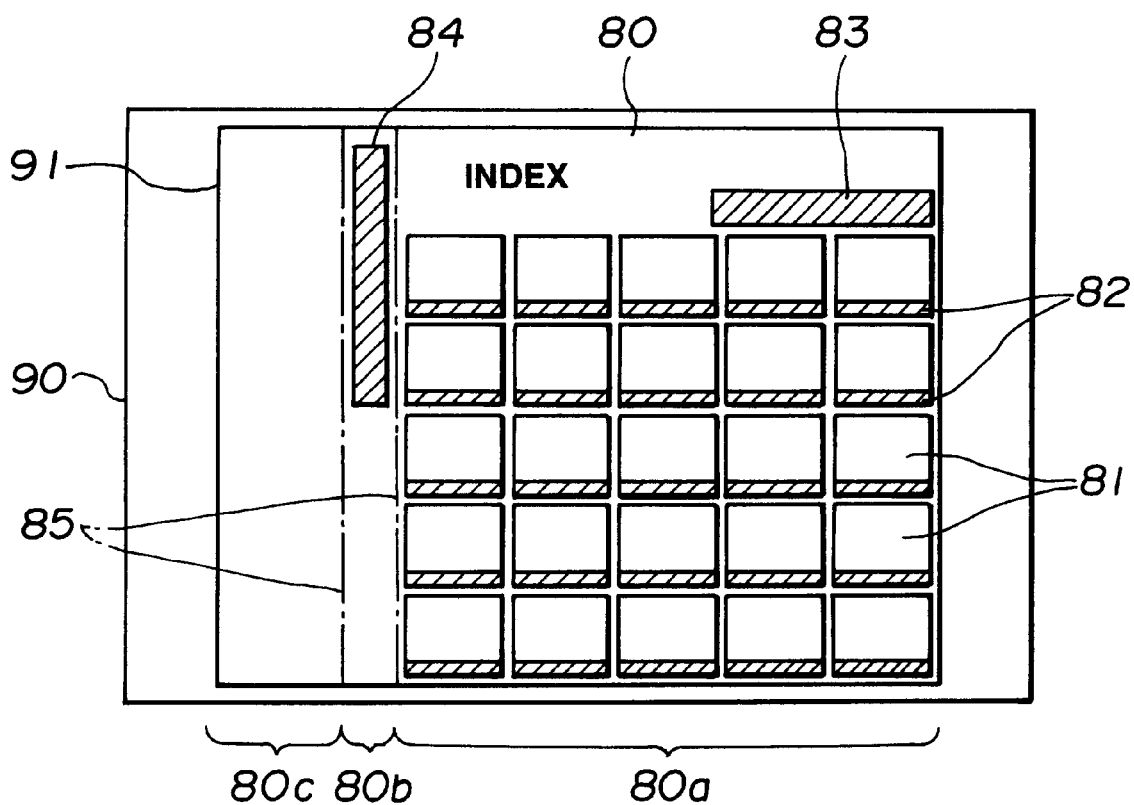
FIG. 42 is a plan view of another index card subjected to print by the still picture filing system.

In a second embodiment of the index print in this still picture filing system, an index card as shown in FIG. 42 is prepared. On a print paper 90, a cutting frame 91 indicating outer shape of an index card 80 and the index card 80 including 25 index pictures are printed out. This index card 80 is composed of a surface portion 80a, a rear portion 80b and a back portion 80c. Bending (folding) lines 85 indicating the boundary between the surface portion 80a and the rear portion 80b and the boundary between the rear portion 80b and the back portion 80c are respectively provided therebetween so that they can be bent (folded). At the surface portion 80a, similarly to the above-described index card 50, 25 picture print portions 81 within which index pictures are printed and 25 related information print portion 82 within which related information relating to the index pictures are respectively printed are provided. Data similar to the above-described related information print portion 52 is printed within the related information print portion 82. Further, at the surface portion 80a, a picture directory print portion 83 within which picture directory name is printed is provided in order to indicate picture directory within which printed index picture data is included. At the rear portion 80b, a disc name print portion 84 within which disc name for indicating directory name is printed is provided.

Figure 43:
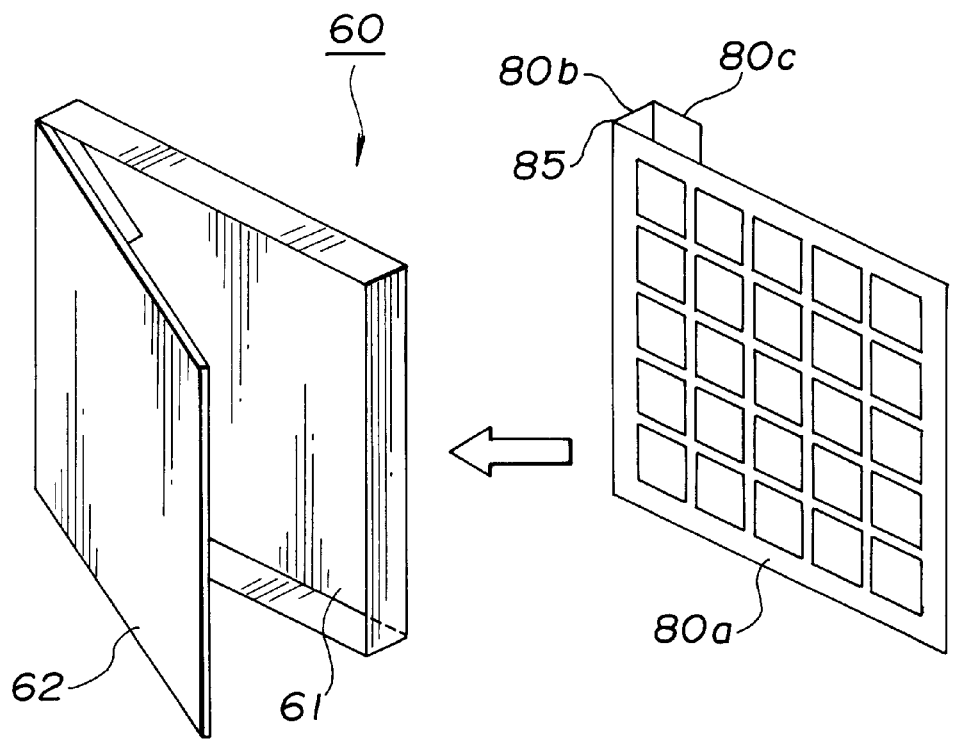
FIG. 43 is a perspective view for explaining accommodating state into the cassette case of the index card shown in FIG. 42.

The index card 80 is cut along the cutting frame 91 from the print paper 90 in which print-out has been completed. The index card 80 thus cut is bent along the bending lines 85 as shown in FIG. 43. Further, the index card 80 is accommodated in such a manner that its surface portion 80a correspond to the cover portion 62 of the cassette case 60.

Since the cassette case 60 is formed by transparent plastic material, the index card 80 is accommodated as described above, thereby making it possible to visually recognize the index picture printed on the surface portion 80a of the index card 80. Accordingly, user can carry out, as a list, visual observation of index pictures printed on the surface portion 80a of the index card 80 without allowing user to load the disc into the reproducing unit to reproduce picture data recorded on the disc to confirm them. Thus, user can easily discriminate what picture is recorded on the disc.

In addition, in the index print of the second embodiment, since information for preparing the index card such as cutting frame 91 and bending line 85, etc. is printed simultaneously with the index picture data, processing of the index card can be easily carried out.

Figure 44:
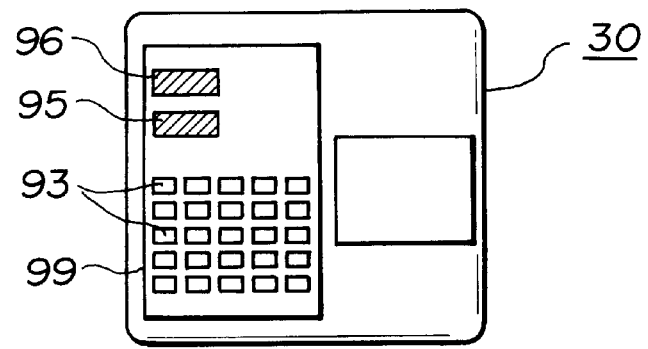
FIG. 44 is a plan view of disc cassette on which disc label prepared by the still picture filing system is stuck.

While it has been described in the above-described first and second embodiments that index picture is printed on the print paper to prepare index card, an approach may be employed, as shown in FIG. 44, for example, to print picture of reduced size, album name and disc name as described above, etc., on a disc label 99 in a seal form to stick this disc label 99 on the disc cassette 30.

Thus, when user only observes the disc label 99 on the surface of the disc cassette 30, he can easily grasp picture and/or disc name, etc. recorded on the optical disc 28.

In addition, in place of the above-described bending line 85, an approach may be employed to print perforation positions of punch holes. In this case, user can punch through printed punch holes to make filing of index cards, e.g., at file, etc. to retain them.

Alternatively, even if, in place of the bending line 85, an approach is employed to print color of the back cover portion 86 in a manner different from color of the print paper to indicate processing position, user easily grasps bending positions of the index card similarly to the above-described embodiments. Thus, processing of the index card can be easily carried out.

13. [Description of the Operation of Index Print]

In this still picture filing system, after recording of all picture data onto the disc have been completed, the index print can be carried out. Namely, after the step S24 in the first recording operation, after the step S51 in the second recording operation, or after the step S97 in the third recording operation, index print can be carried out.

Figure 45:
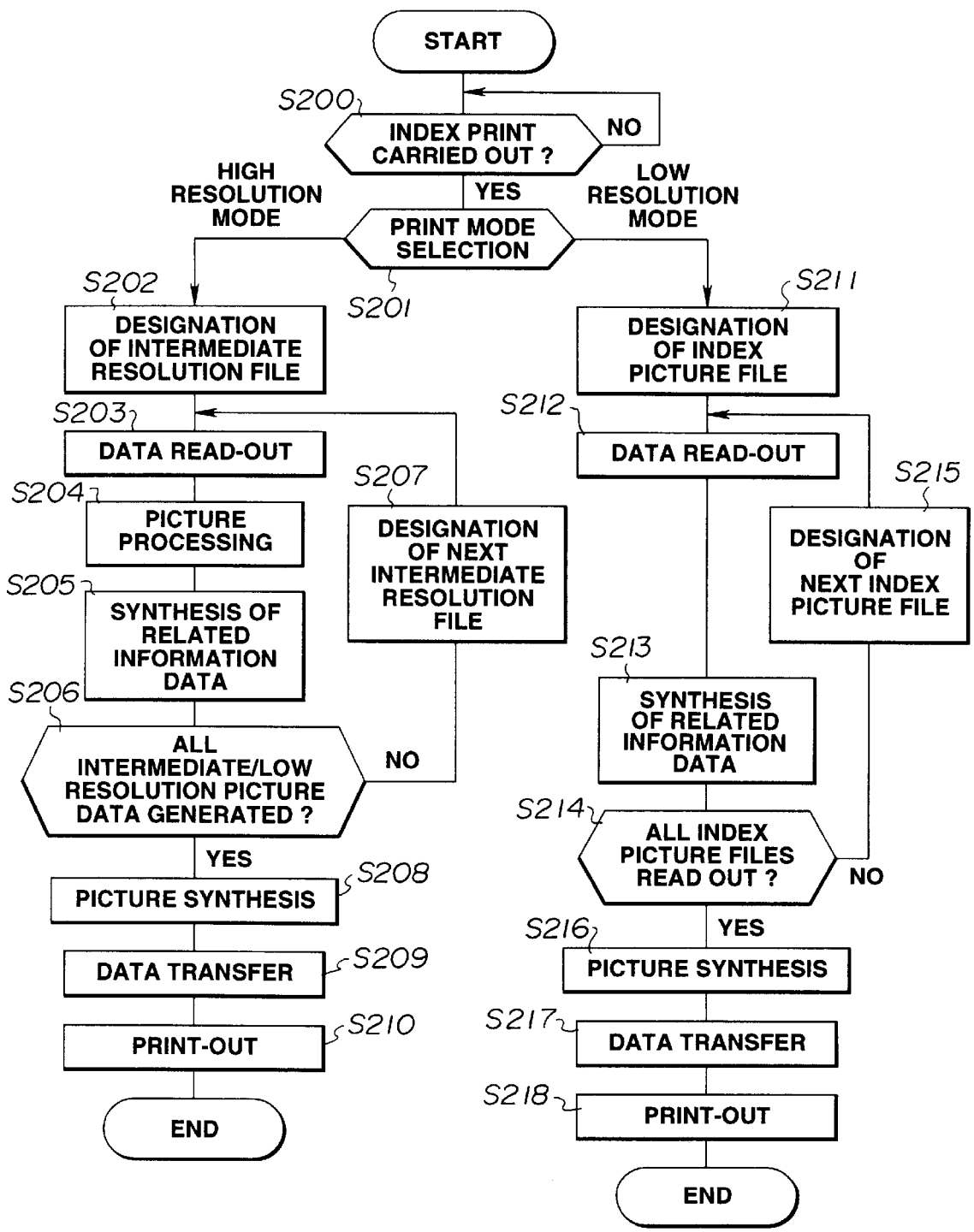
FIG. 45 is a flowchart for explaining the operation of print of the index card shown in FIG. 42.

Initially, the operation of the first index print will now be described in more practical sense with reference to the flow shown in FIG. 45. The first index print operation is the operation when the index card of the first embodiment shown in FIG. 40 is printed.

The operation flow of the first index card starts when the step S24 of the operation flow shown in the FIG. 33 mentioned above, the step S51 of the operation flow shown in the FIG. 34 mentioned above, or the step S97 of the operation flow shown in FIG. 36 mentioned above is completed. Thus, the operation flow proceeds to step S200.

At the step S200, whether or not index print is carried out is judged. For example, sentence of "Whether or not you carry out index print ?" is displayed on the monitor. In the case where operator responds to this display to designate index print, the processing operation proceeds to step S201.

At the step S201, selection of the print mode is judged. As the print mode, there are two print modes of the high resolution print mode and the low resolution print mode. The high resolution print mode is the mode for generating plural print picture data printed on the index card by the intermediate resolution picture data. In addition, the low resolution print mode is the mode for generating print picture data printed on the index card by the low resolution picture data recorded within the index picture file, i.e., index picture data. At this step S201, in the case where operator designates high resolution print mode, the processing operation proceeds to step S202. In the case where operator designates low resolution print mode, the processing operation proceeds to step S211.

Initially, the high resolution print mode will be described below. Namely, when the high resolution print mode is designated at the step S201, the processing operation proceeds to step S202.

At this step S202, the intermediate resolution file is retrieved. Initially, the system controller 6 makes reference to directory No. and picture No. of the picture data management file stored in the RAM 6a to designate the picture directory and the picture file. The designated picture directory is the directory where the directory number "mmmmm" is minimum. Namely, in the example of the file structure shown in FIG. 19, "PIC00000" is first designated. Moreover, as the intermediate resolution file, file where the picture number "nnnnn" is the minimum of the designated directory is designated. In the example of the file structure shown in FIG. 19, file of "PSN00000. PMP" is first designated. At this step S202, when the file name is designated by the system controller 6, the processing operation proceeds to step S203.

At the step S203, the system controller 6 controls the storage unit controller 5d so as to retrive, on the disc, the file designated at the step S202 to read out it. The retrieval operation of the file is carried out in accordance with the operation flow of FIG. 38 which has been described in the previously mentioned chapter of [retrieval of file and picture directory]. Further, intermediate resolution picture data of the intermediate resolution file which has been read out from the storage unit 5 is caused to undergo JPEG expansion, and is stored into the main memory 11a of the picture processing block 3. When read-out operation of the intermediate resolution picture data is completed by the step S203, the processing operation proceeds to step S204.

Figure 46:
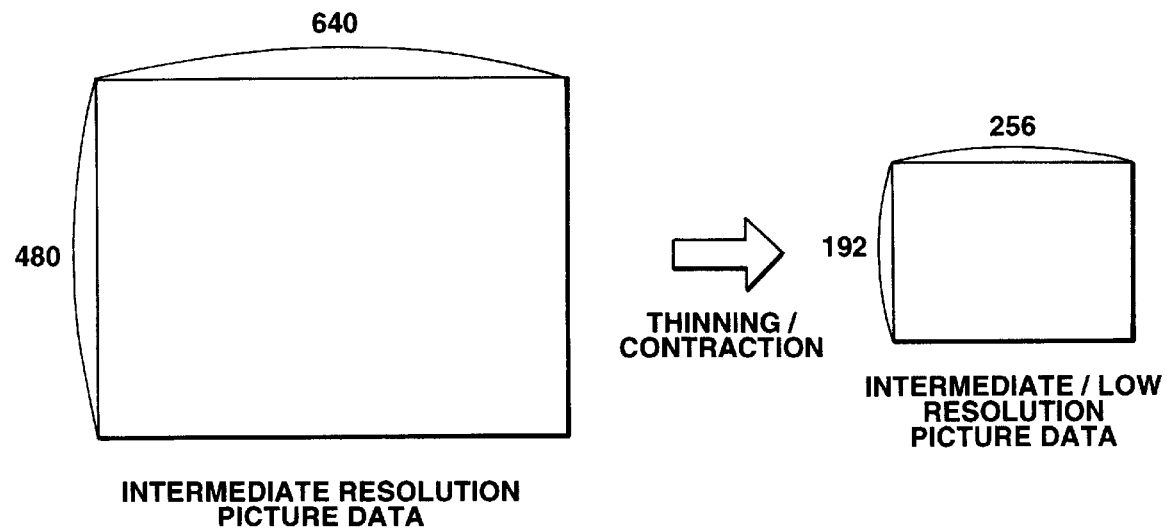
FIG. 46 is a view showing picture processing for generating intermediate/low resolution picture data of 256 pixels × 192 pixels from intermediate resolution picture data including data of 640 pixels × 480 pixels.

At the step S204, picture processing is carried out with respect to the intermediate resolution picture data recorded in the main memory 11a. As shown in FIG. 46, this picture processing is the processing for thinning intermediate resolution picture data including data of 640 pixels×480 pixels so that the data quantity is decreased, thus to generate intermediate/low resolution picture data of 256 pixels×192 pixels. The reduction quantity of picture data by this picture processing is automatically set in accordance with resolution of the printer unit 2 side by the system controller 6. In this embodiment, since the system controller 6 recognizes that the resolution of the printer unit 2 is 300 DPI, it is judged that 256 pixels×192 pixels are most suitable for the printer having resolution of 300 DPI. The intermediate/low resolution picture data caused to have 256 pixels×192 pixels as the result of reduction of data quantity is stored into a predetermined address of the main memory 11a. Thus, the processing operation proceeds to step S205.

At the step S205, related information data is synthesized with the intermediate/low resolution picture data of 256 pixels×192 pixels stored in the main memory 11a. This related information data is information relating to the high resolution file related to the intermediate resolution file designated at the step S202. This related information data is printed into the area of related information print portion 52 shown in FIG. 40.

This related information data will now be described in a more practical sense. The related information data includes data of picture directory No., recording mode of high resolution picture data, and picture No., etc.

Initially, how data relating to the picture directory No. and the picture No. subjected to print as the related data will be described below.

Since the directory name of the intermediate resolution file is designated on the basis of directory No. of the picture data management file stored in the RAM 6a at the previously mentioned step S202, data of the picture directory No. to be printed is determined by the picture directory number designated at this step S202. Similarly, since file name of the intermediate resolution file is designated on the basis of the picture No. of the picture data management file stored in the RAM 6a at the previously mentioned step S202, data of picture No. to be printed is determined by the picture No. designated at the step S202.

How the recording mode of high resolution picture data subjected to print as the related information data is obtained will now be described.

The recording mode is data indicating whether high resolution picture data is recorded by the HD recording mode (1024 pixels×1536 pixels) or the UD mode (2048 pixels×3072 pixels). As previously described, at the step S7 in the above-described operation flow shown in FIG. 32, operator necessarily selects the HD recording mode or the UD recording mode. The recording mode selected at the step S7 is recorded as picture kind information within picture information units provided by the number of respective picture files within the picture data management file. For example, if the recording mode is the HD recording mode, data indicated by "b2h" is recorded into the RAM 6a as picture kind information. If the recording mode is the UD recording mode, data indicated by "b5h" is recorded into the RAM 6a as picture kind information. Accordingly, at this step S204, the high resolution file related to the intermediate resolution file designated at the step S202 is first designated. Namely, high resolution file of the same picture No. is designated. Then, picture information unit corresponding to the designated high resolution file is retrieved from the RAM 6a to make reference to picture kind information within the retrieved picture information unit to thereby determine recording mode in which data is printed as related information data. If the high resolution picture data is recorded in the HD recording mode, character "H" is printed. If such data is recorded in the UD recording mode, character "U" is printed.

While the case where data relating to the picture directory No., the picture number and the recording mode are printed as related information data has been described in the above-described example, data such as picture individual information, link information and/or key word retrieval data No., etc. recorded within the picture information unit can be easily recorded without being limited to the above-mentioned data.

When all related information data are printed at the step S205, the processing operation proceeds to step S206.

At the step S206, whether or not intermediate/low resolution picture data is prepared from all intermediate resolution picture data is judged. In more practical sense, reference is made to directory No. recorded within the overall information management file and picture No. recorded within the picture data management file in the RAM 6a. At this time, in the case where the directory No. is the last No. and the picture No. is the last number, it is judged that the intermediate/low resolution picture data have been prepared from all intermediate resolution picture data. Thus, the processing operation proceeds to step S208. In any one of the case where the directory No. is not the last No. and the case where the picture No. is not the last No., it is judged that the intermediate resolution picture data which has not yet been retrieved is left. Thus, the processing operation proceeds to step S207.

At the step S207, the system controller 6 designates the next intermediate resolution file of the intermediate resolution file designated at the step S202. In more practical sense, the intermediate resolution picture file having picture No. in which the picture No. designated at the step S202 is incremented is designated. If the incremented picture No. does not exist, it is judged that the intermediate resolution picture file no longer exists within corresponding picture directory. Thus, the intermediate resolution picture file having the minimum picture number of the next picture directory is designated. In the example of the file structure shown in FIG. 19, "PSN0001. PMP" is designated as the next file of the file of "PSN00000. PMP" designated at the step S202. When the next file name is designated by the system controller 6, the processing operation returns to the step S203.

Until the intermediate/low resolution picture data is prepared from all intermediate resolution picture data, respective steps of step S203–step S204–step S205–step S206 step S207–step S203 are repeated. When the intermediate resolution picture data have been generated from all intermediate resolution picture data, the processing operation proceeds to step S208.

At the step S208, all intermediate/low resolution picture data stored in the main memory 11a and template picture recorded in advance within the system controller 6 are synthesized. This template picture data is picture data consisting of picture data indicating cutting line 41 and picture data indicating character such as "PICTURE MD INDEX", etc.

At step S209, the system controller 6 controls the picture processing controller 14 so as to transfer picture data stored in the main memory 11a to the printer unit 2.

At step S210, the system controller 6 conducts a control to convert picture data transferred to the printer unit 2 into YMC data to carry out print-out thereof. Thus, the processing operation is completed.

The low resolution print mode will now be described. Namely, when the low resolution mode is designated at the step S201, the processing operation proceeds to step S211.

At the step S211, the index picture file is retrieved. Explanation will be given in more practical sense. The system controller 6 makes reference to directory No. of picture directory information units provided by the number of picture directories within the overall information management file stored in the RAM 6a to thereby designate the picture directory and the index picture file. The designated picture directory is the directory of the minimum directory number "mmmmm". In the example of the file structure shown in FIG. 19, "PIC00000" is designated. In addition, as the index picture file, file of the minimum index No. "nnn" within the designated directory is designated. Accordingly, in the example of the file structure shown in FIG. 19, "PINDX000. PMX" is designated. When the index picture file is designated by the system controller 6, the processing operation proceeds to step S212.

At the step S212, the system controller 6 controls the storage unit controller 5d so as to retrieve, on the disc, index picture file designated at the step S211. The retrieval operation of file is carried out in accordance with the operation flow of FIG. 38 which has been described at the chapter of the previously described [retrieval of file and picture directory]. Plural low resolution picture data included in the index picture file (index picture data) which have been read out from the storage unit 5 consist of N headers and N index picture data as shown in, FIG. 29(a). Moreover, as has been described above, this index picture data has resolution of 60 pixels×80 pixels. These N index picture data are caused to undergo JPEG expansion by making reference to the header, and are stored in order into the main memory 11a of the picture processing block 3. When read-out operation of N index picture data is completed at the step S212, the processing operation proceeds to step S213.

At the step S213, related information data is synthesized with N index picture data stored in the memory 11a. Since this related information data is data similar to the related information data which has been explained at the step S205, its explanation is omitted. It is to be noted that while it has been described at the step S205 that every time one intermediate resolution picture file is designated, one related information data is obtained, an approach is employed at this step S213 such that every time one index picture file is designated, N related information data are obtained so as to correspond to N index pictures included within corresponding index picture file.

How N (number of) related information data are obtained in a more practical sense will be described below. As shown in FIGS. 25(a)–25(b), N picture information units are stored in the picture data management file stored in the RAM 6a. Data relating to the directory No., the picture No. and picture kind information are respectively stored in these N picture information units. Accordingly, by making reference to the N picture information units of the picture data management file existing in the picture directory within which the index picture file designated at the step S211 is included, it is possible to obtain N directory numbers, N picture numbers and N picture kind information. The N related information data thus obtained are stored into the main memory 11a in the state related to the N index picture data stored in the main memory 11a. It is to be noted that since the storage order of N picture information units stored in the picture data management file is the same as the storage order of N index picture data stored in the index picture file as previously explained, it is easy to allow N related information and N index picture data to be related to each other.

When N related information data are stored into the main memory 11a at the step S213, the processing operation proceeds to step S214.

At the step S214, whether or not all index picture files have been read out from the disc is judged. In more practical sense, reference is made to the directory No. of the overall information management file and the next picture index file No. within the picture data management file which are stored in the RAM 6a. At this time, in the case where the directory No. is the last No. and the next picture index file No. is the last No., it is judged that all index picture files have been read out from the disc. Thus, the processing operation proceeds to step S216. In the case where the directory No. is not the last No., or in the case where the picture No. is not the last No., it is judged that any index picture file which has not yet been designated is left. Thus, the processing operation proceeds to step S215.

At the step S215, the system controller 6 designates the second index picture file which is the next file of the first index picture file designated at the step S211. In more practical sense, index picture file having file number in which the file number designated at the step S211 is incremented is designated. If the incremented index picture file does not exist, it is judged that further index picture file does not exist within corresponding picture directory to designate the index picture file of the minimum file No. of the next picture directory. Explanation will be given with reference to the example of the file structure shown in FIG. 19. The next file of the file of "PINDX000. PMX" designated at the step S211 does not exist within the picture directory "PIC00000". Accordingly, the first index picture file "PINDX000. PMX" of the next picture directory "PIC00001" is designated. When the second index picture file name is designated by the system controller 6, the processing operation returns to the step S212.

Explanation will now be given in connection with the case where the second index picture file is read out from the disc at the step S212 to store M index picture data included within the second index picture file into the main memory 11a. When the second index picture file is designated at the step S215, the N index picture data which have been read out from the first index picture file are already stored in the main memory 11a. Accordingly, M index picture data which have been newly read out from the disc are stored into the main memory 11a as the (N+1, N+2, N+3, N+4, . . . , N+M)-th index picture data so that they are arranged (allocated) after the previously stored N index picture data. Moreover, index picture data which are read out from the second index picture file and index picture files succeeding thereto are similarly stored into the main memory 11a so that they are arranged (allocated) after the previously stored index picture data.

Until all index picture files are read out, respective steps of step S212–step S213–step S214–step S215–step S212 are repeated. When read-out operations of all the index picture files are completed, all the index picture data are continuously stored in the main memory 11a.

At step S216, all the index picture data stored in the main memory 11a and template picture data stored in advance in the system controller 6 are synthesized. This template picture data is picture data consisting of picture data indicating cutting line 41, and picture data indicating character such as "PICTURE MD INDEX", etc.

At step S217, the system controller 6 conducts a control to convert the picture data transferred to the printer unit 2 into YMC data to carry out print-out thereof. Thus, the processing operation is completed.

Figure 47:
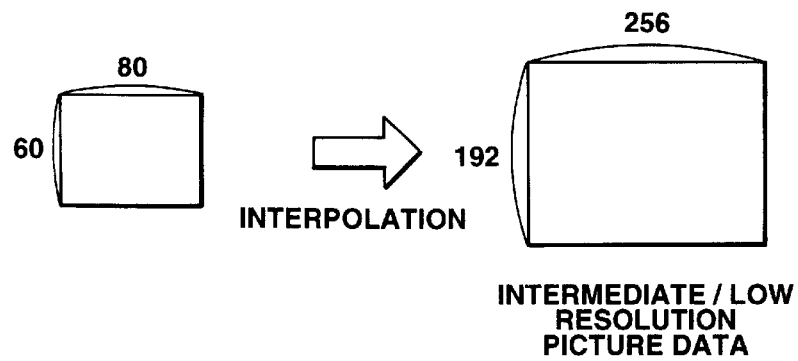
FIG. 47 is a view showing interpolation processing to 192 pixels × 256 pixels in the low resolution mode.

It is to be noted that, in this low resolution mode, index picture data of 60 pixels×80 pixels obtained from the index picture file may be transferred to the printer unit 2 thereafter to carry out interpolating processing into 192 pixels×256 pixels so that the data quantity is increased as shown in FIG. 47.

Further, the second index print operation will be described below with reference to the operation flow shown in FIG. 45.

This second index print operation is the operation when the index card of the second embodiment shown in FIG. 42 is printed.

The difference in operation between the first index card print and the second index card print is that steps for designation of file are different from each other. Namely, in the high resolution mode, the step S202 and the step S207 are different. In the low resolution mode, the step S211 and the step S215 are different. The reason why file designating method is different as stated above will be described below.

In the case of the index card 80 of the second embodiment, only one index card can be inserted into the cassette case 60. Moreover, since the size (dimensions) of the index card is limited, it is impossible to print all index picture data on the disc onto the index card 80. Accordingly, it is desirable to print, onto the index card 80, only the representative picture data from picture data recorded onto the disc. Therefore, the file designating method with respect to the first index card print in which all index picture data are designated and the file designating method with respect to the second index card print in which only the representative picture data is designated are different from each other. Steps different from those of the first index card print will be described below, and explanation of steps similar to those of the first index card print is omitted.

At the step S202 and the step S207, the intermediate resolution picture file is designated. This intermediate resolution picture file is designated on the basis of N picture directory information units within the overall information management file "OV_INF. PMF". Data relating to the N index picture data recorded within the overall index file "OV_INX. PMF" are recorded in the N picture directory information units. As previously described, n number of (one in the embodiment) index picture data are stored in the overall index file "OV_INF. PMF" every respective picture directories in order of picture number of the respective picture directories. Moreover, as shown in FIGS. 24(a)–24 (b), directory numbers and index picture numbers are respectively recorded in the N picture directory information units. Namely, by making reference to the N picture directory information units, it is possible to obtain directory numbers and index picture numbers relating to the N index picture data recorded in the overall index file "OV_INF. PMF". Accordingly, at the step S202 and the step S207, N intermediate resolution picture data are designated in order on the basis of the N picture directory information units.

At the step S211 and the step S215, it is sufficient to designate the overall index file "OV_INF. PMF" to read out N index picture data recorded within this file.

Other steps are similar to those of the first index card print.

By printing picture data recorded on the disc onto the index card accommodated within the cassette case for keeping or retaining the disc as stated above, picture data recorded on the disc can be easily grasped.

Moreover, by forming print picture data in which processing information used for processing the index card for the purpose of inserting the index card into the cassette case is synthesized with plural index picture data printed onto the index card, preparation of the index card can be easily carried out.

Further, since the directory numbers and the index picture numbers are printed along with the index picture data printed on the index card, when user only observes this index card, it is possible to grasp directory in which picture that user desires is recorded. Accordingly, user only observes this index card, without loading the disc into the recording/reproduction unit to retrieve directory in which desired picture data is recorded, to thereby designate the directory No. and the index picture No., thus making it possible to reproduce the desired picture. Thus, the retrieval work can be simplified.

In addition, by selecting any of the above-mentioned two modes, it is possible to prepare an index card that user desires.

When the high resolution mode is selected, the intermediate/low resolution picture data having resolution higher than that of the index picture data is printed as print picture data. Accordingly, index card of high picture quality can be prepared. In carrying out index print in the high resolution mode, the intermediate/low resolution picture data generated from the intermediate resolution picture data is selected as print picture data in dependency upon the print resolution of the printer unit 2, thereby making it possible to carry out index print of high resolution corresponding to the printer unit 2.

Further, when the low resolution mode is selected, the index picture data stored in the index picture file prepared for the purpose of displaying the index picture data on the monitor is printed as print picture data. Accordingly, index print can be speedily carried out without newly synthesizing index picture data at the time of index print.

Furthermore, since related information data relating to high resolution picture data related to the index picture data is synthesized with the index picture data (or intermediate/ low resolution picture data) printed on the index card, user can obtain information relating to the high resolution data only by looking at the index card. In addition, since this related information data is recorded within the picture data management file stored in the RAM 6a within the system controller 6, it is possible to obtain information relating to the high resolution data without retrieving the high resolution picture file including the related high resolution picture data. Namely, since related information data relating to all high resolution picture data can be obtained from the RAM 6a without access to the disc, it is possible to speedily form print picture data printed onto the index card.

I claim:

1. A picture data printing apparatus comprising:
    storing means for storing high resolution picture files, intermediate resolution picture files that correspond with the high resolution picture files, and a plurality of management data files on a storage medium in a hierarchial directory structure, the directory structure having a main directory that includes an overall management file and a plurality of picture directories, each picture directory having a picture data management file and plurality of picture files;
    first processing means for reading management data files from the storage medium, identifying an intermediate resolution picture file from the management data files, and reading the intermediate resolution picture file from the storage medium;
    second processing means for processing the intermediate resolution picture file read from the storage medium to form a lower resolution picture file, and forming related data;
    printing means for printing the lower resolution picture file and the related data onto an index card; and
    control means for controlling the first processing means, the second processing means and the printing means.

2. The picture data printing apparatus as set forth in claim 1, wherein each picture directory has a picture directory number, each high resolution picture file has a picture number, and each intermediate resolution picture file has a picture number, and
    wherein the first processing means identifies the intermediate resolution picture file is identified by the picture directory number and the picture number.

3. The picture data printing apparatus as set forth in claim 2, wherein the first processing means identifies each of the intermediate resolution picture files on the storage medium from the management data files in an order, and reads each of the intermediate resolution picture files from the storage medium in the order.

4. The picture data printing apparatus as set forth in claim 3, wherein the second processing means forms the lower resolution picture file by thinning the intermediate resolution picture file to remove data from the intermediate resolution picture file.

5. The picture data printing apparatus as set forth in claim 4,
    wherein the control means selects a resolution of the lower resolution picture file in view of a printable resolution of the printing means.

6. The picture data printing apparatus as set forth in claim 2, wherein the related data includes information about the high resolution picture file that corresponds with the intermediate resolution picture file from which the lower resolution picture file is formed.

7. The picture data printing apparatus as set forth in claim 6,
    wherein the related data includes the picture directory number and the picture number of the high resolution picture file that corresponds with the intermediate resolution picture file from which the lower resolution picture file is formed.

8. The picture data printing apparatus as set forth in claim 7,
    wherein the related data is read from a picture data management file that corresponds with the high resolution picture file.

9. The picture data printing apparatus as set forth in claim 6,
    wherein the related data includes information that indicates a recording mode of the high resolution picture file that corresponds with the intermediate resolution picture file from which the lower resolution picture file is formed.

10. The picture data printing apparatus as set forth in claim 9,
    wherein the recording mode includes a high resolution mode and an ultra high resolution mode.

11. The picture data printing apparatus as set forth in claim 7, wherein the related data includes information that indicates a recording mode of the high resolution picture file that corresponds with the intermediate resolution picture file from which the lower resolution picture file is formed.

12. The picture data printing apparatus as set forth in claim 3, wherein the order begins with the lowest picture directory number and the lowest picture number.

13. A picture data printing apparatus comprising:
    storing means for storing high resolution picture files, intermediate resolution picture files that correspond with the high resolution picture files, and a plurality of management data files on a storage medium in a hierarchial directory structure, the directory structure having a main directory that includes an overall management file and a plurality of picture directories, each picture directory having a picture data management file and plurality of picture files;

first processing means for reading management data files from the storage medium, identifying an intermediate resolution picture file from the management data files, and reading the intermediate resolution picture file from the storage medium;

second processing means for processing the intermediate resolution picture file to form a lower resolution picture file, and forming related data;

printing means for printing the lower resolution picture file and the related data onto an index card; and control means for controlling the first processing means, the second processing means, and the printing means;

wherein a plurality of index cards are formed on a print media, and wherein index card information for forming the index card to fit within a storage case is printed on the print media by the printing means.

14. The picture data printing apparatus as set forth in claim 13,
wherein the index card information includes cutting line information for cutting the index card from the print media.

15. A picture data printing apparatus comprising:
storing means for storing high resolution picture files, intermediate resolution picture files that correspond with the high resolution picture files, index files, and a plurality of management data files on a storage medium in a hierarchial directory structure, the directory structure having a main directory that includes an overall management file and a plurality of picture directories, each picture directory having a picture data management file, a picture index file, and a plurality of picture files, the picture index file of a picture directory having a plurality of low resolution picture files that correspond to the high resolution picture files in the picture directory;

first processing means for reading management data files from the storage medium, identifying a picture index file from the management data files, and reading the picture index file so identified from the storage medium;

second processing means for forming related data;

printing means for printing the picture index file identified by the first processing means and the related data onto an index card; and control means for controlling the first processing means, the second processing means, and the printing means.

16. The picture data printing apparatus as set forth in claim 15,
and further including memory means for temporarily storing the management data files.

17. The picture data printing apparatus as set forth in claim 15, wherein each picture directory has a picture directory number, and wherein the first processing means identifies a picture index file by the picture directory number.

18. The picture data-printing apparatus as set forth in claim 17, wherein the first processing means identifies each of the picture index files on the storage medium from the management data files in an order, and reads each of the picture index files from the storage medium in the order.

19. The picture data printing apparatus as set forth in claim 15, wherein the related data includes information about the high resolution picture files that corresponds with the low resolution picture files in the picture index file identified by the first processing means.

20. The picture data printing apparatus as set forth in claim 19,
wherein the related data includes a picture directory number and picture numbers which identify the high resolution picture files that correspond with the low resolution picture files in the picture index file identified by the first processing means.

21. The picture data printing apparatus as set forth in claim 20,
wherein the related data for each high resolution picture file that corresponds with the low resolution picture files in the picture index file identified by the first processing means is read from a corresponding picture information unit.

22. The picture data printing apparatus as set forth in claim 19,
wherein the related data includes data that indicates a recording mode of each high resolution picture file that corresponds with the low resolution picture files in the picture index file identified by the first processing means.

23. The picture data printing apparatus as set forth in claim 22,
wherein the resolution mode includes a high resolution mode and an ultra high resolution mode.

24. The picture data printing apparatus as set forth in claim 20, wherein the related data includes data that indicates a recording mode of each high resolution picture file that corresponds with the low resolution picture files in the picture index file identified by the first processing means.

25. The picture data printing apparatus as set forth in claim 18, wherein the order begins with a lowest picture directory number and increases to a largest picture directory number.

26. A picture data printing apparatus comprising:
storing means for storing high resolution picture files, intermediate resolution picture files that correspond with the high resolution picture files, index files, and a plurality of management data files on a storage medium in a hierarchial directory structure, the directory structure having a main directory that includes an overall management file and a plurality of picture directories, each picture directory having a picture data management file, a picture index file, and plurality of picture files, the picture index file of a picture directory having a plurality of low resolution picture files that correspond to each of the high resolution picture files in the picture directory;

first processing means for reading management data files from the storage medium, identifying a picture index file from the management data files, and reading the picture index file so identified from the storage medium;

second processing means for forming related data;

printing means for printing the picture index file identified by the first processing means and the related data onto an index card; and control means for controlling the first processing means, the second processing means, and the printing means, wherein a plurality of index cards are formed on a print media, and wherein index card information for forming the index card to fit within a storage case is printed on the print media by the printing means.

27. The picture data printing apparatus as set forth in claim 26,
  wherein the index card information includes cutting line information for cutting the index card from the print media.

28. The picture data printing apparatus as set forth in claim 1,
  and further comprising selector means for directing the first processing means to identify a intermediate resolution picture file, or a picture index file from the management data files, a picture index file being formed in each picture directory, the picture index file of a picture directory having a plurality of low resolution picture files that correspond to the high resolution picture files in the picture directory.

29. The picture data printing apparatus as set forth in claim 15, and further comprising selector means for directing the first processing means to identify an intermediate resolution picture file, or a picture index file from the management data files.

30. A picture data printing apparatus for printing picture data reproduced from a recording medium that stores high resolution picture files, intermediate resolution picture files that correspond with the high resolution picture files, and a plurality of management data files on a storage medium in a hierarchial directory structure, the directory structure having a main directory that includes an overall management file and a plurality of picture directories, each picture directory having a picture data management file and plurality of picture files;
  the apparatus comprising:
    first processing means for reading management data files from the storage medium, identifying an intermediate resolution picture file from the management data files, and reading the intermediate resolution picture file from the storage medium;
    second processing means for processing the intermediate resolution picture file to form a lower resolution picture file, and forming related data that identifies the high resolution picture file that corresponds to the intermediate resolution picture file identified by the first processing means;
    printing means for printing the lower resolution picture file and the related data onto an index card; and
    control means for controlling the first processing means, the second processing means, and the printing means.

31. The picture data printing apparatus as set forth in claim 30, wherein the related data includes information that indicates a recording mode of the high resolution picture file that corresponds with the intermediate resolution picture file from which the lower resolution picture file is formed.

32. A print picture data generating unit in a picture data printing apparatus for printing picture data reproduced from a recording medium that stores high resolution picture files, intermediate resolution picture files that correspond with the high resolution picture files, index files, and a plurality of management data files on a storage medium in a hierarchial directory structure, the directory structure having a main directory that includes an overall management file and a plurality of picture directories, each picture directory having a picture data management file, a picture index file, and plurality of picture files, the picture index file of a picture directory having a plurality of low resolution picture files that correspond to the high resolution picture files in the picture directory;
  the print picture data generating unit comprising:
    first processing means for reading management data files from the storage medium, identifying all of the picture index files from the management data files, and reading all of the picture index files so identified from the storage medium;
    second processing means for forming print picture data from the picture index files read from the storage medium, and forming related data;
    printing means for printing the picture index files read from the storage medium and the related data onto an index card; and
    control means for controlling the first processing means, the second processing means, and the printing means.

33. The print picture data generating apparatus as set forth in claim 32,
  wherein the second processing means forms related data for each high resolution picture file that corresponds to the low resolution picture files in each of the picture index files read from the storage medium.

34. A picture data printing apparatus comprising:
  a storage unit that stores high resolution picture files, intermediate resolution picture files that correspond with the high resolution picture files, and a plurality of management data files on a storage medium in a hierarchial directory structure, the directory structure having a main directory that includes an overall management file and a plurality of picture directories, each picture directory having a picture data management file and plurality of picture files,
  the storage unit reading management data files and intermediate resolution picture files from the storage medium;
  a controller connected to the storage unit that directs the storage unit to read the management data files, receives the management data files read by the storage unit, identifies an intermediate resolution picture file from the management data files, and directs the storage unit to read the intermediate resolution picture file; and
  a picture processor connected to the storage unit and the controller that processes the intermediate resolution picture file read from the storage unit to form a lower resolution picture file.

35. The apparatus of claim 34 wherein the storage unit also stores index files,
  wherein each picture directory includes an index file, the index file of a picture directory having a plurality of low resolution picture files that correspond to the high resolution picture files in the picture directory,
  wherein the controller identifies an intermediate resolution picture file or an index file in response to a selection criteria.

36. The apparatus of claim 35 wherein when the controller identifies an index file, the controller directs the storage unit to read the index file so identified from the storage medium.

* * * * *